(12) United States Patent
Take

(10) Patent No.: US 8,027,100 B2
(45) Date of Patent: Sep. 27, 2011

(54) IMAGING LENS, OPTICAL APPARATUS AND METHOD FOR FORMING IMAGE USING THIS IMAGING LENS

(75) Inventor: Toshinori Take, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/029,161

(22) Filed: Feb. 17, 2011

(65) Prior Publication Data

US 2011/0134546 A1  Jun. 9, 2011

Related U.S. Application Data

(62) Division of application No. 12/421,323, filed on Apr. 9, 2009, now Pat. No. 7,940,478.

(60) Provisional application No. 61/044,235, filed on Apr. 11, 2008, provisional application No. 61/044,258, filed on Apr. 11, 2008, provisional application No. 61/044,375, filed on Apr. 11, 2008, provisional application No. 61/044,387, filed on Apr. 11, 2008.

(30) Foreign Application Priority Data

| Apr. 11, 2008 | (JP) | 2008-103746 |
| Apr. 11, 2008 | (JP) | 2008-103747 |
| Apr. 11, 2008 | (JP) | 2008-103748 |
| Apr. 11, 2008 | (JP) | 2008-103749 |

(51) Int. Cl.
*G02B 9/06* (2006.01)
*G02B 27/64* (2006.01)
*G02B 9/04* (2006.01)

(52) U.S. Cl. .......... 359/794; 359/577; 359/793

(58) Field of Classification Search ............ 359/557, 359/754, 793, 794
See application file for complete search history.

(56) References Cited

U.S. PATENT DOCUMENTS

| 4,493,537 A | 1/1985 | Nakahashi |
| 4,984,878 A | 1/1991 | Miyano |
| 5,706,141 A | 1/1998 | Abe |
| 5,781,340 A * | 7/1998 | Suzuki ............... 700/28 |
| 6,417,975 B1 | 7/2002 | Isono |
| 6,600,610 B2 | 7/2003 | Ohno |
| 6,865,031 B2 | 3/2005 | Hoshi |
| 7,440,196 B2 | 10/2008 | Kobayashi |
| 7,706,087 B2 | 4/2010 | Obama |
| 7,940,478 B2 * | 5/2011 | Take ................. 359/794 |

FOREIGN PATENT DOCUMENTS

| JP | 61-46807 | 10/1986 |
| JP | 5-37288 | 6/1993 |
| JP | 7-122692 | 12/1995 |
| JP | 9-189856 | 7/1997 |
| JP | 2000-193884 | 7/2000 |
| JP | 2002-287021 | 10/2002 |
| JP | 2003-241084 | 8/2003 |

* cited by examiner

*Primary Examiner* — David N Spector
(74) *Attorney, Agent, or Firm* — Miles & Stockbridge P.C.

(57) ABSTRACT

An imaging lens includes a first lens group having a positive refractive power, an aperture stop, and a second lens group having a positive refractive power, which are disposed in order from an object. The first lens group has a first lens component having a negative refractive power and a second lens component having a positive refractive power, which are disposed in order from the object, and conditions expressed by the expressions $0.12<f/f1<0.47$ and $0.016<D12/f<0.079$ are satisfied, when f1 is a focal length of the first lens group, f is a focal length of the imaging lens, and D12 is an air distance between the first lens component and the second lens component of the first lens group.

37 Claims, 67 Drawing Sheets

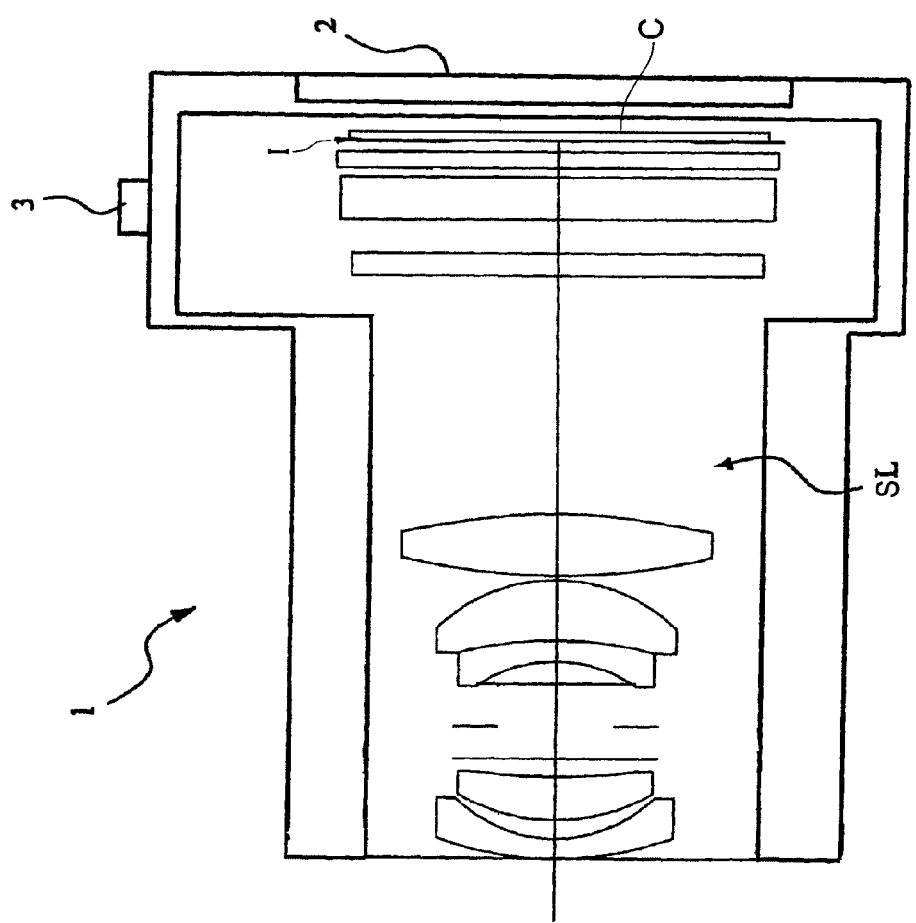

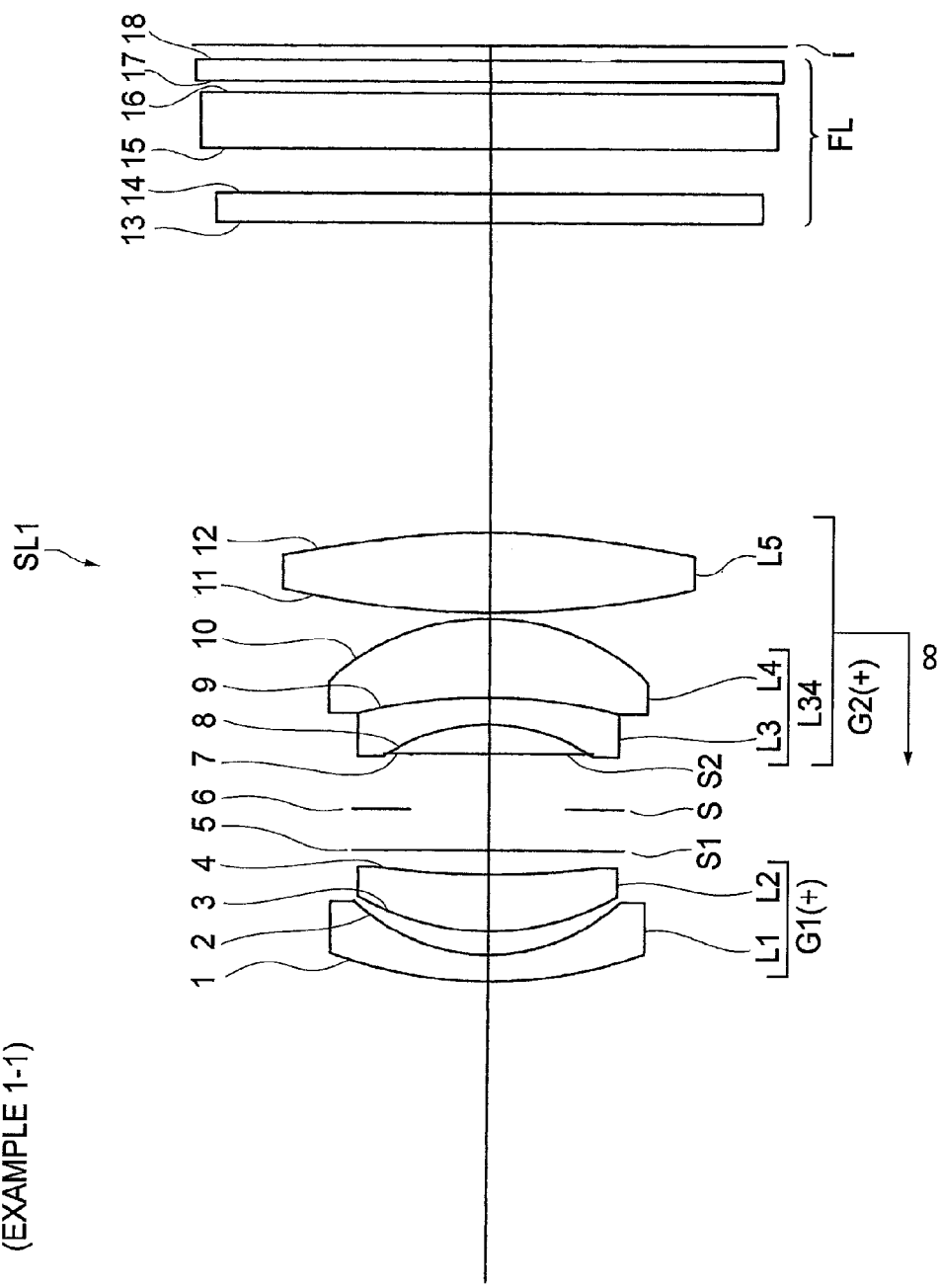

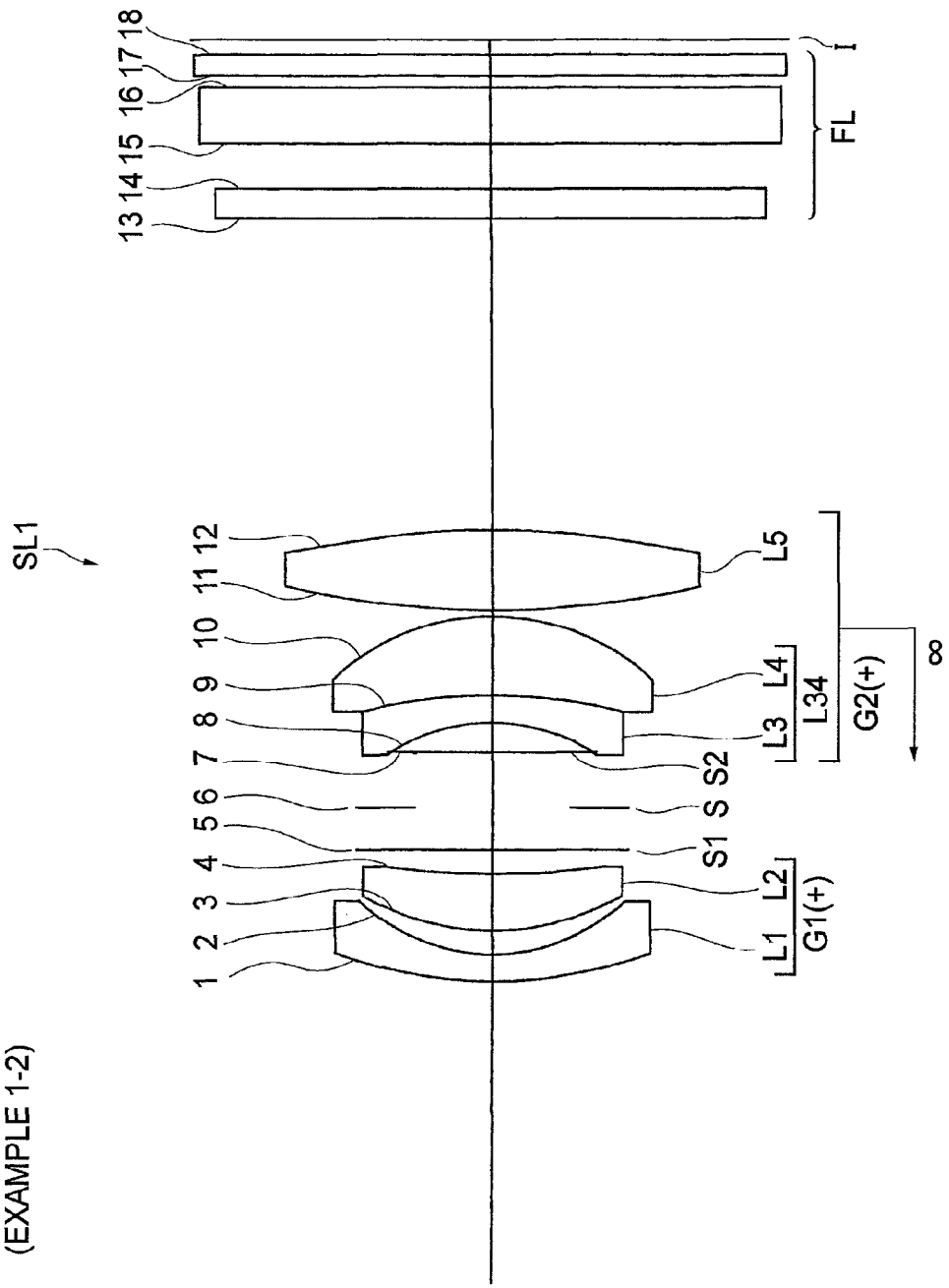

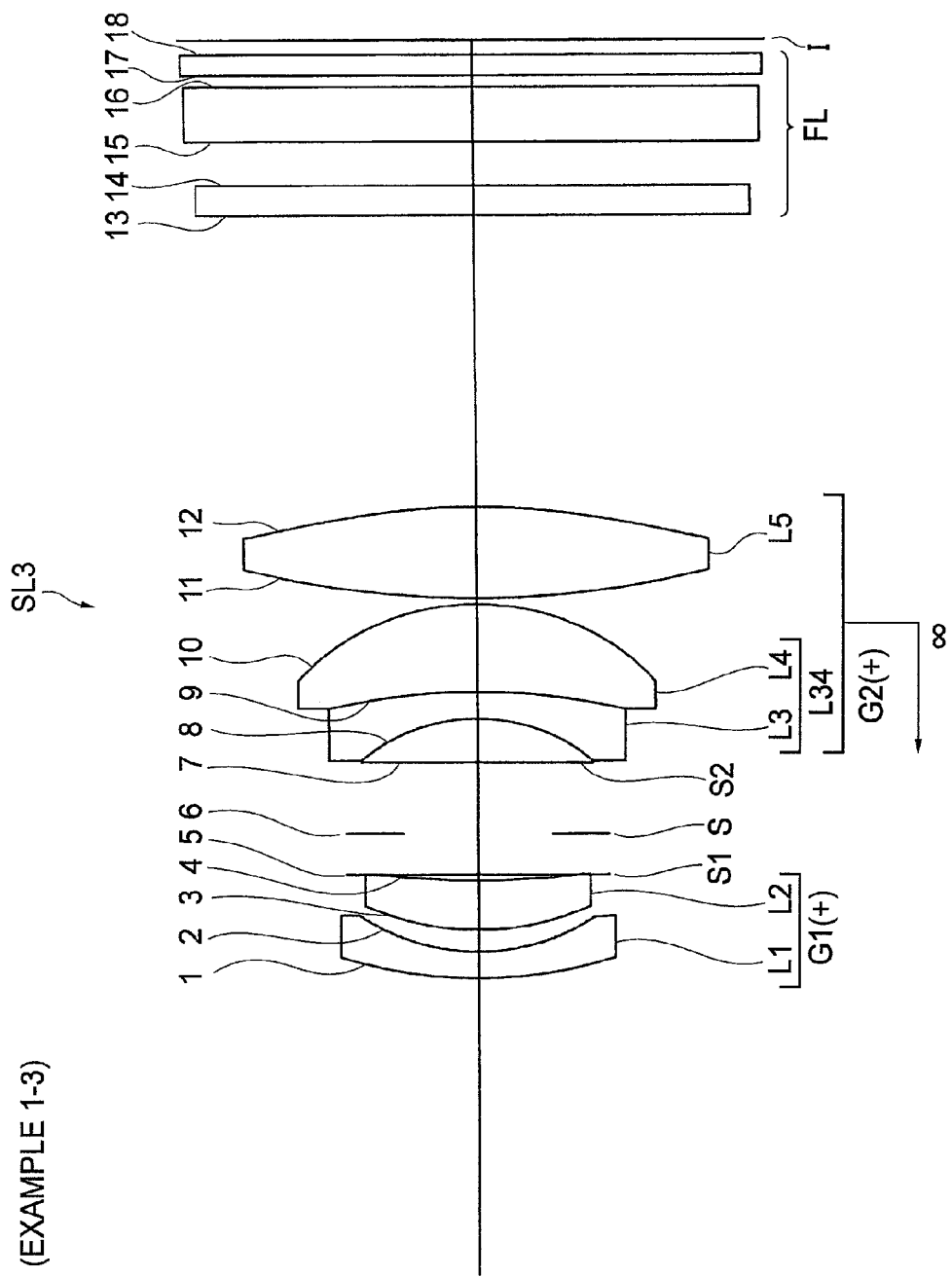

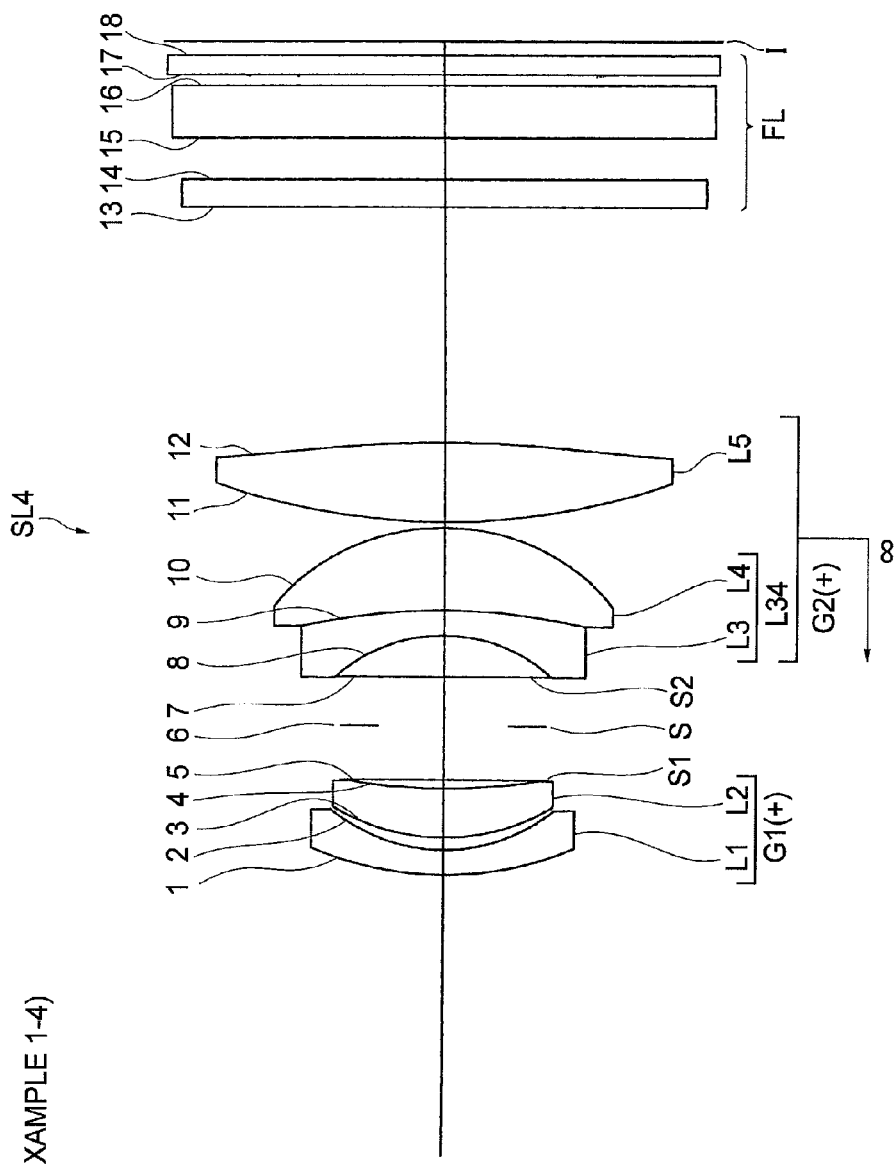

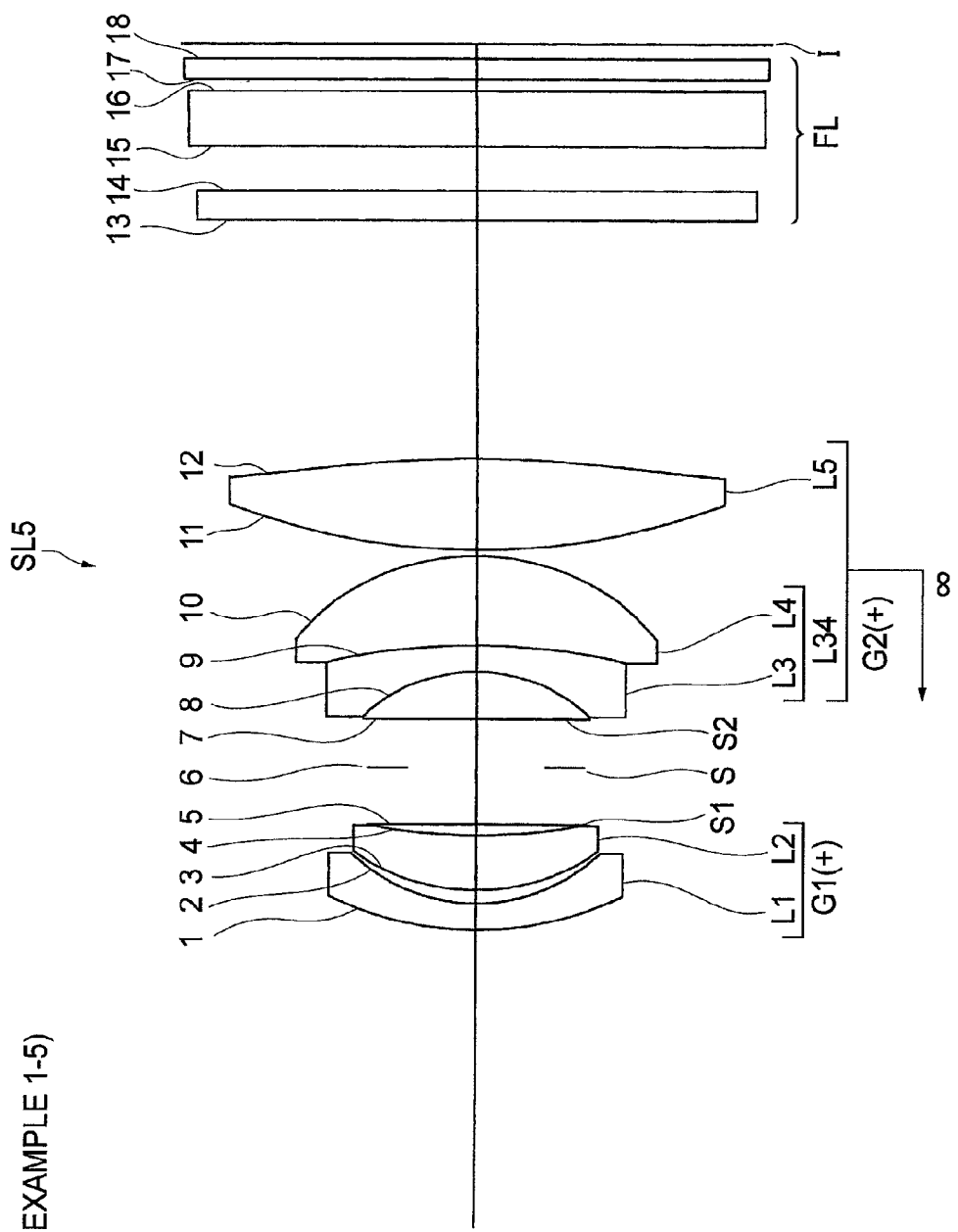

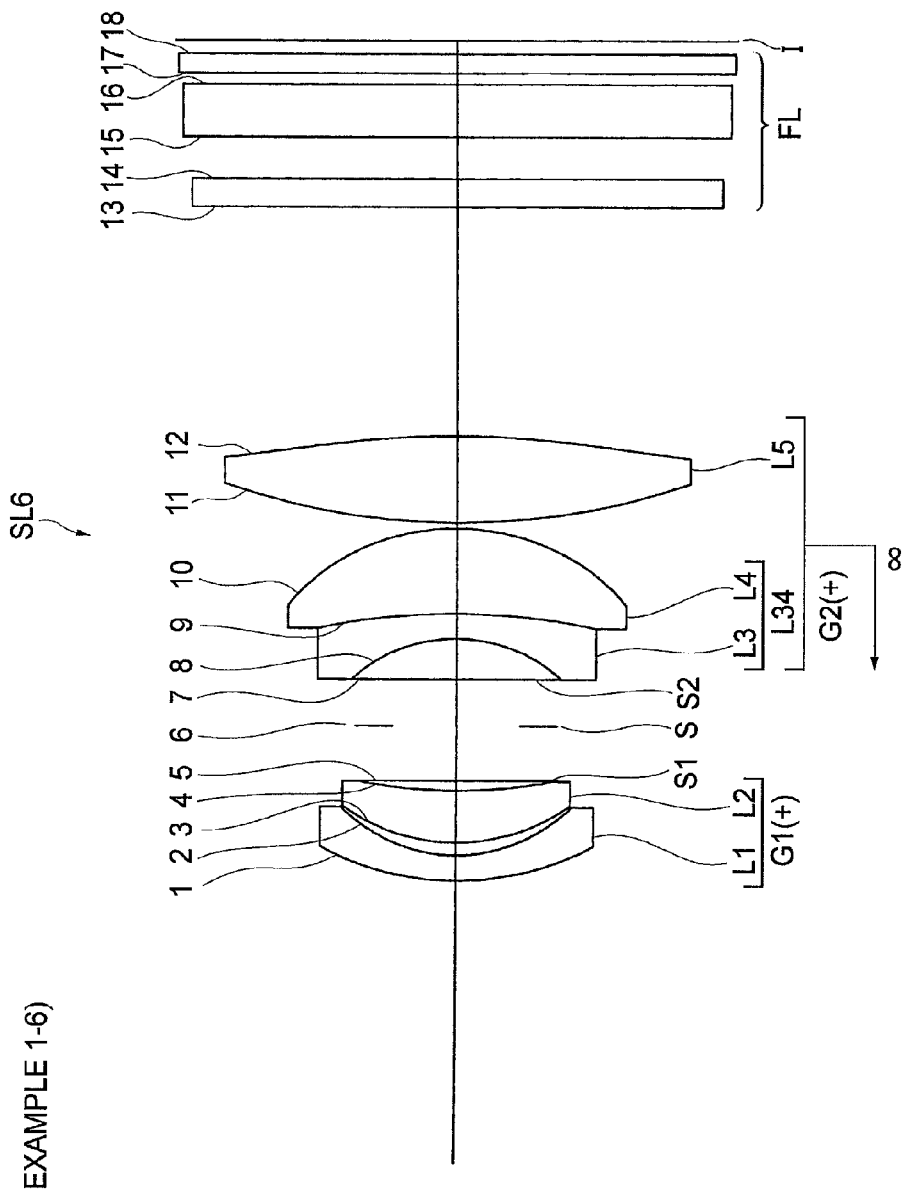

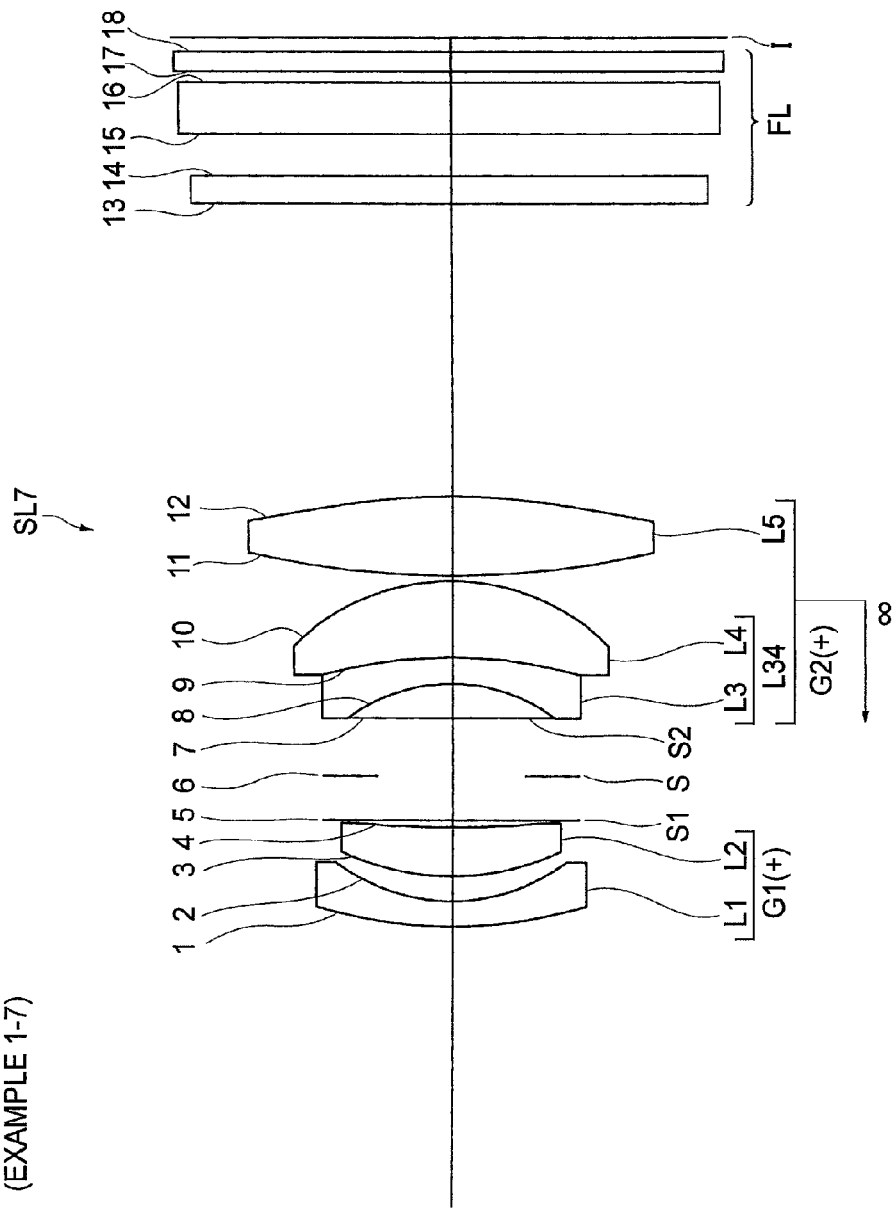

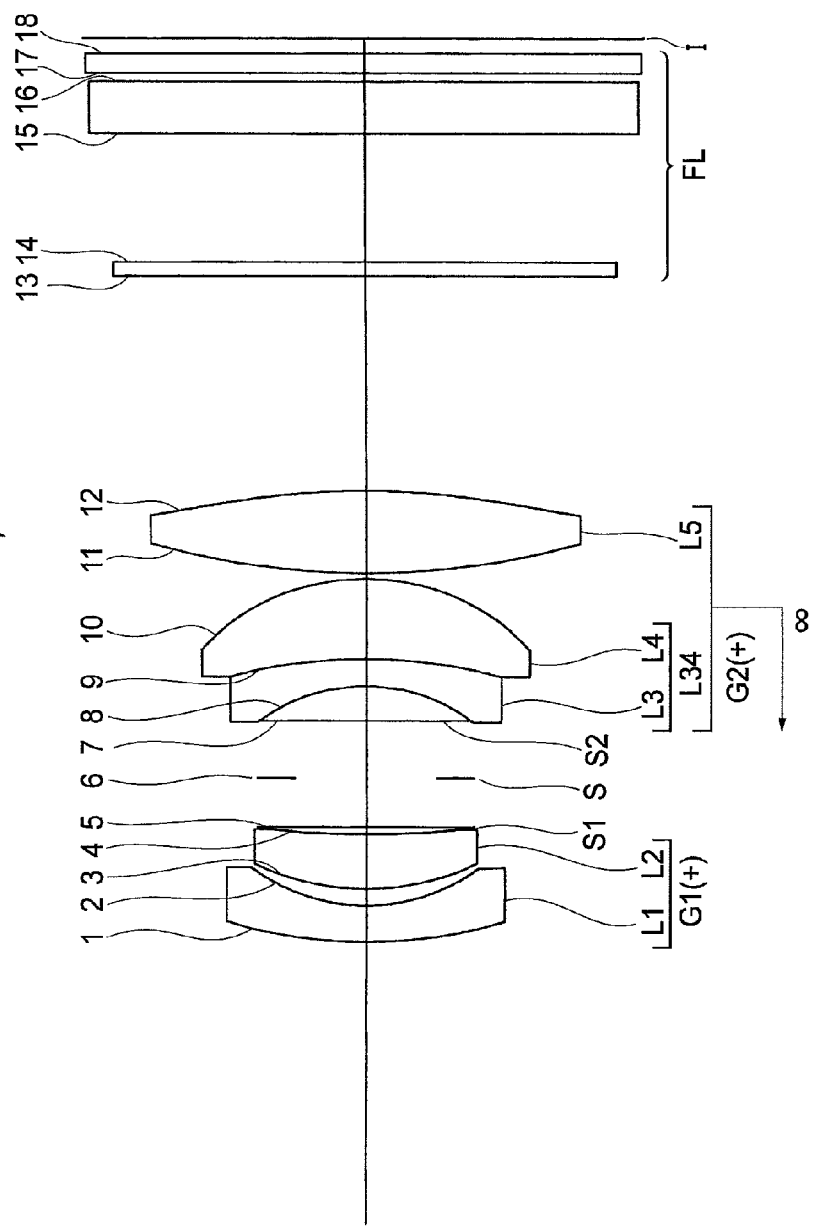

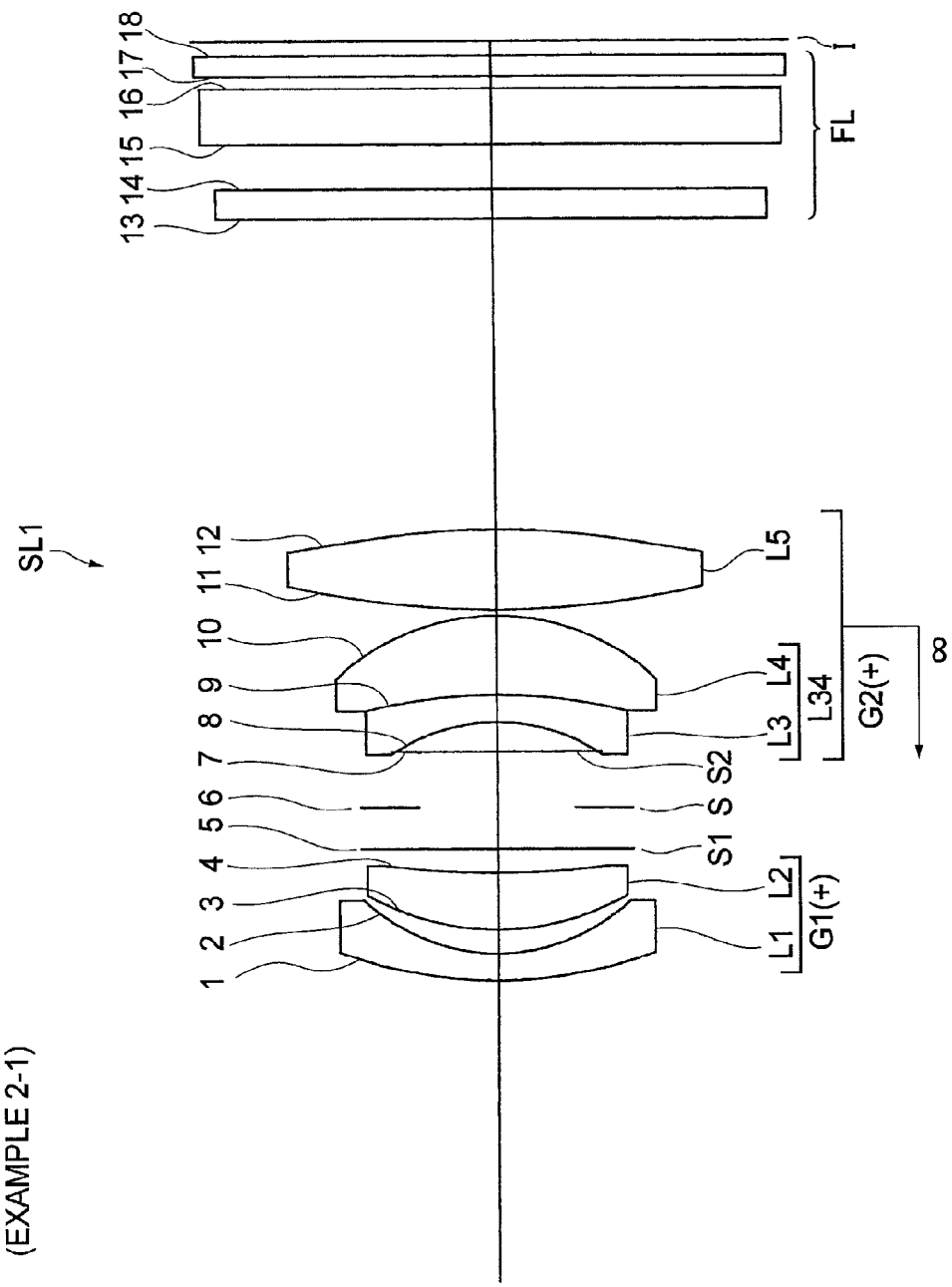

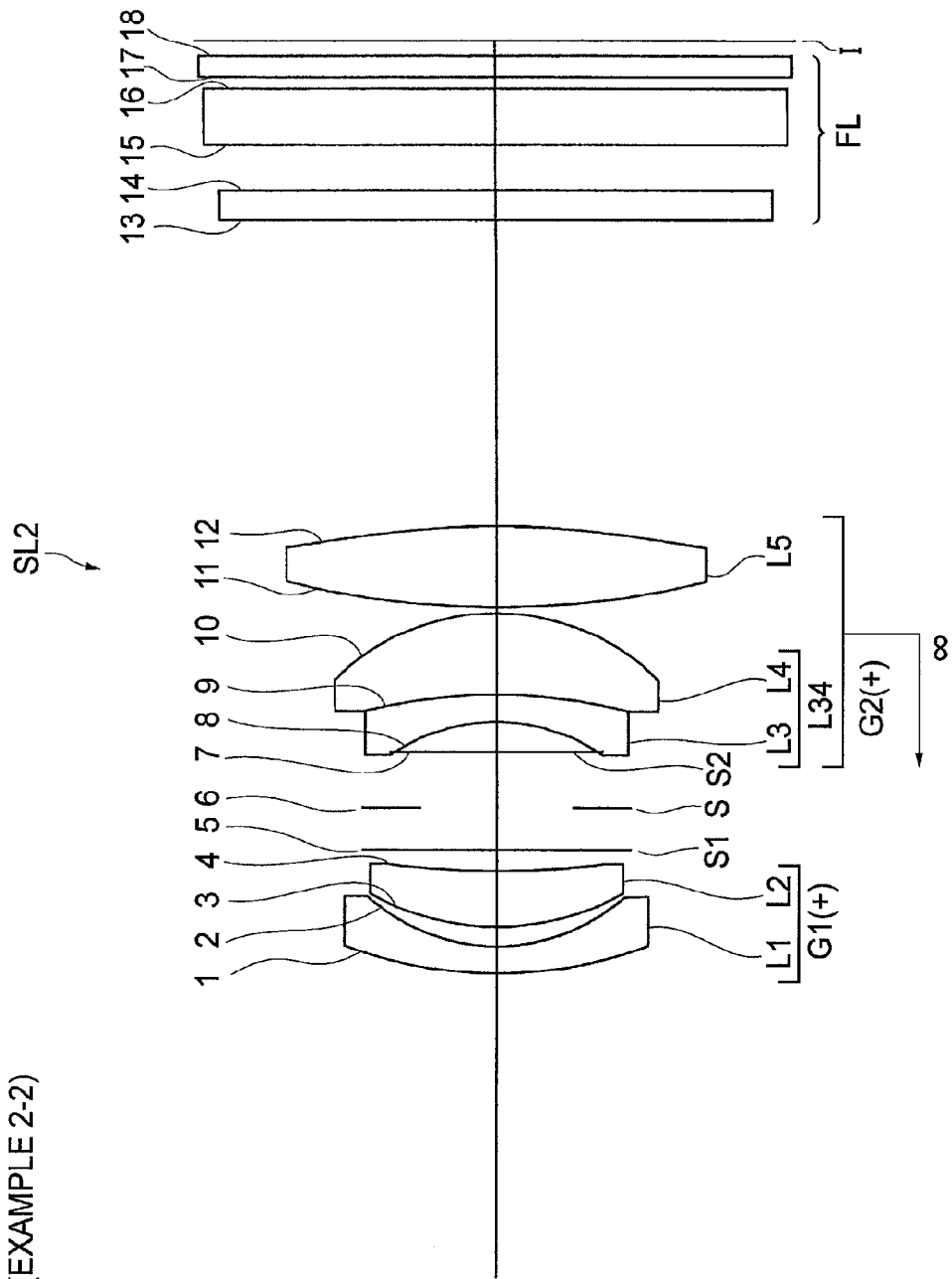

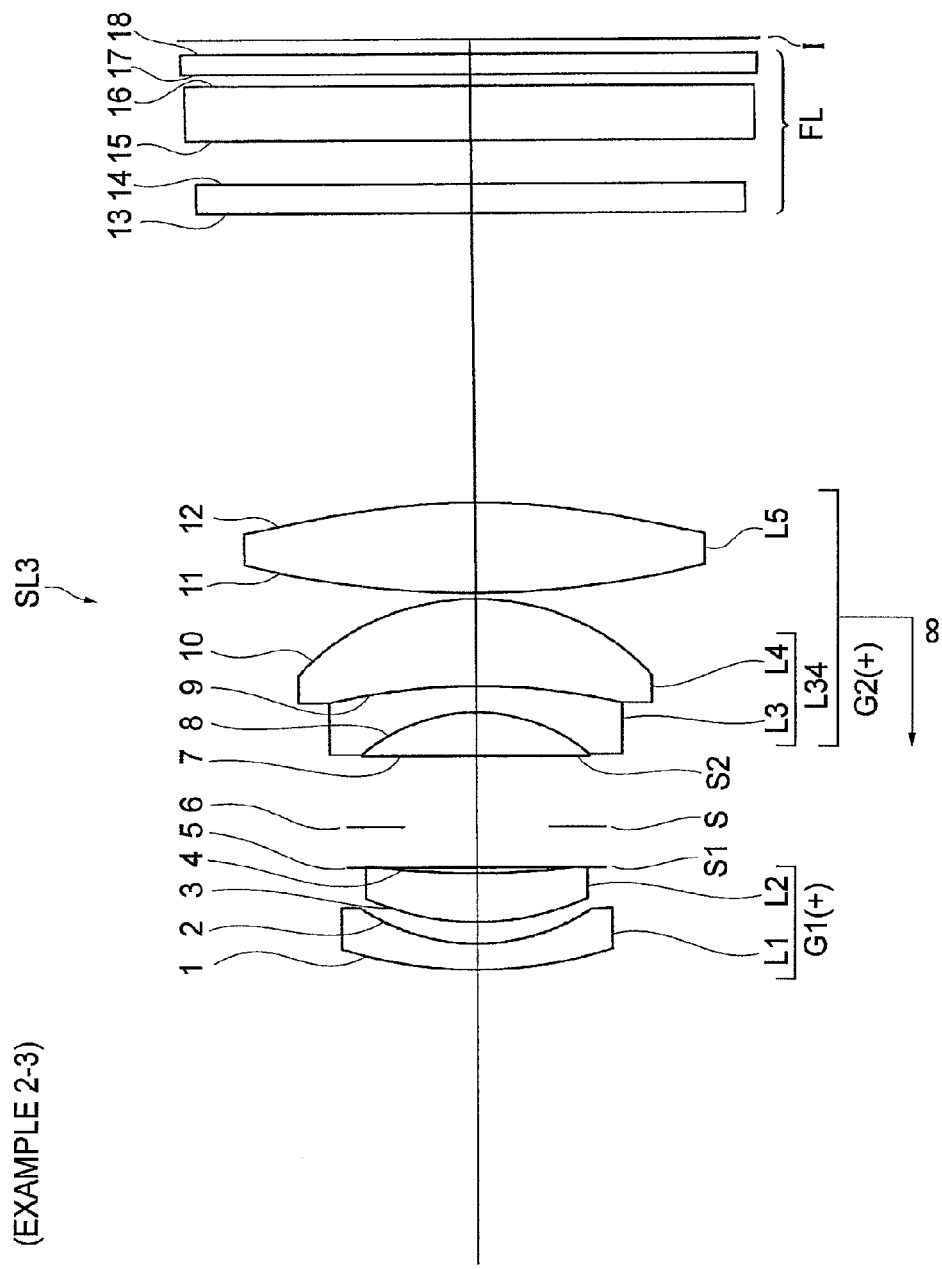

(EXAMPLE 2-4)

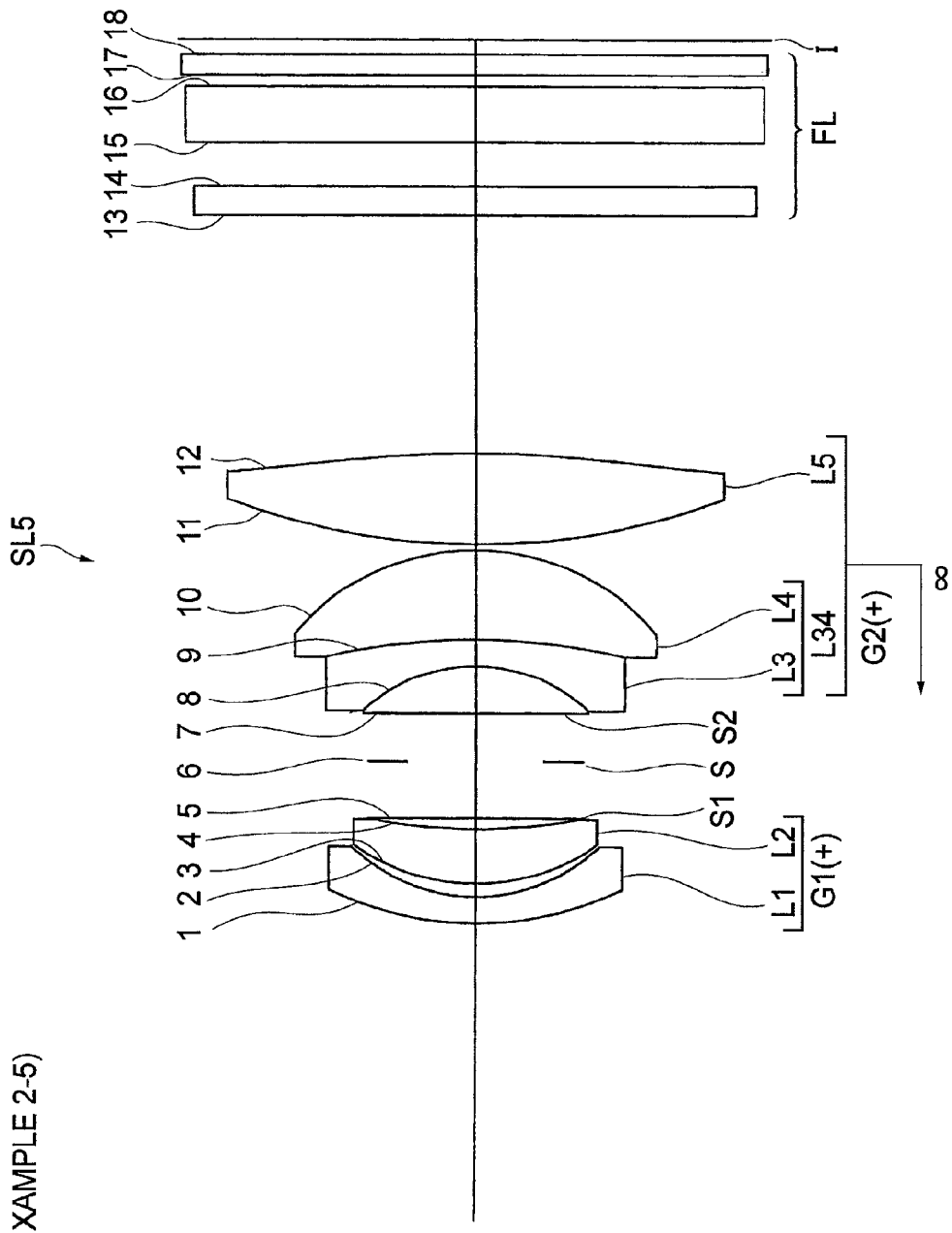

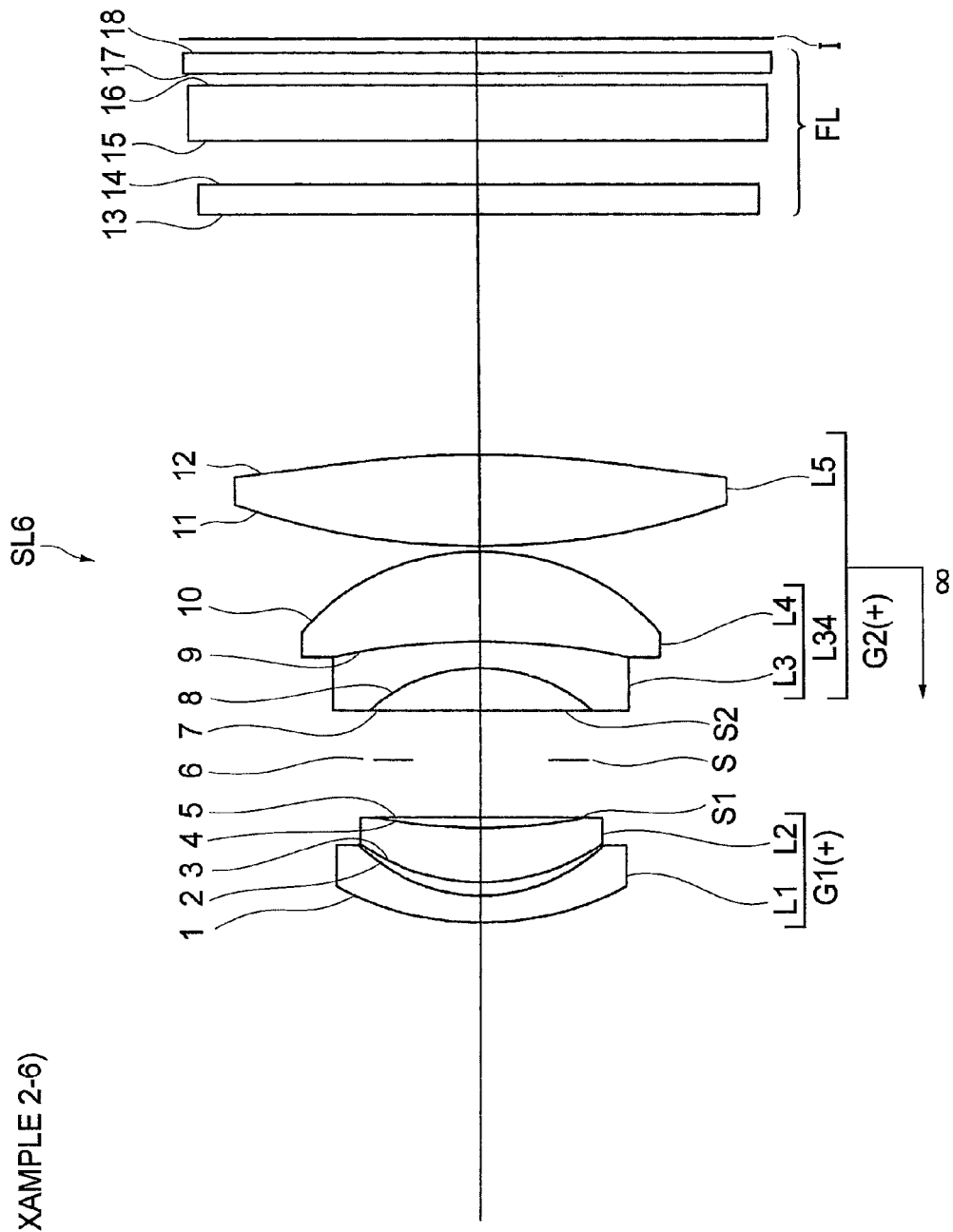

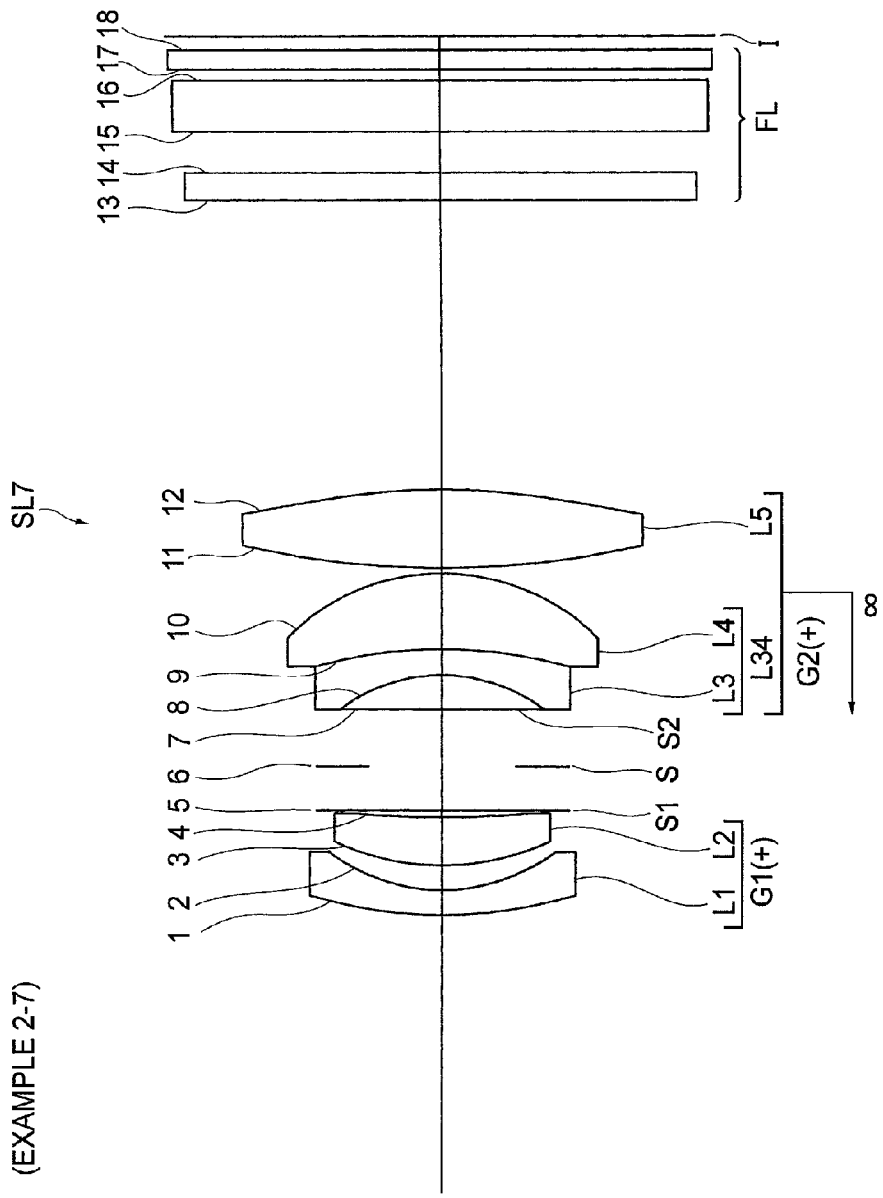

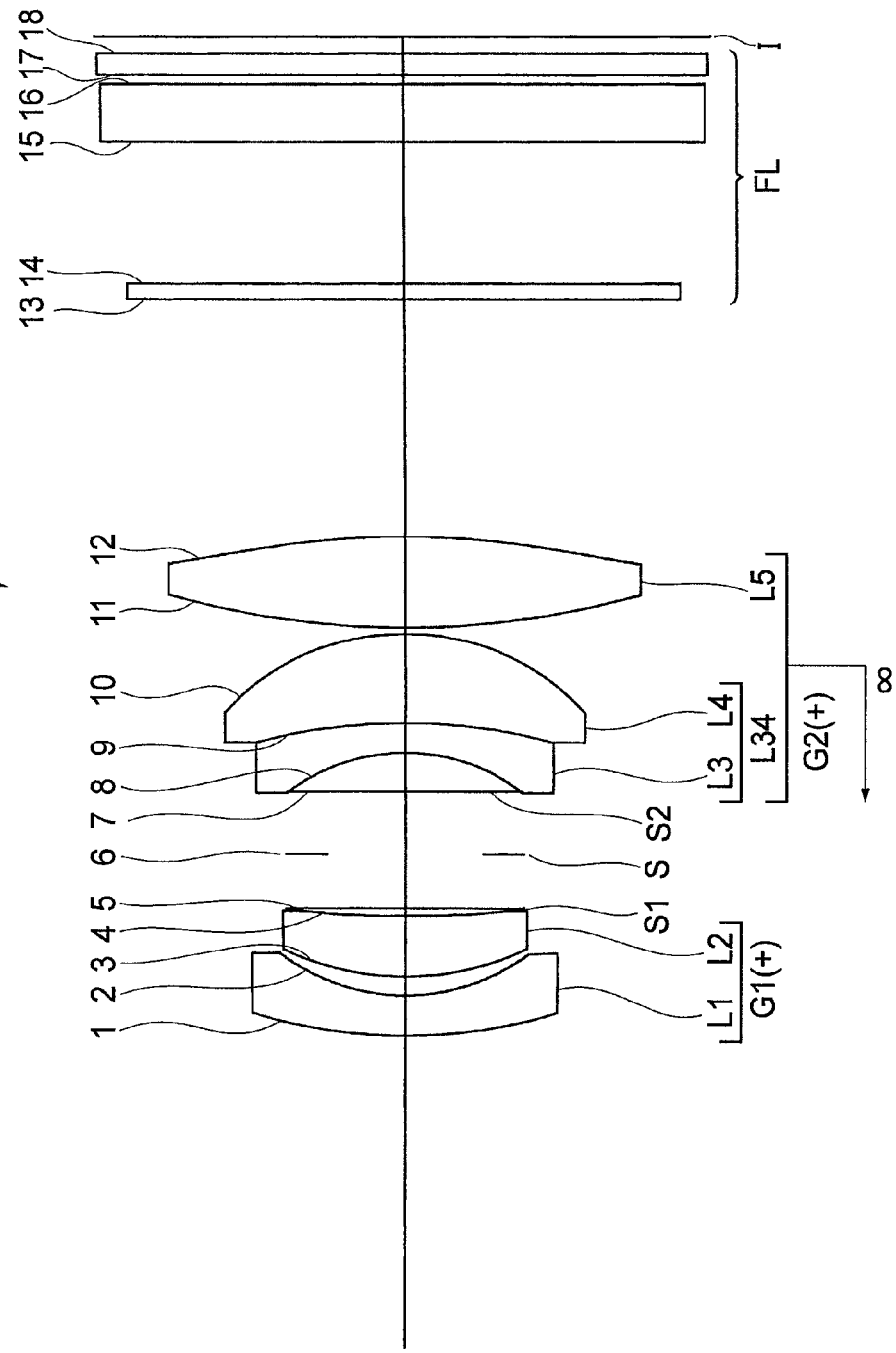

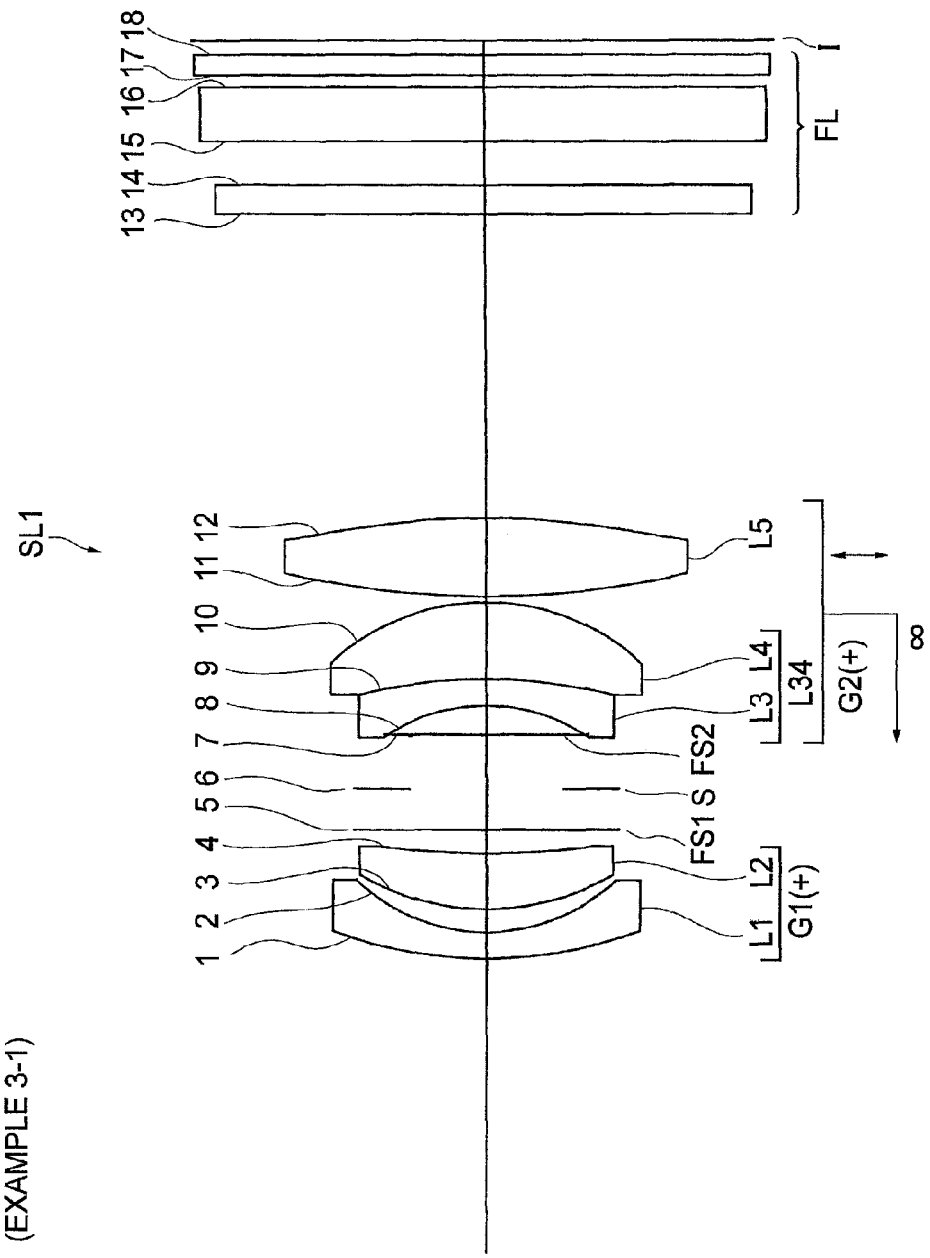

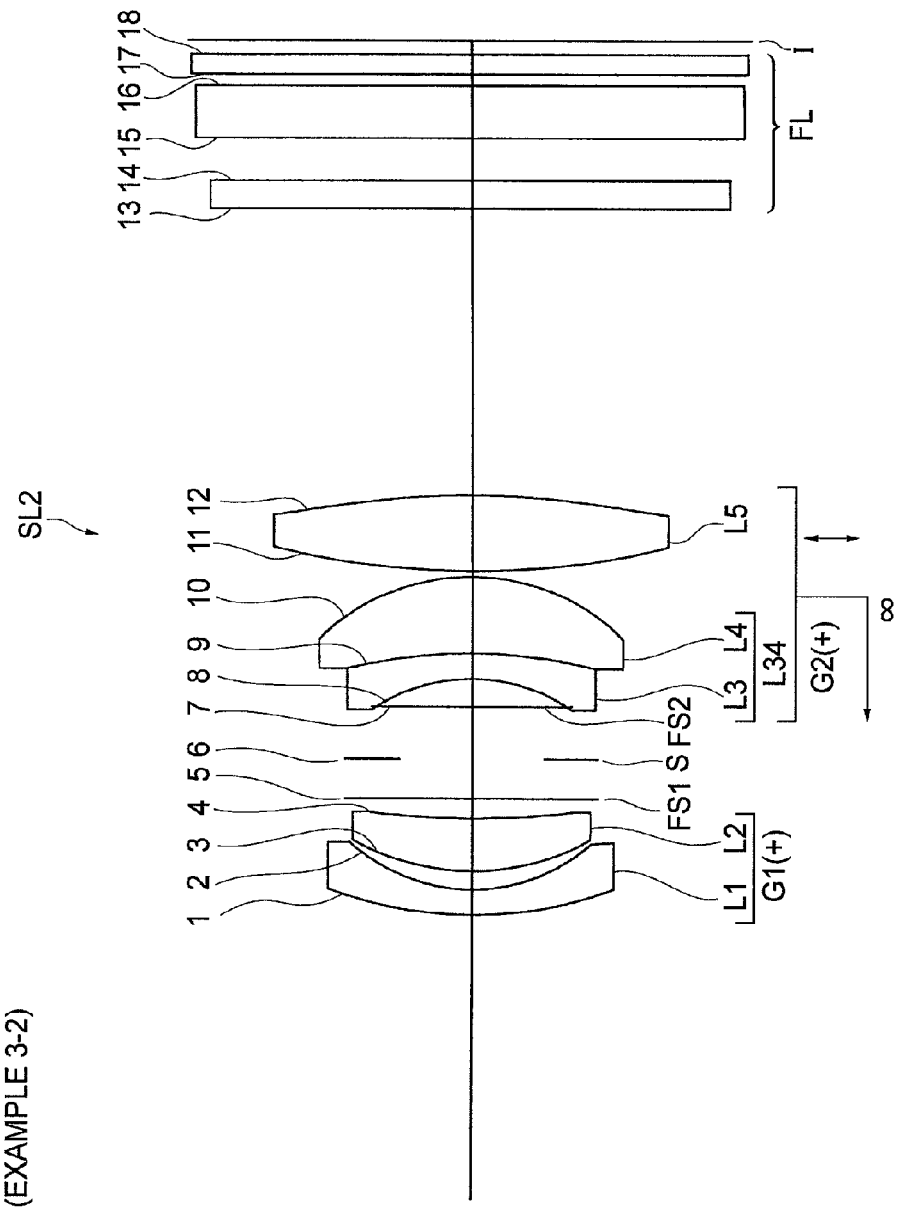

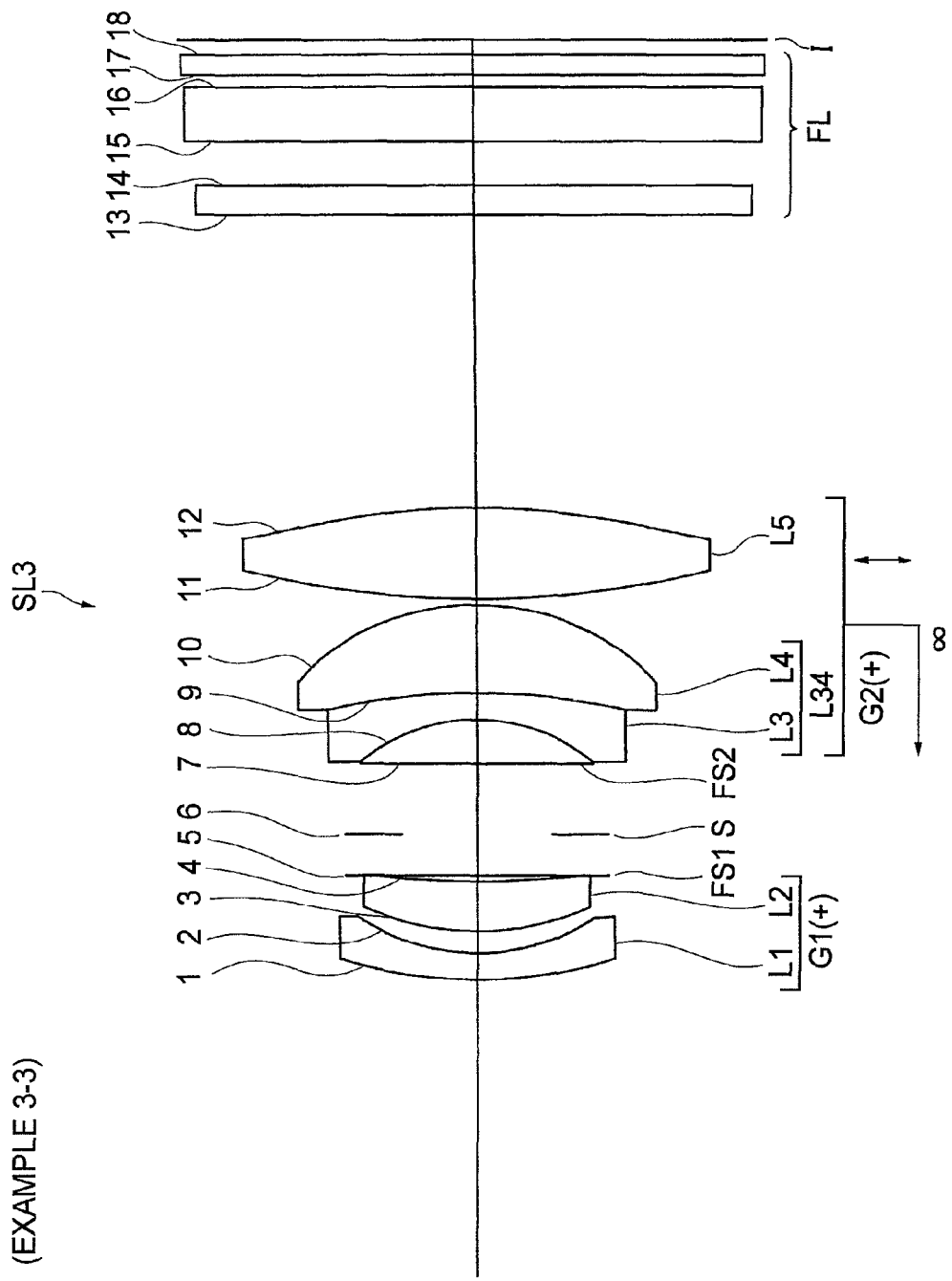

(EXAMPLE 3-4)

(EXAMPLE 3-5)

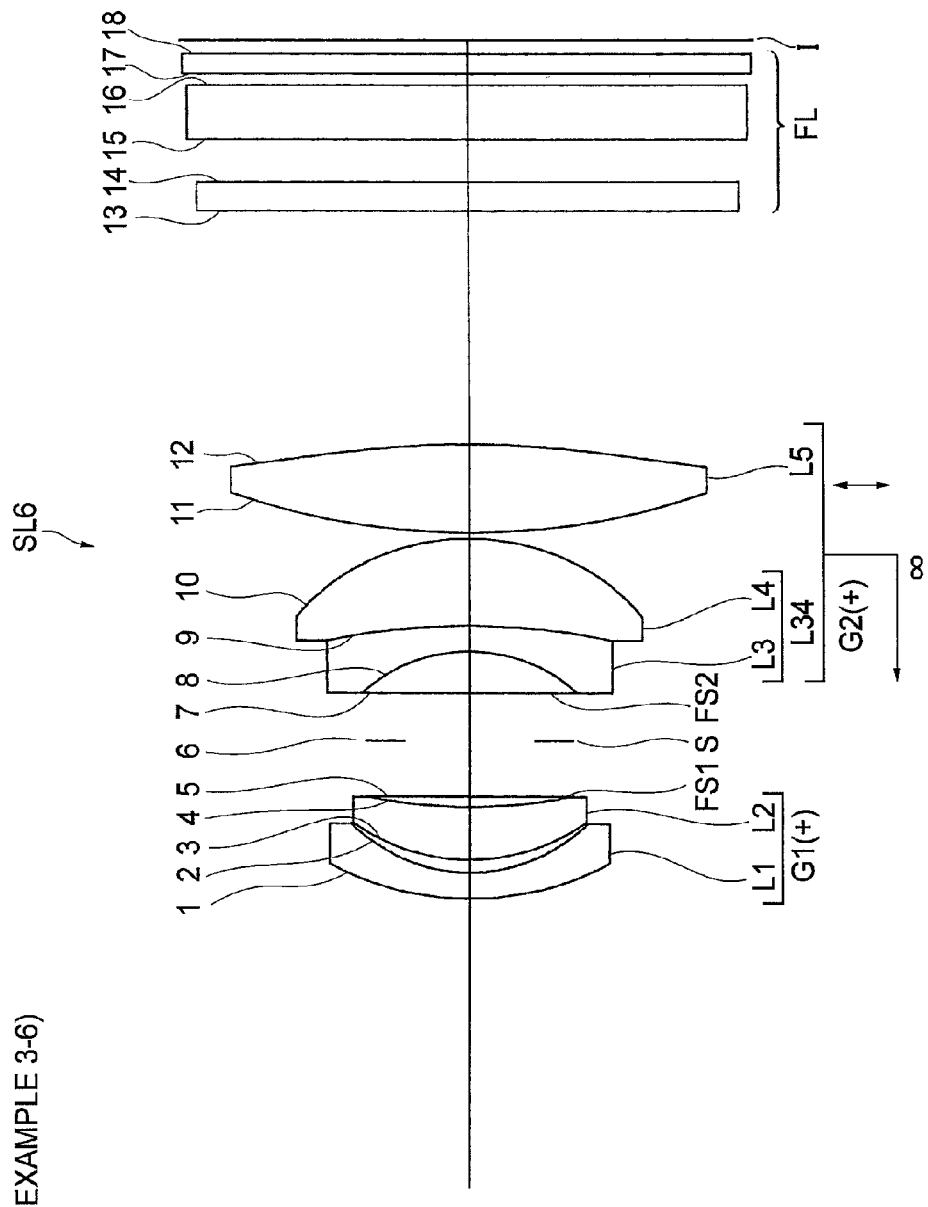

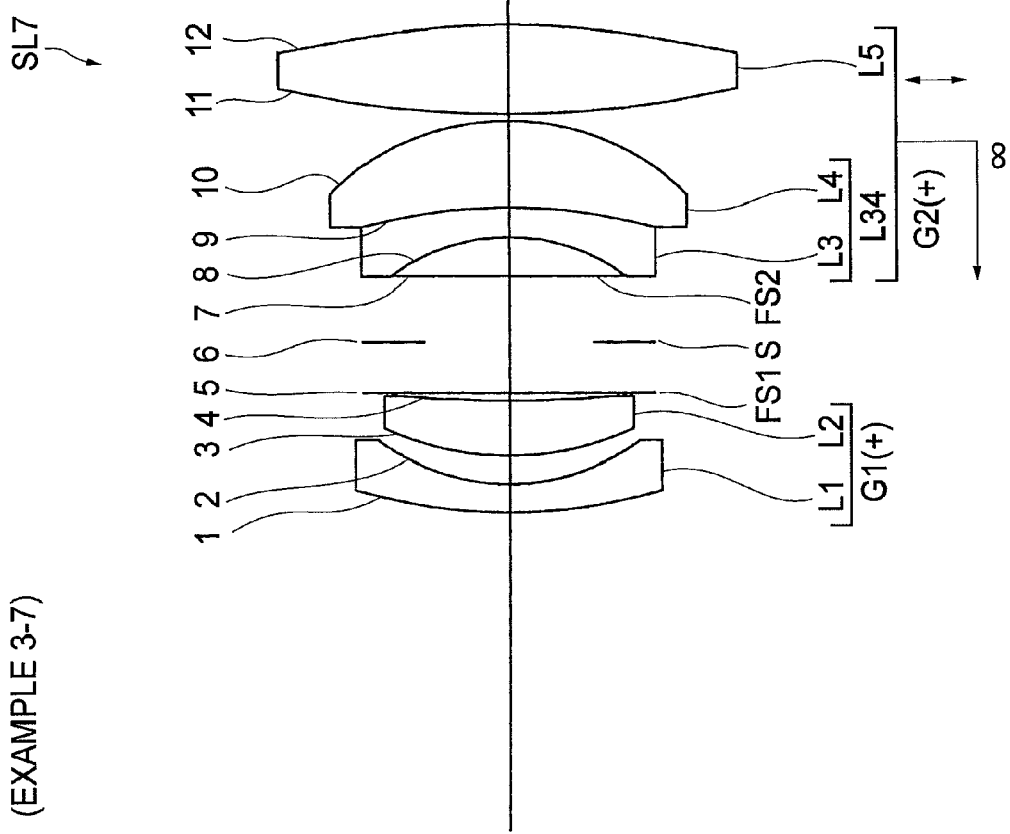
Fig.47 (EXAMPLE 3-7)

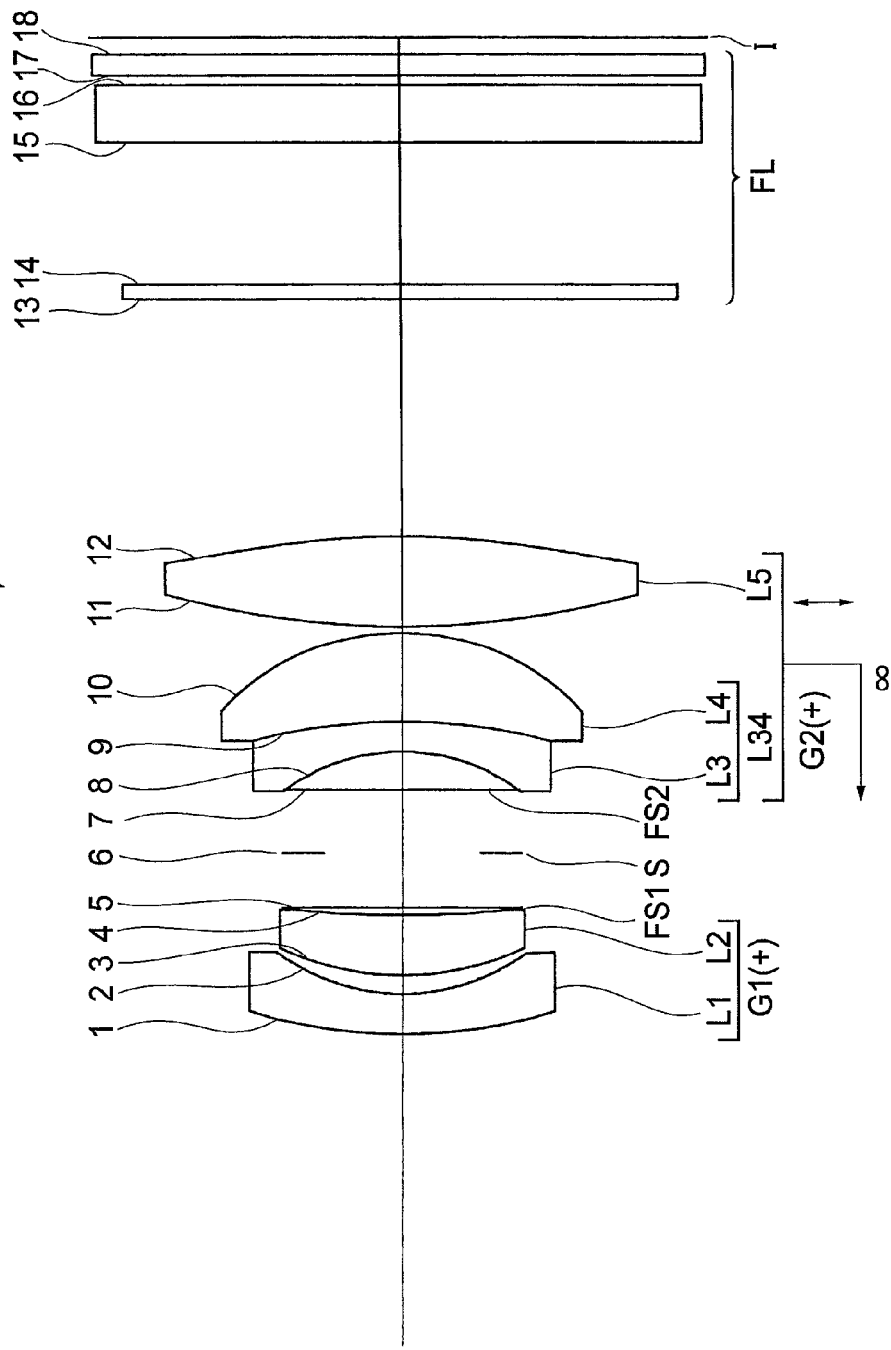

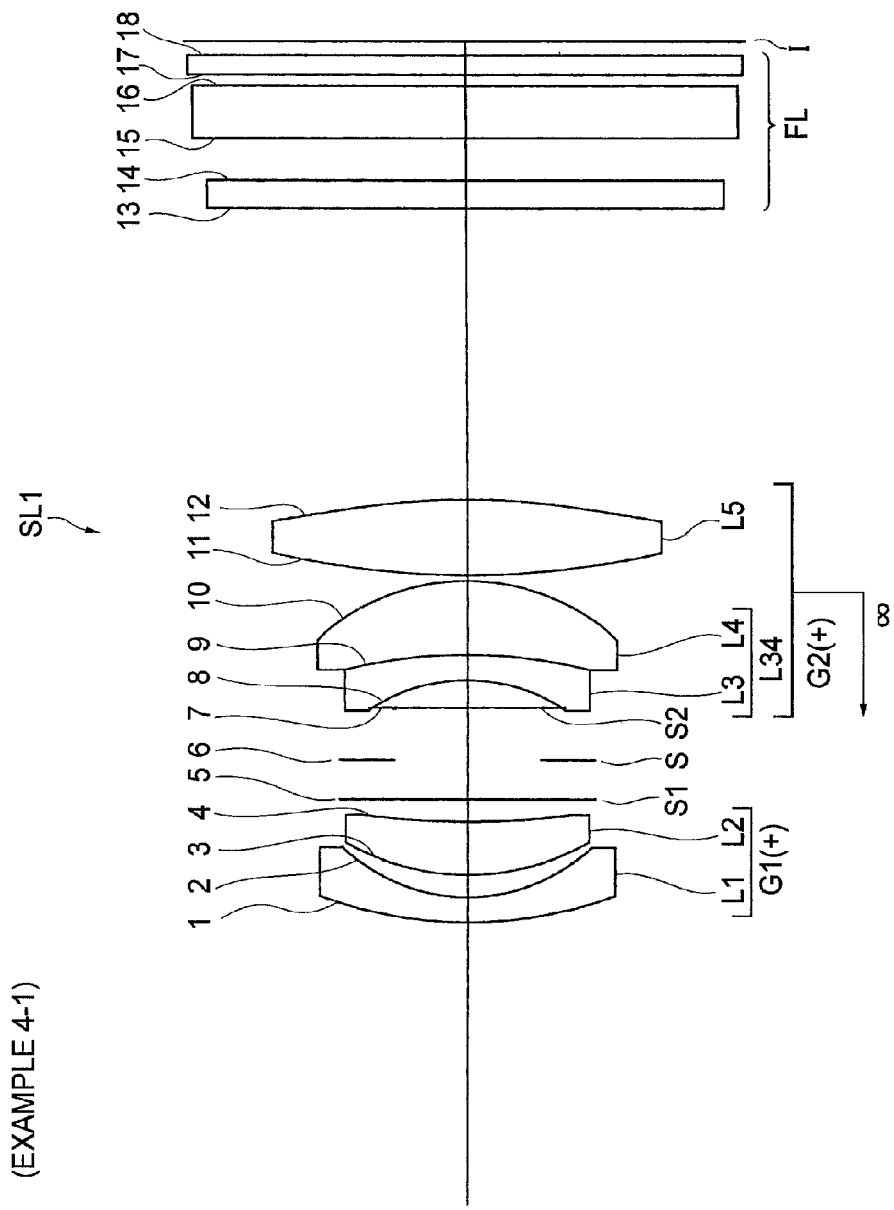

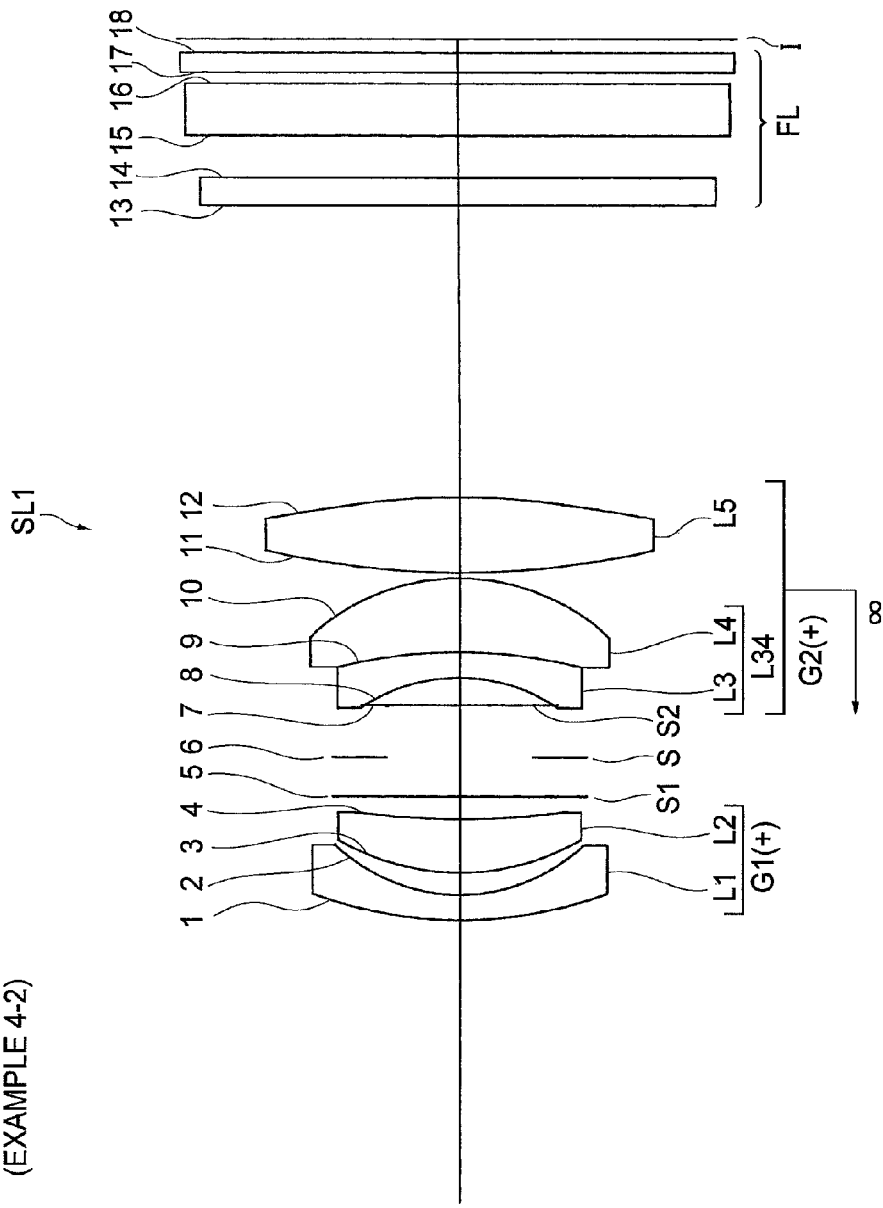
Fig.53 (EXAMPLE 4-2)

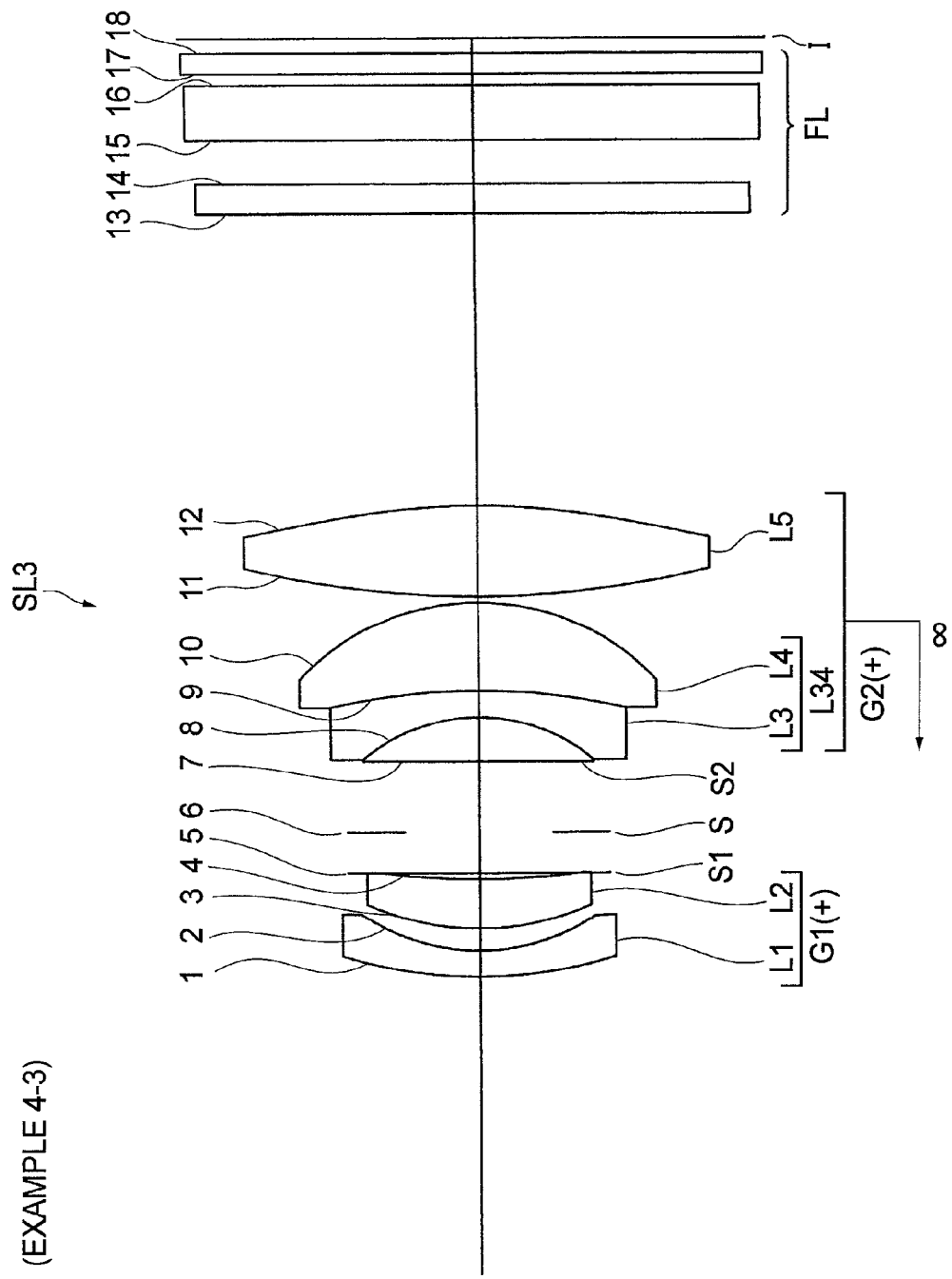

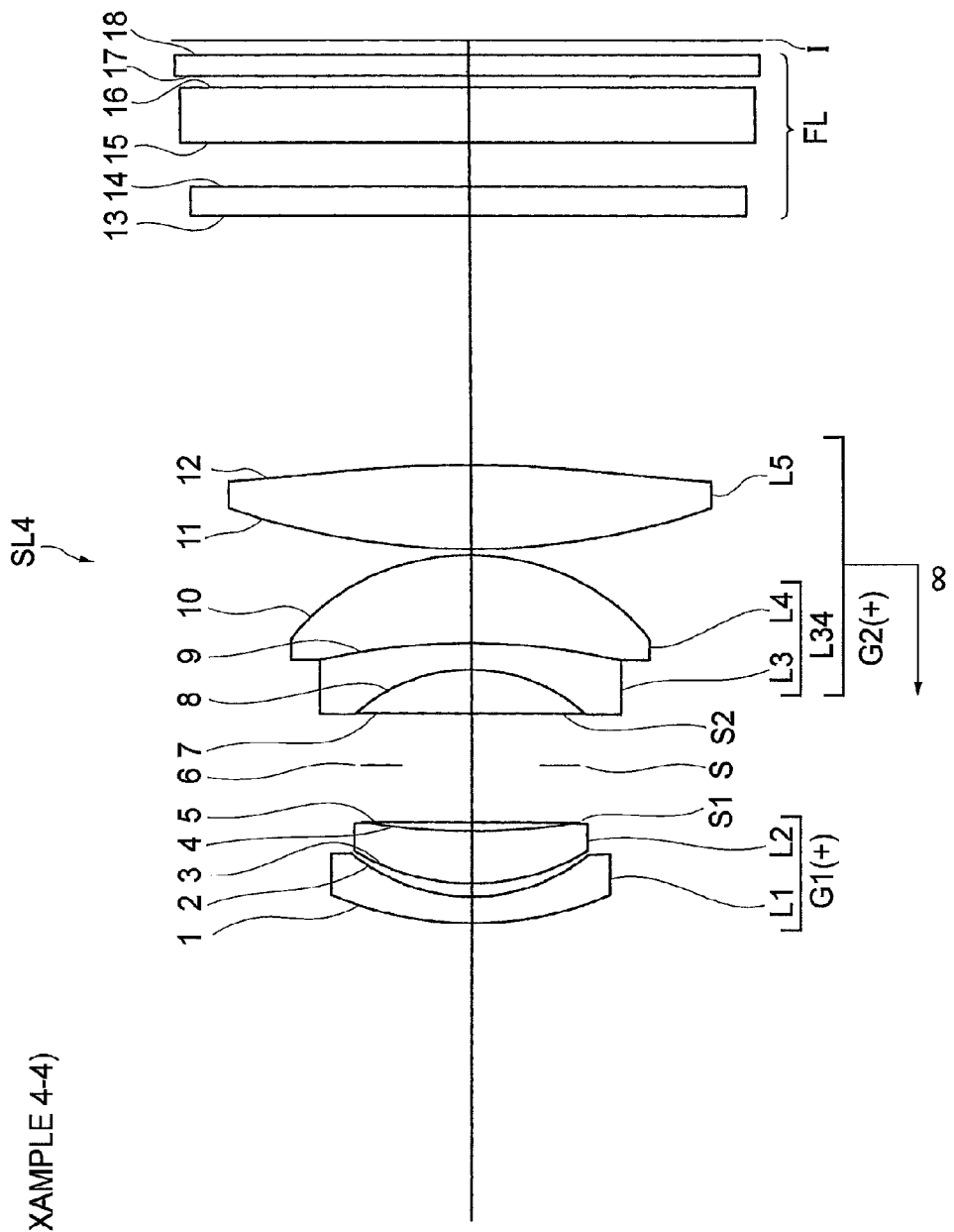

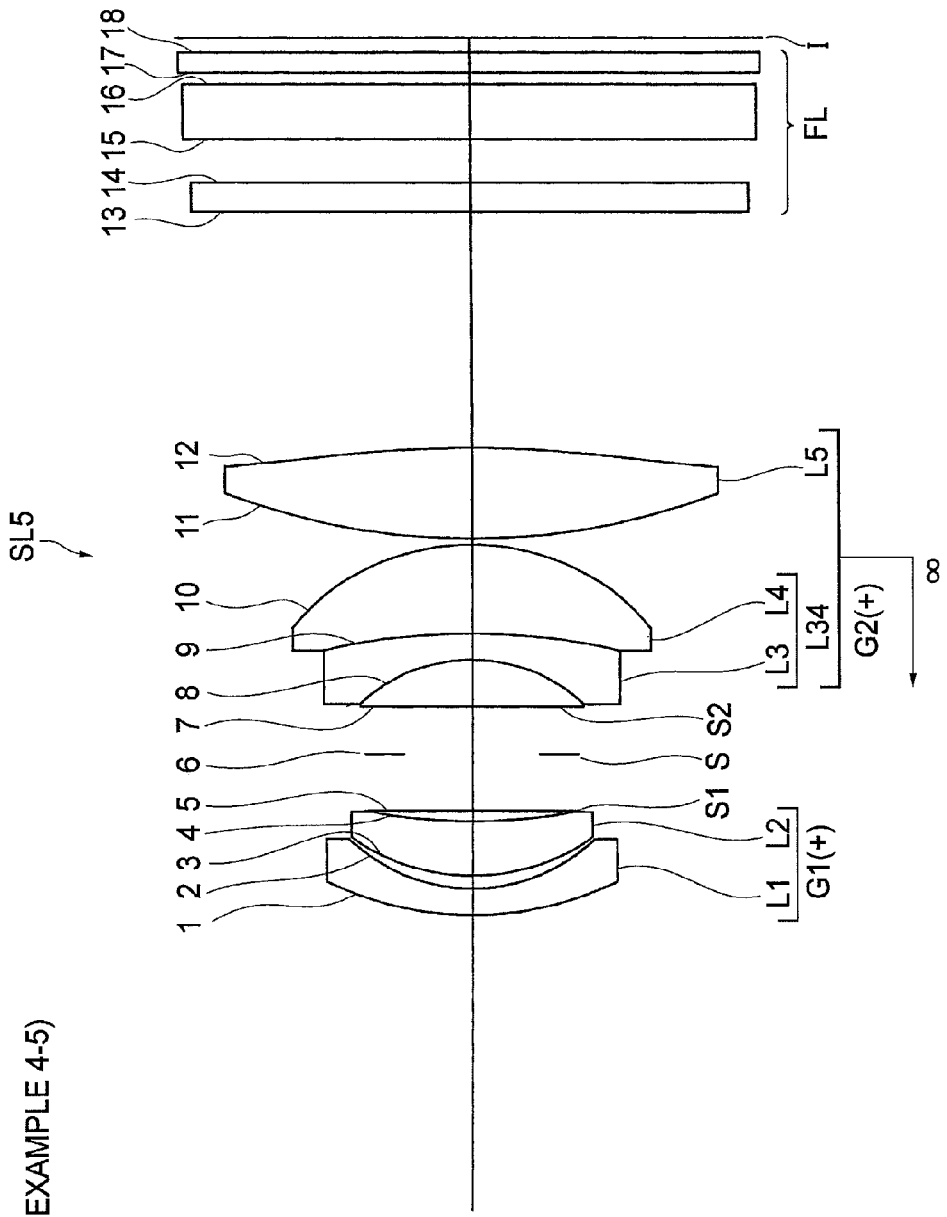

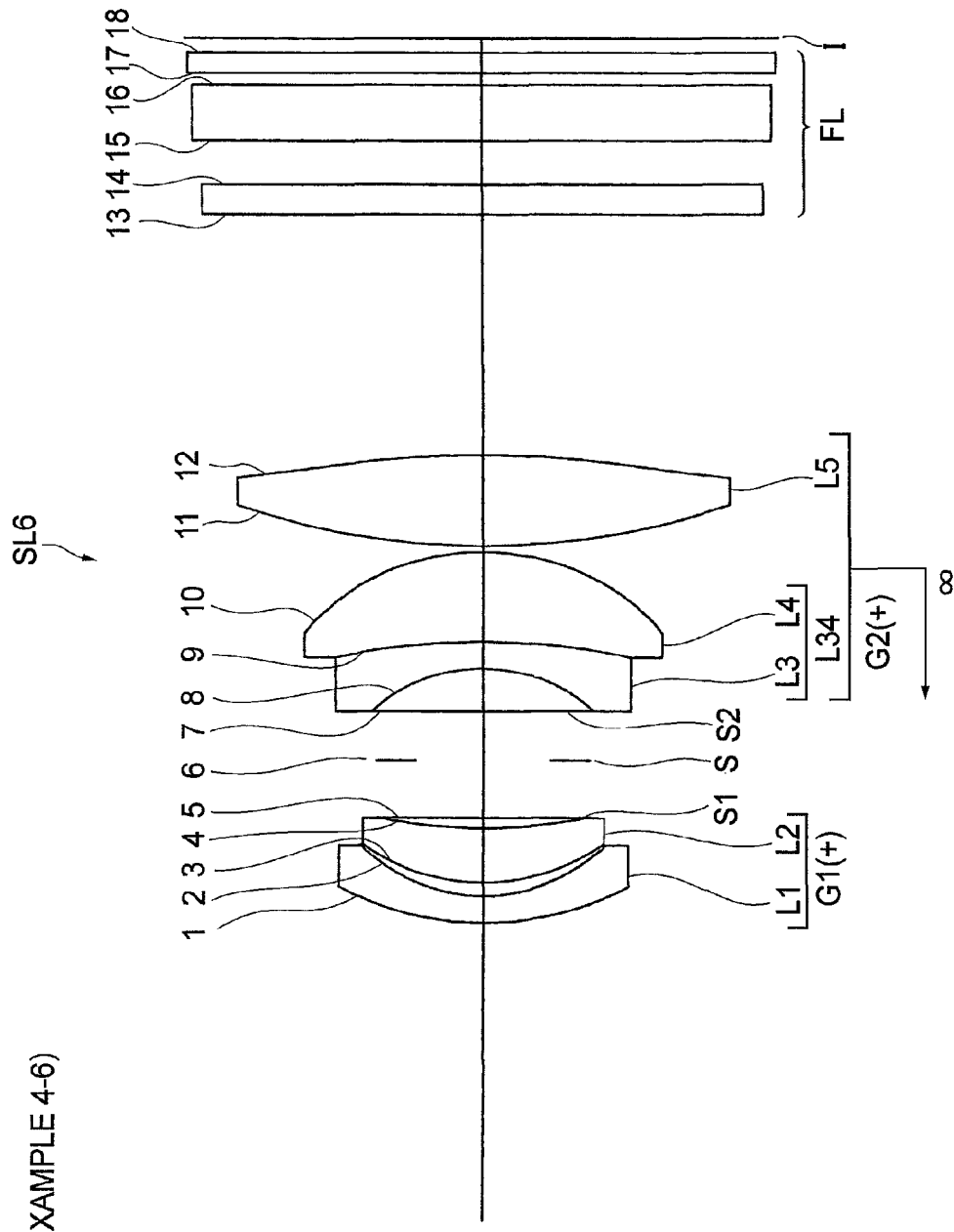

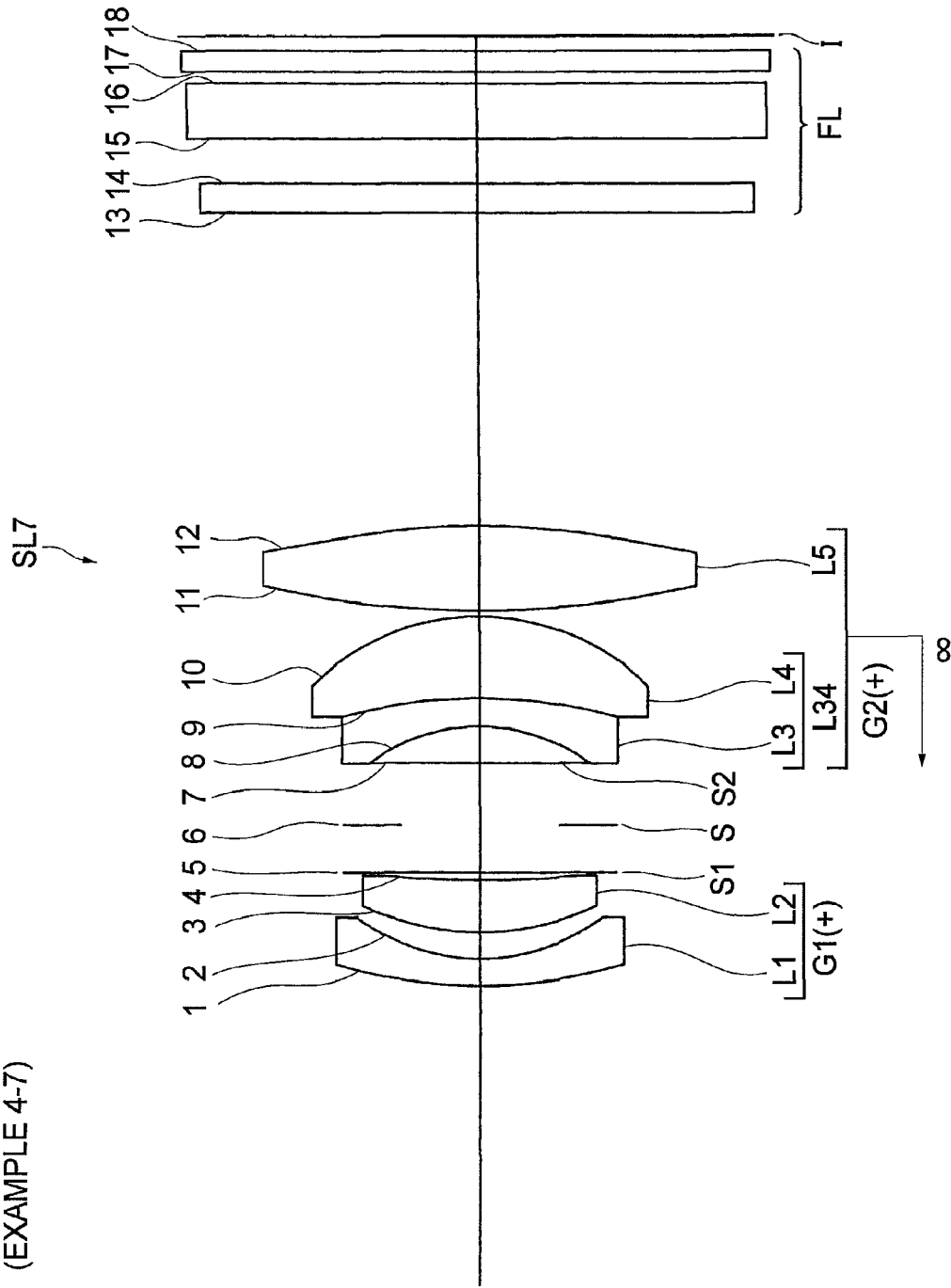

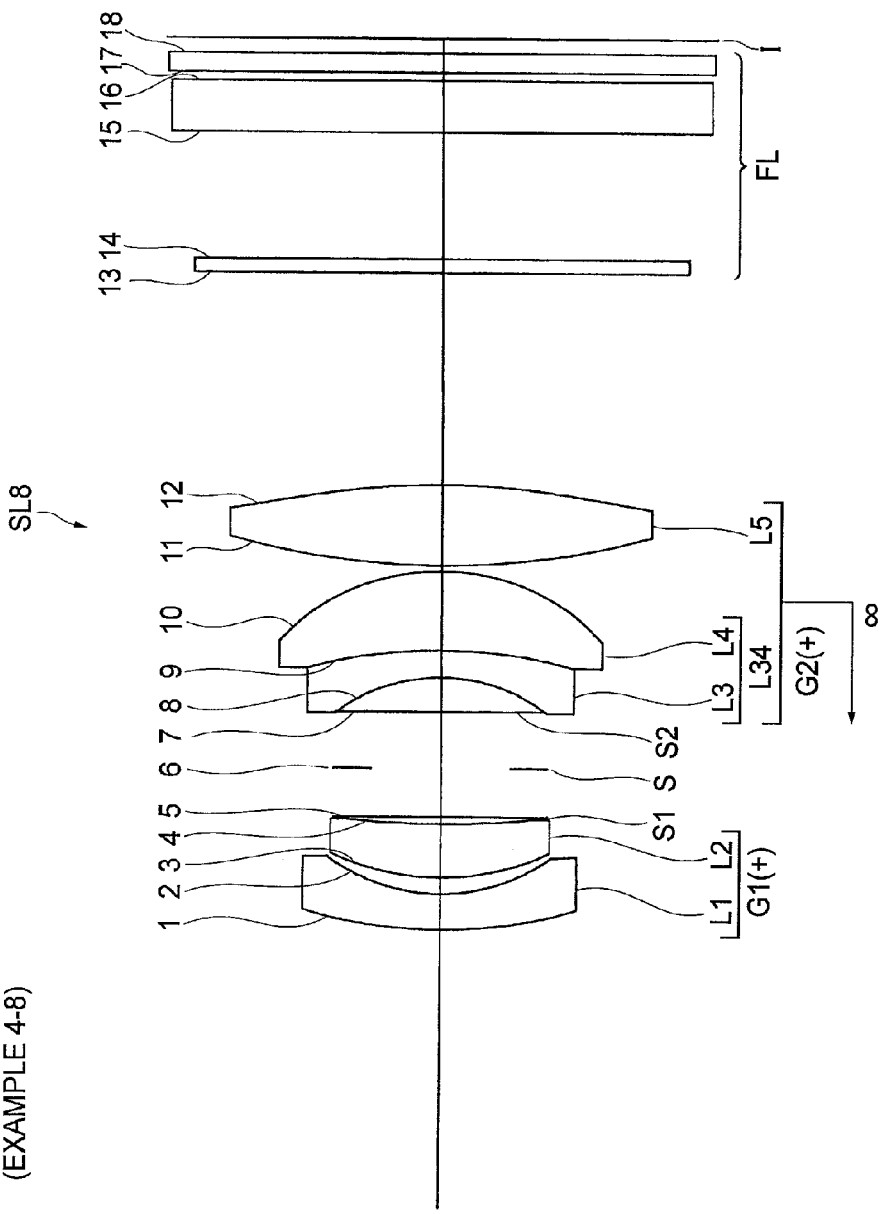

IMAGING LENS, OPTICAL APPARATUS AND METHOD FOR FORMING IMAGE USING THIS IMAGING LENS

CROSS-REFERENCE TO RELATED APPLICATION

This application is a division of application Ser. No. 12/421,323 filed Apr. 9, 2009 now U.S. Pat. No. 7,940,478. Also, this application claims the benefit of U.S. Provisional Application Nos. 61/044,235, 61/044,258, 61/044,375 and 61/044,387 filed Apr. 11, 2008. This application also claims the priority of Japanese Patent Applications No. 2008-103746, 2008-103747, 2008-103748 and 2008-103749 which is hereby incorporated by reference.

FIELD OF THE INVENTION

The present invention relates to an imaging lens which is suitable for a photographic camera and video camera, an optical apparatus, and a method for forming an image of an object using this imaging lens.

BACKGROUND OF THE INVENTION

As a compact lens used for a photograph camera and video camera, having about a 50° angle of view, and a relatively bright F number, an imaging lens having a first lens group comprised of a negative lens and a positive lens, and a second lens group comprised of a stop, a cemented lens of a negative lens and a positive lens, and a positive lens, have been available (e.g. Japanese Patent Application Laid-Open No. H9-189856).

On the other hand, along with the recent demand for smaller, slimmer and lighter cameras, holding a camera during actual use is becoming difficult, and shooting errors due to blur caused by a motion of the camera are increasing. A slight blur of a camera generated during shooting (e.g. blur of a camera generated when the user presses a release button) causes an image blur during exposure, and deteriorates the image quality.

To solve this problem, a known method for correcting an image blur is combining a detection system for detecting the blur caused by motion of a camera, a computing system to control a shift lens group according to a value which is output from the detection system, and a drive system for shifting the shift lens group, as an optical system which can shift an image of the imaging lens, and driving the shift lens group so as to compensate for the image blur caused by the motion of a camera.

SUMMARY OF THE INVENTION

In a conventional lens, however, if focusing is performed using the imaging lens, the total length of the lens becomes long when focus is adjusted on a close object. Another problem is that the correction of various aberrations during close up shooting is insufficient.

Also in the case of a conventional camera, it is difficult to implement both good correction of various aberrations and suppression of performance change during lens shift when an image blur is corrected.

It is an object of the present invention to provide a compact imaging lens which can correct various aberrations satisfactorily from infinity to a close object, and can implement high performance on an entire screen, and an optical apparatus and a method for forming an image of an object using this imaging lens.

It is another object of the present invention to provide a compact imaging lens which can correct various aberrations satisfactorily, and can minimize performance change during lens shift, and can implement high optical performance on an entire screen, and an optical apparatus and a method for forming an image of an object using this imaging lens.

Means to Solve the Problems

An imaging lens according to a first aspect of the present invention comprises an object side lens group having a positive refractive power, an aperture stop, and an image side lens group having a positive refractive power which are disposed in order from an object, wherein the object side lens group comprises a first lens component having a negative refractive power and a second lens component having a positive refractive power, which are disposed in order from the object, and conditions expressed by the following expressions $0.12<f/f1<0.47$ and $0.016<D12/f<0.079$ are satisfied, where f1 is a focal length of the object side lens group, f is a focal length of the imaging lens, and D12 is an air distance between the first lens component and the second lens component of the object side lens group.

It is preferable that the object side lens group comprises the first lens component made of a negative meniscus lens having a convex surface facing the object, and the second lens component made of a positive meniscus lens having a convex surface facing the object, which are disposed in order from the object.

It is also preferable that a condition expressed by the following expression $nd1>1.65$ is satisfied, where nd1 is a refractive index of the first lens component of the object side lens group on the d-line.

It is also preferable that a condition expressed by the following expression $3.8<(r2F+r1R)/(r2F-r1R)<11.8$ is satisfied, where r1R is a radius of curvature of an image side lens surface of the first lens component, and r2F is a radius of curvature of an object side lens surface of the second lens component.

It is also preferable that the image side lens group comprises a biconvex positive lens, and the biconvex positive lens includes at least one aspherical surface.

An imaging lens according to a second aspect of the present invention comprises an object side lens group having a positive refractive power, an aperture stop, and an image side lens group having a positive refractive power, which are disposed in order from an object, wherein the object side lens group further comprises a plurality of lenses, the image side lens group further comprises a cemented lens of a negative lens component having a concave surface facing the object and a positive lens component having a convex surface facing the image, and a biconvex positive lens component, which are disposed in order from the object, and a condition expressed by the following expression $3.0<TL/Ymax<4.0$ is satisfied, where TL is a total length of the imaging lens, and Ymax is a maximum image height.

It is preferable that a condition expressed by the following expression $1.7<TL/\Sigma d<2.2$ is satisfied, where TL is a total length of the imaging lens, and $\Sigma d$ is a length on the optical axis, from a lens surface closest to the object in the object side lens group to a lens surface closest to the image in the image side lens group.

It is also preferable that the image side lens group comprises a cemented lens of a negative meniscus lens having a concave surface facing the object and a positive meniscus lens having a convex surface facing the image, and a biconvex positive lens, which are disposed in order from the object.

An Imaging lens according to a third aspect of the present invention comprises an object side lens group having a positive refractive power and an image side lens group having a positive refractive power with an air distance from the object side lens group, which are disposed in order from the object, wherein the image side lens group further comprises a cemented lens of a negative lens component having a concave surface facing the object and a positive lens component having a convex surface facing the image, and a biconvex positive lens component, which are disposed in order from the object, and all or a part of the image side lens group can be shifted in a direction substantially perpendicular to the optical axis as a shift lens group.

It is preferable that a condition expressed by the following expression $0.80 < f/fS < 1.10$ is satisfied, where f is a focal length of the imaging lens, and fS is a focal length of the shift lens group.

It is also preferable that a condition expressed by the following expression $0.13 < f2/f1 < 0.47$ is satisfied, where f1 is a focal length of the object side lens group, and f2 is a focal length of the image side lens group.

It is also preferable that an aperture stop is disposed between the object side lens group and the image side lens group.

It is also preferable that the focus on a close object is adjusted by moving the image side lens group toward the object.

An imaging lens according to a fourth aspect of the present invention comprises an object side lens group having a positive refractive power, an aperture stop, and an image side lens group having a positive refractive power which are disposed in order from an object, wherein the object side lens group comprises a negative lens component and a positive lens component, which are disposed in order from the object, the image side lens group comprises a cemented lens of a negative lens component and a first positive lens component, and a second positive lens component, which are disposed in order from the object, and conditions expressed by the following expressions $nd5 < 1.67$ and $vd5 > 50.0$ are satisfied, where nd5 is a refractive index of the second positive lens component of the image side lens group on the d-line, and vd5 is an Abbe number of the second positive lens component of the image side lens group on the d-line.

It is preferable that a condition expressed by the following expression $-0.30 < (r5R+r5F)/(r5R-r5F) < 0.40$ is satisfied, where r5F is a radius of curvature of an object side lens surface of the second positive lens component of the image side lens group, and r5R is a radius of curvature of an image side lens surface of the second positive lens component of the image side lens group.

It is preferable that a condition expressed by the following expression $0.60 < f/f5 < 0.90$ is satisfied, where f is a focal length of the imaging lens, and f5 is a focal length of the second positive lens component of the image side lens group.

It is also preferable that the negative lens component of the object side lens group includes at least one aspherical surface.

It is also preferable that the image side lens group includes at least one aspherical surface.

An optical apparatus according to the present invention comprises an imaging lens that forms an image of an object on a predetermined image surface, wherein the imaging lens is the above mentioned imaging lens.

A method for manufacturing an imaging lens according to a first aspect of the present invention, comprises the steps of: assembling an object side lens group having a positive refractive power, an aperture stop, and an image side lens group having a positive refractive power in a lens barrel in order from an object; configuring the object side lens group by disposing a first lens component having a negative refractive power and a second lens component having a positive refractive power in order from the object when the step of assembling is performed, wherein a condition expressed by the following expressions $0.12 < f/f1 < 0.47$ and $0.016 < D12/f < 0.079$ are satisfied, where f1 is a focal length of the object side lens group, f is a focal length of an imaging lens, and D12 is an air distance between the first lens component and the second lens component of the object side lens group.

In this case, it is preferable that the object side lens group comprises the first lens component made of a negative meniscus lens having a convex surface facing the object, and the second lens component made of a positive meniscus lens having a convex surface facing the object, which are disposed in order from the object.

It is also preferable that a condition expressed by the following expression $nd1 > 1.65$ is satisfied, where nd1 is a refractive index of the first lens component of the object side lens group on the d-line.

It is also preferable that a condition expressed by the following expression $3.8 < (r2F+r1R)/(r2F-r1R) < 11.8$ is satisfied, where r1R is a radius of curvature of an image side lens surface of the first lens component, and r2F is a radius of curvature of an object side lens surface of the second lens component.

It is also preferable that the image side lens group comprises a biconvex positive lens, and the biconvex positive lens includes at least one aspherical surface.

A method for manufacturing an imaging lens according to a second aspect of the present invention, comprises the steps of: assembling an object side lens group having a positive refractive power, an aperture stop, and an image side lens group having a positive refractive power, in a lens barrel in order from an object; configuring the object side lens group by disposing a plurality of lenses when the step of assembling is performed; and configuring the image side lens group by disposing a cemented lens of a negative lens component having a concave surface facing the object and a positive lens component having a convex surface facing the image, and a biconvex positive lens component, in order from the object when the step of assembling is performed, wherein a condition expressed by the following expression $3.0 < TL/Ymax < 4.0$ is satisfied, where TL is a total length of the imaging lens, and Ymax is a maximum image height.

In this manufacturing method, it is preferable that a condition expressed by following expression $1.7 < TL/\Sigma d < 2.2$ is satisfied, where TL is a total length on the optical axis, from the imaging lens, and $\Sigma d$ is a length of a lens surface closest to the object in the object side lens group to a lens surface closest to the image in the image side lens group.

It is also preferable that the image side lens group further comprises a cemented lens of a negative meniscus lens having a concave surface facing the object and a positive meniscus lens having a convex surface facing the image, and a biconvex positive lens, which are disposed in order from the object.

A method for manufacturing an imaging lens according to a third aspect of the present invention, comprises the steps of: assembling an object side lens group having a positive refractive power and an image side lens group having a positive refractive power with an air distance from the object side lens group in a lens barrel in order from the object side; configuring the image side lens group by disposing a cemented lens of a negative lens component having a concave surface facing the object and a positive lens component having a convex surface facing the image, and a biconvex positive lens component in order from the object when the step of assembling is performed; and assembling all or a part of the image side lens group as a shift lens group to be shifted in a direction substantially perpendicular to the optical axis is possible.

In this manufacturing method, it is preferable that a condition expressed by the following expression $0.80<f/fS<1.10$ is satisfied, where f is a focal length of the imaging lens, and fS is a focal length of the shift lens group.

It is also preferable that a condition expressed by the following expression $0.13<f2/f1<0.47$ is satisfied, where f1 is a focal length of the object side lens group, and f2 is a focal length of the image side lens group.

It is also preferable that an aperture stop is disposed between the object side lens group and the image side lens group.

It is also preferable that the focus on a close object is adjusted by moving the image side lens group toward the object.

A method for manufacturing an imaging lens according to a fourth aspect of the present invention, comprises the steps of: assembling an object side lens group having a positive refractive power, an aperture stop, and an image side lens group having a positive refractive power in a lens barrel in order from the object; configuring the object side lens group by disposing a negative lens component and a positive lens component in order from the object when the step of assembling is performed; and configuring the image side lens group by disposing a cemented lens of a negative lens component and a first positive lens component, and a second positive lens component in order from the object when the step of assembling is performed, wherein conditions expressed by the following expressions $nd5<1.67$ and $vd5>50.0$ are satisfied, where nd5 is a refractive index of the second positive lens component of the image side lens group on the d-line, and vd5 is an Abbe number of the second positive lens component of the image side lens group on the d-line.

In this method, it is preferable that a condition expressed by the following expression $-0.30<(r5R+r5F)/(r5R-r5F)<0.40$ is satisfied, where r5F is a radius of curvature of an object side lens surface of the second positive lens component of the image side lens group, and r5R is a radius of curvature of an image side lens surface of the second positive lens component of the image side lens group.

It is also preferable that a condition expressed by following expression $0.60<f/f5<0.90$ is satisfied, where f is a focal length of the imaging lens, and f5 is a focal length of the second positive lens component of the image side lens group.

It is also preferable that the negative lens component of the object side lens group includes at least one aspherical surface.

It is also preferable that the image side lens group includes at least one aspherical surface.

Advantageous Effects of the Invention

According to the present invention, an imaging lens of which angle of view exceeds 60°, and F number is about 2.8, and which can correct various aberrations well from infinity to a close object, is compact, and can implement high optical performance on an entire screen, an optical apparatus and a method for forming an image of an object using this imaging lens, can be provided.

Also according to the present invention, an imaging lens which can correct various aberrations satisfactorily, minimizes performance change during a lens shift, is compact, and has high optical performance on an entire screen, and an optical apparatus and a method for forming an image of an object using this imaging lens, can be provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 2 is a cross-sectional view along the A-A' line in FIG. 1A;

FIG. 3 is a cross-sectional view depicting a configuration of the imaging lens according to Example 1-1;

FIG. 5 is a cross-sectional view depicting a configuration of the imaging lens according to Example 1-2;

FIG. 7 is a cross-sectional view depicting a configuration of the imaging lens according to Example 1-3;

FIG. 9 is a cross-sectional view depicting a configuration of the imaging lens according to Example 1-4;

FIG. 11 is a cross-sectional view depicting a configuration of the imaging lens according to Example 1-5;

FIG. 13 is a cross-sectional view depicting a configuration of the imaging lens according to Example 1-6;

FIG. 15 is a cross-sectional view depicting a configuration of the imaging lens according to Example 1-7;

FIG. 17 is a cross-sectional view depicting a configuration of the imaging lens according to Example 1-8;

FIG. 19 is a cross-sectional view depicting a configuration of the imaging lens according to Example 2-1;

FIG. 21 is a cross-sectional view depicting a configuration of the imaging lens according to Example 2-2;

FIG. 23 is a cross-sectional view depicting a configuration of the imaging lens according to Example 2-3;

FIG. 27 is a cross-sectional view depicting a configuration of the imaging lens according to Example 2-5;

FIG. 29 is a cross-sectional view depicting a configuration of the imaging lens according to Example 2-6;

FIG. 31 is a cross-sectional view depicting a configuration of the imaging lens according to Example 2-7;

FIG. 33 is a cross-sectional view depicting a configuration of the imaging lens according to Example 2-8;

FIG. 35 is a cross-sectional view depicting a configuration of the imaging lens according to Example 3-1;

FIG. 37 is a cross-sectional view depicting a configuration of the imaging lens according to Example 3-2;

FIG. 39 is a cross-sectional view depicting a configuration of the imaging lens according to Example 3-3;

FIG. 45 is a cross-sectional view depicting a configuration of the imaging lens according to Example 3-6;

FIG. 47 is a cross-sectional view depicting a configuration of the imaging lens according to Example 3-7;

FIG. 49 is a cross-sectional view depicting a configuration of the imaging lens according to Example 3-8;

FIG. 51 is a cross-sectional view depicting a configuration of the imaging lens according to Example 4-1;

FIG. 53 is a cross-sectional view depicting a configuration of the imaging lens according to Example 4-2;

FIG. 55 is a cross-sectional view depicting a configuration of the imaging lens according to Example 4-3;

FIG. 57 is a cross-sectional view depicting a configuration of the imaging lens according to Example 4-4;

FIG. 59 is a cross-sectional view depicting a configuration of the imaging lens according to Example 4-5;

FIG. 61 is a cross-sectional view depicting a configuration of the imaging lens according to Example 4-6;

FIG. 63 is a cross-sectional view depicting a configuration of the imaging lens according to Example 4-7;

FIG. 65 is a cross-sectional view depicting a configuration of the imaging lens according to Example 4-8;

FIGS. 66A and 663 are graphs showing various aberrations of Example 4-8, where 66A are graphs showing various aberrations upon focusing on infinity, and 66B are graphs showing various aberrations upon focusing on a close object.

DESCRIPTION OF THE PREFERRED EMBODIMENTS

Preferred embodiments will now be described with reference to the drawings.

Figure 1A:
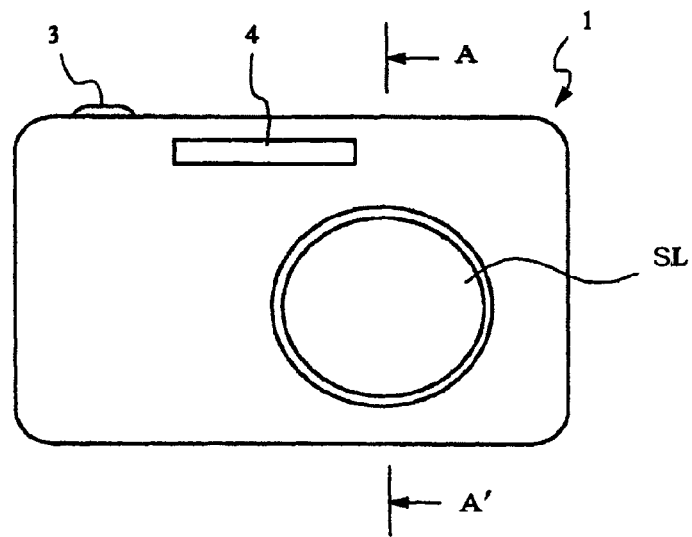
FIGS. 1A and 1B show a digital still camera having an imaging lens according to the first embodiment, where 1A is a front view and 1B is a rear view.
Figure 1B:
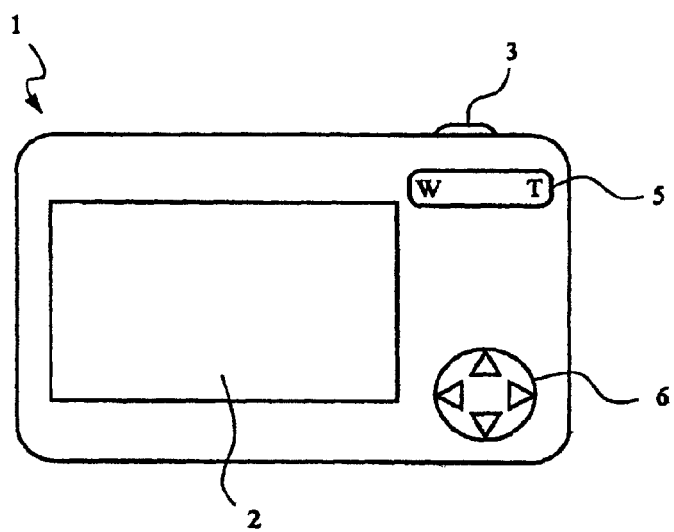

First a configuration of a digital still camera 1 is shown in FIGS. 1A and 1B and FIG. 2 as an optical apparatus having an imaging lens SL according to an embodiment of the present invention. In this digital still camera 1, an unillustrated shutter is opened when an unillustrated power button is pressed, and lights from an unillustrated object are condensed by the imaging lens SL, and forms an image on an image sensing element C (e.g. film, CCD, CMOS) disposed on an image plane I. The object image formed on the image sensing element C is displayed on a liquid crystal monitor 2 which is disposed on the back of the camera 1. The user decides on a composition of the object image while checking the liquid crystal monitor 2, and presses down on a release button 3. Then the object image is captured by the image sensing element C, and is recorded and stored in an unillustrated memory.

In this digital still camera 1, an auxiliary light emission unit 4 that emits an auxiliary light when an object is dark, a wide (W)-tele (T) button 5 that is used to zoom a zooming optical system ZL from a wide angle end state (W) to a telephoto end state (T), a function button 6 that is used for setting various conditions of the digital still camera 1, and other components, are disposed. The present invention is not limited to the camera of this embodiment, and the imaging lens SL can also be applied to an interchangeable lens.

First Embodiment

A first embodiment of the imaging lens according to the present invention will now be described. The first embodiment includes examples (Example 1-1 to Example 1-8) herein below.

The imaging lens SL according to the first embodiment includes configurations of Examples 1-1 to 1-8 shown in FIG. 3, FIG. 5, FIG. 7, FIG. 9, FIG. 11, FIG. 13, FIG. 15 and FIG. 17, but is described using the configuration in FIG. 3 as an example. As shown in FIG. 3, this imaging lens SL comprises a first lens group G1 having a positive refractive power, an aperture stop S, and a second lens group G2 having a positive refractive power, which are disposed in order from an object, wherein the first lens group G1 further comprises a first lens component L1 having a negative refractive power, and a second lens component L2 having a positive refractive power which are disposed in order from the object, and the second lens group G2 further comprises at least one cemented lens (cemented lens L34 in FIG. 3). Because of this configuration, the imaging lens SL according to the first embodiment, of which angle of view exceeds 60° and which is compact and can implement excellent image forming performance, can be created.

In the first embodiment having the above configuration, a spherical aberration and coma aberration, which are generated in the first lens group G1 alone, are minimized, so conditions expressed by the following expressions (1) and (2)

$$0.12 < f/f1 < 0.47 \tag{1}$$

$$0.016 < D12/f < 0.079 \tag{2}$$

are satisfied, where f1 is a focal length of the first lens group G1, f is a focal length of the imaging lens, and D12 is an air distance (distance on the optical axis) between the first lens component L1 and the second lens component L2 of the first lens group G1.

The conditional expression (1) is a conditional expression to specify an appropriate range of the focal length f1 of the first lens group G1 and the focal length f of the imaging lens. If the upper limit value of the conditional expression (1) is exceeded, it becomes difficult to correct the spherical aberration and coma aberration which are generated in the first lens group G1 alone. If the lower limit value of the conditional expression (1) is not reached, on the other hand, the focal length f1 of the first lens group G1 increases, and this is an advantage for correcting Aberrations, but increases the total length of the lens system, which runs counter to the intent of the present invention, and is therefore not preferable.

To make the effect of the first embodiment certain, it is preferable that the upper limit value of the conditional expression (1) is 0.45. To make the effect of the first embodiment more certain, it is preferable that the upper limit value of the conditional expression (1) is 0.42. To make the effect of the first embodiment even more certain, it is preferable that the upper limit value of the conditional expression (1) is 0.39.

To make the effect of the first embodiment certain, it is preferable that the lower limit value of the conditional expression (1) is 0.15. To make the effect of the first embodiment more certain, it is preferable that the lower limit value of the conditional expression (1) is 0.18.

The conditional expression (2) is a conditional expression to specify an appropriate range of an air distance D12 between the first lens component L1 and the second lens component L2 of the first lens group G1. If the upper limit value of the conditional expression (2) is exceeded, the spherical aberration and coma aberration can be corrected satisfactorily, but the entire first lens group G1 becomes thicker. As a result, the total length of the lens system increases, which runs counter to the intent of the present invention. If the lower limit value of the conditional expression (2) is not reached, on the other hand, this is an advantage to downsize, but makes correction of a coma aberration difficult, which is not preferable.

To make the effect of the first embodiment certain, it is preferable that the upper limit value of the conditional expression (2) is 0.075. To make the effect of the first embodiment more certain, it is preferable that the upper limit value of the conditional expression (2) is 0.071. To make the effect of the first embodiment even more certain, it is preferable that the upper limit value of the conditional expression (2) is 0.067.

To make the effect of the first embodiment certain, it is preferable that the lower limit value of the conditional expression (2) is 0.020. To make the effect of the first embodiment more certain, it is preferable that the lower limit value of the conditional expression (2) is 0.025.

In the first embodiment, it is preferable that the first lens group G1 further has a first lens component L1 of a negative meniscus lens having a convex surface facing the object, and a second lens component L2 of a positive meniscus lens having a convex surface facing the object, which are disposed in order from the object. Because of this configuration, in the imaging lens SL of the first embodiment, the higher performance and downsizing can be balanced, and the spherical aberration and curvature of field generated in the first lens group G1 alone can be corrected satisfactorily.

In the first embodiment, it is preferable that a condition expressed by the following expression (3)

$$nd1 > 1.65 \qquad (3)$$

is satisfied, where nd1 is a refractive index of the first lens component L1 of the first lens group G1 on the d-line.

The conditional expression (3) is a conditional expression to specify optical material characteristics of the first lens component L1 of the first lens group G1. If the lower limit value of the conditional expression (3) is not reached, correction of the coma aberration becomes difficult, and high performance cannot be implemented, which is not preferable.

To make the effect of the present invention certain, it is preferable that the lower limit value of the conditional expression (3) is 1.655. To make the effect of the present invention more certain, it is preferable that the lower limit value of the conditional expression (3) is 1.660. To make the effect of the present invention even more certain, it is preferable that the lower limit value of the conditional expression (3) is 1.665.

In the first embodiment, it is preferable that the condition expressed by the following expression (4)

$$3.8 < (r2F + r1R)/(r2F - r1R) < 11.8 \qquad (4)$$

is satisfied, where r1R is a radius of curvature of the image side lens surface of the first component L1, and r2F is a radius of curvature of the object side lens surface of the second lens component L2.

The conditional expression (4) is a conditional expression to correct the coma aberration and curvature of field generated in the first lens group G1 alone satisfactorily. If the upper limit value of the conditional expression (4) is exceeded, the coma Aberration and curvature of field generated in the first lens group G1 alone cannot be corrected. Distortion also increases, which is not preferable. If the lower limit value of the conditional expression (4) is not reached, on the other hand, the coma aberration generated in the first lens group G1 alone increases too much, and performance in the shortest photographic distance deteriorates, which is not preferable.

To make the effect of the first embodiment certain, it is preferable that the upper limit value of the conditional expression (4) is 11.0. To make the effect of the first embodiment more certain, it is preferable that the upper limit value of the conditional expression (4) is 10.5. To make the effect of the first embodiment even more certain, it is preferable that the upper limit value of the conditional expression (4) is 10.0.

To make the effect of the first embodiment certain, it is preferable that the lower limit value of the conditional expression (4) is 4.3. To make the effect of the first embodiment more certain, it is preferable that the lower limit value of the conditional expression (4) is 4.8. To make the effect of the first embodiment even more certain, it is preferable that the lower limit value of the conditional expression (4) is 5.3.

In the first embodiment, it is preferable that the first lens group G1 includes at least one aspherical surface (second surface from the object in FIG. 3). Because of this configuration, higher performance and downsizing can be balanced, and the spherical aberration and curvature of field can be corrected satisfactorily.

In the first embodiment, it is preferable that the first lens component of the first lens group G1 includes at least one aspherical surface (second surface from the object in FIG. 3). Because of this configuration, higher performance and downsizing can be balanced, and the spherical aberration and curvature of field can be corrected satisfactorily.

In the first embodiment, it is preferable that the second lens group G2 further comprises a cemented lens L34 of a negative lens L3 having a concave surface facing the object and a positive lens L4 having a convex surface facing the image, and a biconvex positive lens L5, which are disposed in order from the object. Because of this configuration, the curvature of field and coma Aberration can be corrected satisfactorily, and higher performance of the imaging lens SL can be implemented.

In the first embodiment, it is preferable that the second lens group G2 includes at least one aspherical surface (twelfth surface from the object in FIG. 3). Because of this configuration, fluctuation of distortion and curvature of field generated upon focusing can be corrected satisfactorily, and higher performance of the imaging lens SL can be implemented.

In the first embodiment, it is preferable that the second lens group G2 further comprises a biconvex positive lens L5, and this biconvex positive lens L5 includes at least one aspherical surface (twelfth surface of the object in FIG. 3). Because of this configuration, fluctuation of distortion and curvature of field generated upon focusing can be corrected satisfactorily, and higher performance of the imaging lens SL can be implemented.

In the first embodiment, it is preferable that focus on a close object is adjusted by moving the second lens group G2 toward the object. Because of this configuration, fluctuation of aberration upon focus adjustment can be suppressed, and interference of a lens or mechanical component to support a lens can be prevented, since a feed pitch of the second lens group G2 toward the object upon focus adjustment is very small. It is possible to adjust focus on a close object using the first lens group G1, but a feed pitch toward the object becomes very large, which causes a change in the total length of the lens. Along with this change, such a mechanism as the drive system becomes complicated, and downsizing becomes difficult. Also deterioration of the spherical aberration and curvature of field increase, which is not preferable.

In the first embodiment, in order to prevent failure of photography due to an image blur caused by camera motion, it is possible that a blur detection system for detecting the blur of the lens system and the drive means are combined in the lens system, and all or a part of one lens group, out of the lens groups constituting the lens system, are decentered as a shift lens group, and an image is shifted by driving the shift lens group by the drive means so as to correct the image blur (fluctuation of image plane position) caused by the blur of the lens system detected by the blur detection system, thereby the image blur can be corrected. As mentioned above, the imaging lens SL of the first embodiment can function as a vibration proof optical system.

The imaging lens SL according to the first embodiment comprises two lens groups, that is, the first lens group G1 and the second lens group G2, but another lens group may be added between the lens groups or another lens group may be added at the image side of the first lens group G1, or at the object side of the second lens group G2.

In the imaging lens SL according to the first embodiment, it is preferable that the distance from the image side lens surface to the image plane (back focus) of the positive lens L5 disposed closest to the image is about 10 to 30 mm in the shortest state. In the imaging lens SL, it is preferable that the image height is 5 to 12.5 mm, and more preferably is 5 to 9.5 mm.

The following can be implemented when appropriate within a range where the optical performance of the imaging lens according to the first embodiment is not diminished. These matters can also be implemented for the later mentioned second to fourth embodiments when appropriate.

The first embodiment, where two-group configuration is shown, can also be applied to other configurations, such as a three-group configuration. For example, a configuration where a lens group having a positive refractive power comprising a biconvex single lens disposed closest to the image, can be used.

Also in the first embodiment, a single or a plurality of lens groups, or a part of a lens group, may be constructed as a focusing lens group, where focusing from an object at infinity to a close object is performed by moving the lens group in an optical axis direction. The focusing lens group can also be applied to auto focus, and is also appropriate for the driving motor for auto focus (using a stepping motor or ultra sonic motor). It is particularly preferable to construct the second lens group G2 as the focusing lens group.

Also in the first embodiment, a lens group or a part of a lens group may be a vibration proof lens group that corrects an image blur caused by a camera motion blur, by moving the lens group in a direction perpendicular to the optical axis. In particular, it is preferable that at least a part of the second lens group G2 is a vibration proof lens group.

Also in the first embodiment, the lens surfaces may be aspherical. The aspherical surface may be an aspherical surface created by grinding, a glass mold aspherical surface where glass is formed to be aspherical using a die, or a composite aspherical surface where resin is formed to be an aspherical shape on the surface of glass. The lens surfaces may be a diffraction surface, and the lenses may be a refractive index distributed lens (GRIN lens) or a plastic lens.

Also in the first embodiment, it is preferable that the aperture stop S is disposed between the first lens group G1 and the second lens group G2, but the frame of the lens may substitute for this role without disposing an aperture stop as a separate element.

Also in the first embodiment, it is preferable that a flare cut stop (flare cut stops S1 and S2 in FIG. 3) is disposed between the first lens group G1 and the second lens group G2, but the frame of the lens may substitute for this role without disposing a flare cut stop as a separate element.

Also in the first embodiment, an anti-reflection film having a high transmittance in a wide wavelength area may be formed on each lens surface constituting the imaging lens SL, so as to decrease flares and ghosts, and to implement high optical performance with high contrast.

In the imaging lens SL of the first embodiment, a focal length, converted into 35 mm film size, is about 38 mm (35 to 43 mm), and the F number is about 2.8 (2.5 to 3.3).

In the imaging lens SL of the first embodiment, it is preferable that the first lens group G1 further comprises one positive lens component and one negative lens component. It is preferable that the lens components of the first lens group G1 are disposed in order of negative and positive from the object, with air distance there between.

In the imaging lens SL of the first embodiment, it is preferable that the second lens group G2 further comprises two positive lens components and one negative lens component. It is also preferable that the lens components of the second lens group G2 are disposed in order of negative, positive and positive from the object.

According to the first embodiment, variant forms of the first lens group G1 are, for example, using a cemented lens for the second lens component L2, adding a positive or a negative lens at the object side of the first lens component L1, and adding a positive or negative lens at the image side of the second lens component L2.

Also according to the first embodiment, variant forms of the second lens group G2 are, for example, constructing the cemented lens L34 with three lenses, using a cemented lens for the fifth lens component L5, and separating the cemented lens L34 and constructing the third lens component L3 and the fourth lens component L4 as single lenses respectively. The refractive power of the cemented lens L34 can be positive or negative.

Examples of the First Embodiment

Example 1-1 to Example 1-8 according to the first embodiment will now be described with reference to the drawings. FIG. 3, FIG. 5, FIG. 7, FIG. 9, FIG. 11, FIG. 13, FIG. 15 and FIG. 17 are cross-sectional views depicting a configuration of the imaging lens SL (SL1 to SL8) according to each example, where the change of focusing state, from focusing on infinity to focusing on a close object of the imaging lenses SL1 to SL8, that is, the state of movement of each lens group upon focusing, is shown by an arrow.

As described above, the imaging lens SL1 to SL8 according to each example comprises a first lens group G1 having a positive refractive power, an aperture stop S, a second lens group G2 having a positive refractive power, and a filter group FL which includes a low pass filter, infrared cut filter or the like, which are disposed in order from an object. Upon focusing from the state of focusing on infinity to the state of focusing on a close object, the first lens group G1 is fixed with respect to the image plane I, and the second lens group G2 is moved with respect to the image plane I, so as to change the distance between the first lens group G1 and the second lens group G2. The image plane I is formed on an unillustrated image sensing element, and this image sensing element is CCD or CMOS, for example.

Table 1-1 to Table 1-8 shown below are tables of each parameter according to Example 1-1 to Example 1-8. In [surface data] in the tables, the surface number is a sequence of a lens surface counted from the object side along the traveling direction of the light, r is a radius of curvature of each lens surface, d is a surface distance, which is a distance from each optical surface to the next optical surface (or image plane) on the optical axis, nd is a refractive index on the d-line (wavelength: 587.6 nm), and νd is an Abbe number with respect to the d-line. di (i is an integer) is a variable surface distance of the i-th surface and Bf is a back focus. If the lens surface is aspherical, "*" is attached to the surface number, and a paraxial radius of curvature is shown in the column of the radius of curvature r. "0.0000" of the radius of curvature r indicates a plane or aperture. The refractive index of air "1.00000" is omitted.

In [aspherical data], the shape of the aspherical surface shown in [surface data] is given by the following expression (a). Here y is a height in a direction perpendicular to the optical axis, S(y) is a distance along the optical axis from the tangential plane at the vertex of the aspherical surface to a position on the aspherical surface at the height y (Sag amount), r is a radius of curvature of a reference spherical surface (paraxial radius of curvature), κ is a conical coefficient, and Cn is an aspherical coefficient of degree n. In each example, $C_2$, the aspherical coefficient of degree 2, is 0. En indicates ×10$^n$. For example, 1.234 E-05=1.234×10$^{-5}$.

$$S(y)=(y^2/r)/\{1+(1-\kappa \cdot y^2/r^2)^{1/2}\}+C4 \times y^4+C6 \times y^6+C8 \times y^8+C10 \times y^{10} \quad (a)$$

In [various data], f is a focal length of the imaging lens, FNO is an F number, 2ω is an angle of view, Y is an image height, and TL is a total length of the lens system (distance on the optical axis from the lens surface closest to the object to the image plane). In [variable distance data], f is a focal length of the imaging lens, β is magnification, di (i is an integer) is a variable surface distance of the i-th surface in the state of focusing on infinity and the state of focusing on a close object (0.2 m photographic distance (distance from the object to the image plane)). In [conditional expression], values corresponding to the expressions (1) to (4) are shown.

In the tables, "mm" is used for the unit of focal length f, radius of curvature r, surface distance d and other lengths. However unit is not limited to "mm", but another appropriate unit can be used, since the optical system can obtain an equivalent optical performance, even if it is proportionately expanded or reduced.

The above description on the tables is the same for other embodiments and other examples, therefore description thereof will be omitted herein below.

Example 1-1

The imaging lens SL1 according to Example 1-1 will now be described with reference to FIG. 3, FIGS. 4A, and 4B and Table 1-1. As FIG. 3 shows, in the imaging lens SL1 according to Example 1-1, a first lens group G1 comprises a negative meniscus lens L1 (first lens component) having a convex surface facing the object, and a positive meniscus lens L2 (second lens component) having a convex surface facing the object, which are disposed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post-positions of the aperture stop S.

In Example 1-1, an axial air distance d6 between the first lens group G1 and the second lens group G2, and an axial air distance d12 between the second lens group G2 and the filter group FL, change upon focusing.

Table 1-1 shows a table on each parameter of Example 1-1. The surface numbers 1 to 18 in Table 1-1 correspond to the surfaces 1 to 18 in FIG. 3. In Example 1-1, the second surface and the twelfth surface are aspherical.

TABLE 1-1

[Surface data]

| Surface number | r | d | nd | vd |
|---|---|---|---|---|
| 1 | 12.5540 | 0.90 | 1.67790 | 54.89 |
| *2 | 5.1200 | 0.80 | | |
| 3 | 7.2279 | 1.90 | 1.88300 | 40.76 |
| 4 | 25.2952 | 0.80 | | |

TABLE 1-1-continued

| 5 | 0.0000 | 1.40 | (Flare stop S1) | |
|---|---|---|---|---|
| 6 | 0.0000 | (d6) | (Aperture stop S) | |
| 7 | 0.0000 | 1.00 | (Flare stop S2) | |
| 8 | −5.1593 | 0.90 | 1.80810 | 22.76 |
| 9 | −15.0968 | 2.65 | 1.75500 | 52.32 |
| 10 | −6.5278 | 0.20 | | |
| 11 | 25.0474 | 2.70 | 1.58913 | 61.16 |
| *12 | −19.8008 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 5.1200
κ = +0.9952
C4 = −3.5496E−04
C6 = −1.3835E−05
C8 = −6.4411E−08
C10 = −2.8213E−08

Twelfth surface r = −19.8008
κ = +5.2781
C4 = +2.1953E−04
C6 = −1.0580E−07
C8 = +2.9574E−08
C10 = −2.6872E−10

[Various data]

f = 14.26
FNO = 2.83
2ω = 62.12
Y = 8.50
TL = 31.51

[Variable distance data]

| | Infinity | Close Object |
|---|---|---|
| d6 | 1.8514 | 0.6000 |
| d12 | 10.4286 | 11.6800 |
| Bf | 0.5058 | 0.5058 |

[Lens group data]

| | First surface | Focal length |
|---|---|---|
| First lens group | 1 | 58.2236 |
| Second lens group | 7 | 14.9735 |

[Conditional expression]

nd1 = 1.67790
f = 14.2560
f1 = 58.2236
D12 = 0.8000
r1R = 5.1200
r2F = 7.2279
Conditional expression (1) f/f1 = 0.2448
Conditional expression (2) D12/f = 0.0561
Conditional expression (3) nd1 = 1.67790
Conditional expression (4) (r2F + r1R)/(r2F − r1R) = 5.8579

As the parameter table in Table 1-1 shows, the imaging lens SL1 according to Example 1-1 satisfies all the conditional expressions (1) to (4).

Figure 4A:
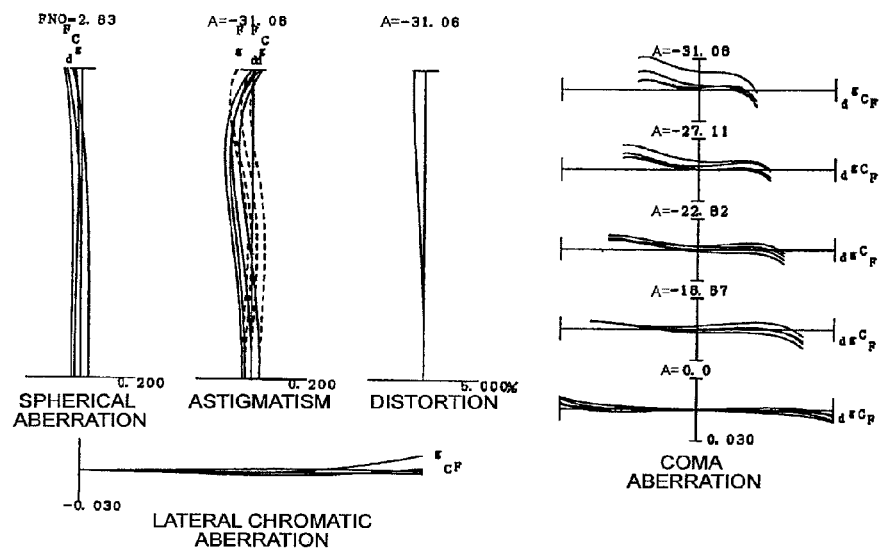
FIGS. 4A and 4B are graphs showing various aberrations of Example 1-1, where 4A are graphs showing various aberrations upon focusing on infinity, and 4B are graphs showing various aberrations upon focusing on a close object.
Figure 4B:
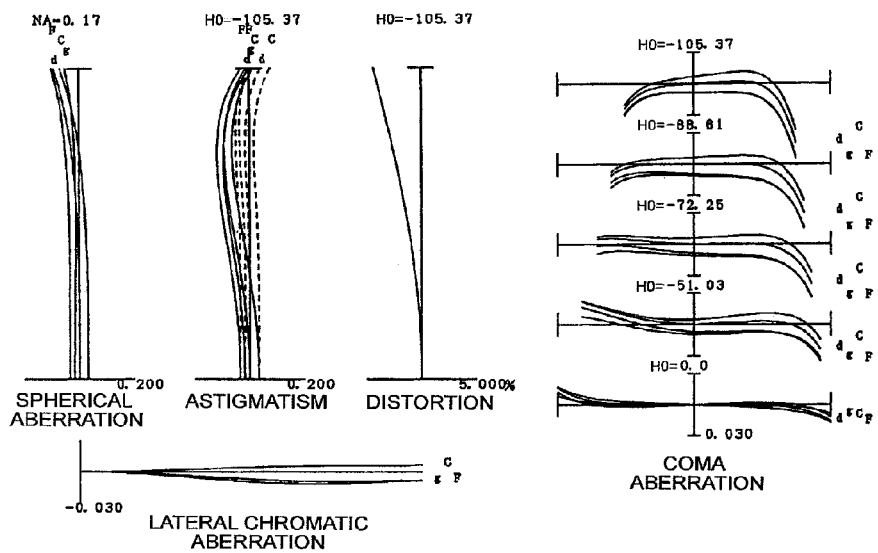

FIGS. 4A and 4B are graphs showing various aberrations of the imaging lens SL1 according to Example 1-1, where FIG. 4A are graphs showing various aberrations upon focusing on infinity, and FIG. 4B are graphs showing various aberrations upon focusing on a close object. In each graph showing aberrations, NA is a numerical aperture, FNO is an F number, A is a half angle of view, and HO is a height of an object. d indicates aberrations on the d-line (wavelength: 587.6 nm), g indicates aberrations on the g-line (wavelength: 435.8 nm), C indicates aberrations with respect to the C-line (wavelength: 656.3 nm), and F indicates aberrations on the F-line (wavelength: 486.1 nm), and a value with no indication is a value with respect to the d-line. In a graph showing astigmatism, a solid line indicates a sagittal image surface, and a broken line indicates a meridional image surface.

The above description on graphs showing aberrations is the same for other examples, therefore description thereof is omitted.

As each graph showing aberrations shows, according to the imaging lens SL1 of the Example 1-1, various aberrations can be corrected satisfactorily from a state of focusing on infinity to a state of focusing on a close object, and excellent image forming performance is implemented.

Example 1-2

The imaging lens SL2 according to Example 1-2 will now be described with reference to FIG. 5, FIGS. 6A and 6B and Table 1-2. As FIG. 5 shows, in the imaging lens SL2 according to Example 1-2, a first lens group G1 comprises a negative meniscus lens L1 (first lens component) having a convex surface facing the object, and a positive meniscus lens L2 (second lens component) having a convex surface facing the object, which are disposed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post-positions of the aperture stop S.

In Example 1-2, an axial air distance d6 between the first lens group G1 and the second lens group G2, and an axial air distance d12 between the second lens group G2 and the filter group FL, change upon focusing.

Table 1-2 shows a table on each parameter of Example 1-2. The surface numbers 1 to 18 in Table 1-2 correspond to the surfaces 1 to 18 in FIG. 5. In Example 1-2, the second surface and the twelfth surface are aspherical.

TABLE 1-2

[Surface data]

| Surface number | r | d | nd | vd |
|---|---|---|---|---|
| 1 | 11.8261 | 0.90 | 1.67790 | 54.89 |
| *2 | 5.0108 | 0.65 | | |
| 3 | 7.0263 | 1.85 | 1.88300 | 40.76 |
| 4 | 23.3567 | 0.70 | | |
| 5 | 0.0000 | 1.40 | (Flare stop S1) | |
| 6 | 0.0000 | (d6) | (Aperture stop S) | |
| 7 | 0.0000 | 1.00 | (Flare stop S2) | |
| 8 | -5.0661 | 0.90 | 1.80810 | 22.76 |
| 9 | -14.6310 | 2.70 | 1.75500 | 52.32 |
| 10 | -6.3977 | 0.20 | | |
| 11 | 23.5294 | 2.70 | 1.58913 | 61.16 |
| *12 | -21.4493 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 5.0108
κ = +0.1277
C4 = +4.8479E-04
C6 = +5.6078E-06
C8 = +1.1439E-07
C10 = +2.6889E-09

Twelfth surface r = -21.4493
κ = -5.6807
C4 = +6.6823E-05
C6 = -6.8560E-08
C8 = +2.3185E-08
C10 = -3.6236E-10

[Various data]

f = 14.26
FNO = 2.88
2ω = 62.12
Y = 8.50
TL = 31.01

[Variable distance data]

| | Infinity | Close Object |
|---|---|---|
| d6 | 1.8508 | 0.6000 |
| d12 | 10.1792 | 11.4301 |
| Bf | 0.5070 | 0.5070 |

[Lens group data]

| | First surface | Focal length |
|---|---|---|
| First lens group | 1 | 56.8827 |
| Second lens group | 7 | 14.7636 |

[Conditional expression]

nd1 = 1.67790
f = 14.2560
f1 = 56.8827
D12 = 0.6500
r1R = 5.0108
r2F = 7.0263
Conditional expression (1) f/f1 = 0.2506
Conditional expression (2) D12/f = 0.0456
Conditional expression (3) nd1 = 1.67790
Conditional expression (4) (r2F + r1R)/(r2F - r1R) = 5.9722

As the parameter table in Table 1-2 shows, the imaging lens SL2 according to Example 1-2 satisfies all the conditional expressions (1) to (4).

Figure 6A:
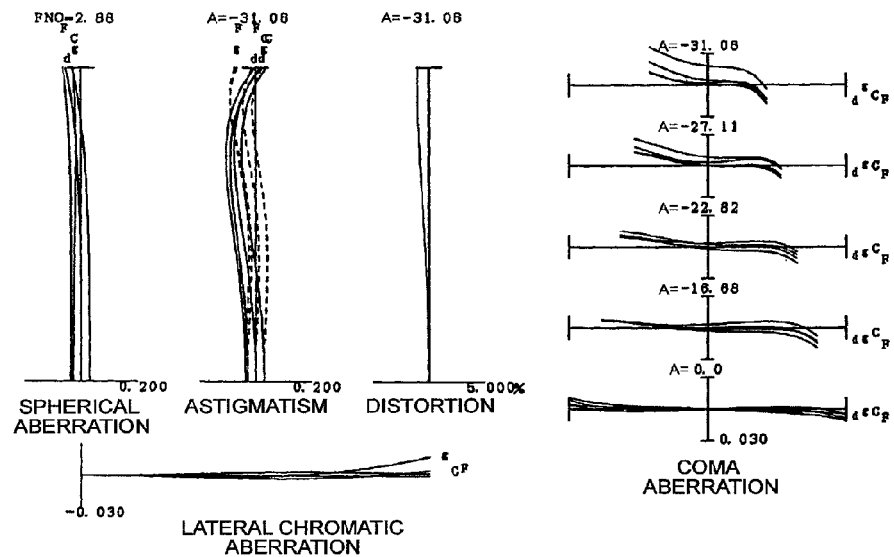
FIGS. 6A and 6B are graphs showing various aberrations of Example 1-2, where 6A are graphs showing various aberrations upon focusing on infinity, and 6B are graphs showing various aberrations upon focusing on a close object.
Figure 6B:
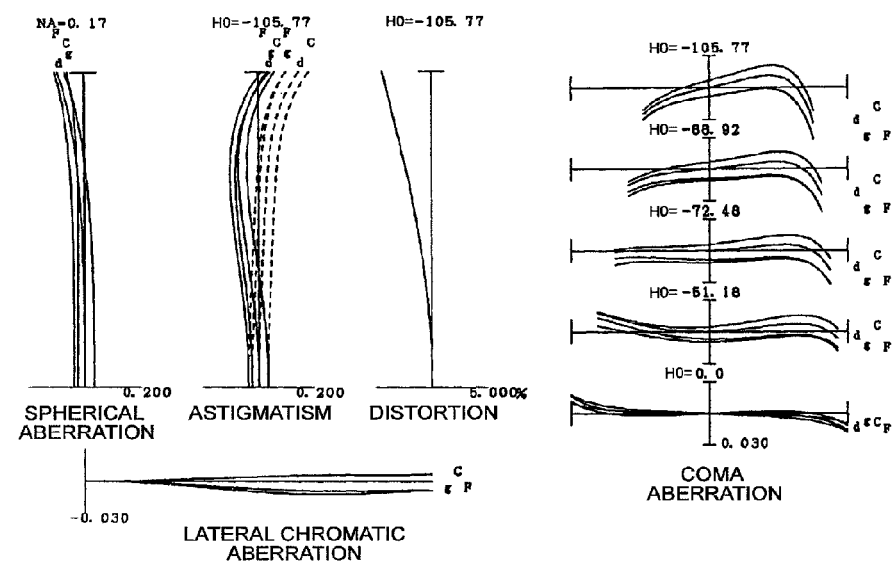

FIGS. 6A and 6B are graphs showing various aberrations of the imaging lens SL2 according to Example 1-2, where FIG. 6A are graphs showing various aberrations upon focusing on infinity, and FIG. 6B are graphs showing various aberrations upon focusing on a close object. As each graph showing aberrations shows, according to the imaging lens SL2 of the Example 1-2, various aberrations can be corrected satisfactorily from a state of focusing on infinity to a state of focusing on a close object, and excellent image forming performance is implemented.

Example 1-3

The imaging lens SL3 according to Example 1-3 will now be described with reference to FIG. 7, FIGS. 8A and 8B and Table 1-3. As FIG. 7 shows, in the imaging lens SL3 according to Example 1-3, a first lens group G1 comprises a negative meniscus lens L1 (first lens component) having a convex surface facing the object, and a positive meniscus lens L2 (second lens component) having a convex surface facing the object, which are disposed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post-positions of the aperture stop S.

In Example 1-3, an axial air distance d6 between the first lens group G1 and the second lens group G2, and an axial air distance d12 between the second lens group G2 and the filter group FL, change upon focusing.

Table 1-3 shows a table on each parameter of Example 1-3. The surface numbers 1 to 18 in Table 1-3 correspond to the surfaces 1 to 18 in FIG. 7. In Example 1-3, the second surface and the twelfth surface are aspherical.

TABLE 1-3

[Surface data]

| Surface number | r | d | nd | νd |
|---|---|---|---|---|
| 1 | 12.6464 | 0.90 | 1.66910 | 55.42 |
| *2 | 5.7001 | 0.75 | | |
| 3 | 7.7231 | 1.67 | 1.88300 | 40.76 |
| 4 | 24.6238 | 0.20 | | |
| 5 | 0.0000 | 1.40 | (Flare stop S1) | |
| 6 | 0.0000 | (d6) | (Aperture stop S) | |
| 7 | 0.0000 | 1.50 | (Flare stop S2) | |
| 8 | −5.0699 | 0.90 | 1.80810 | 22.76 |
| 9 | −18.5950 | 3.00 | 1.80400 | 46.57 |
| 10 | −7.0355 | 0.20 | | |
| 11 | 26.7580 | 3.12 | 1.61881 | 63.85 |
| *12 | −18.8179 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 5.7001
κ = +1.7002
C4 = −7.4793E−04
C6 = −3.1424E−05
C8 = +2.0843E−07
C10 = −1.3010E−07

Twelfth surface r = −18.8179
κ = −7.0961
C4 = −3.0038E−05
C6 = +1.0404E−06
C8 = −1.2568E−09
C10 = −4.7030E−11

TABLE 1-3-continued

[Various data]

f = 14.26
FNO = 2.91
2ω = 62.12
Y = 8.50
TL = 32.01

[Variable distance data]

| | Infinity | Close Object |
|---|---|---|
| d6 | 2.4197 | 1.1500 |
| d12 | 9.9683 | 11.2380 |
| Bf | 0.5123 | 0.5123 |

[Lens group data]

| | First surface | Focal length |
|---|---|---|
| First lens group | 1 | 48.8782 |
| Second lens group | 7 | 14.6742 |

[Conditional expression]

nd1 = 1.66910
f = 14.2560
f1 = 48.8782
D12 = 0.7500
r1R = 5.7001
r2F = 7.7231
Conditional expression (1) f/f1 = 0.2917
Conditional expression (2) D12/f = 0.0526
Conditional expression (3) nd1 = 1.66910
Conditional expression (4) (r2F + r1R)/(r2F − r1R) = 6.6351

As the parameter table in Table 1-3 shows, the imaging lens SL3 according to Example 1-3 satisfies all the conditional expressions (1) to (4).

Figure 8A:
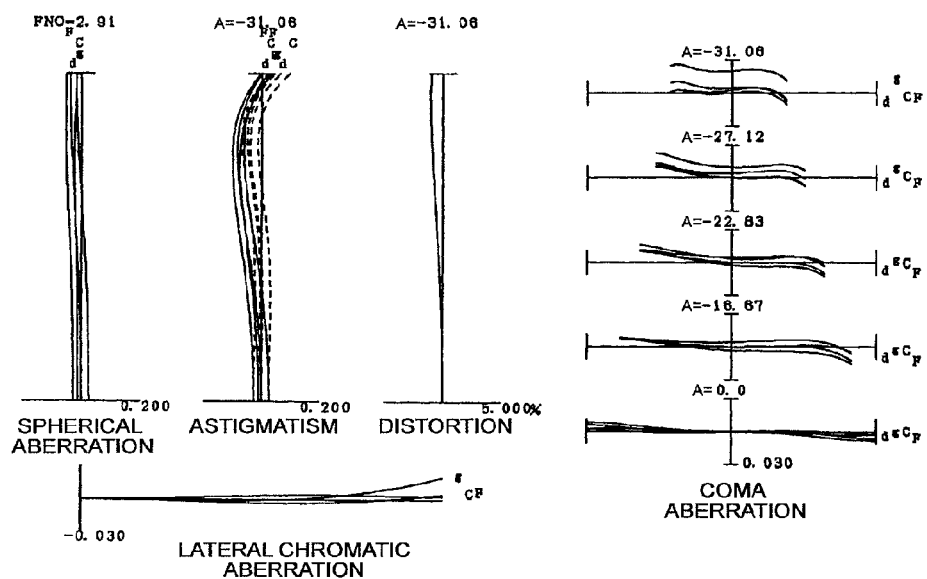
FIGS. 8A and 8B are graphs showing various aberrations of Example 1-3, where 8A are graphs showing various aberrations upon focusing on infinity, and 8B are graphs showing various aberrations upon focusing on a close object.
Figure 8B:
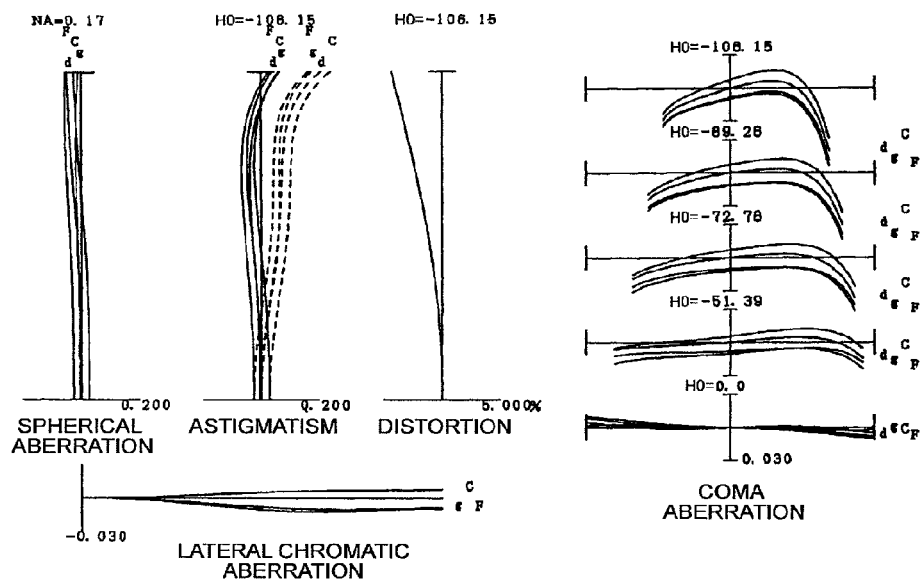

FIGS. 8A and 8B are graphs showing various aberrations of the imaging lens SL3 according to Example 1-3, where FIG. 8A are graphs showing various aberrations upon focusing on infinity, and FIG. 8B are graphs showing various aberrations upon focusing on a close object. As each graph showing aberrations shows, according to the imaging lens SL3 of the Example 1-3, various aberrations can be corrected satisfactorily from a state of focusing on infinity to a state of focusing on a close object, and excellent image forming performance is implemented.

Example 1-4

The imaging lens SL4 according to Example 1-4 will now be described with reference to FIG. 9, FIGS. 10A and 10B and Table 1-4. As FIG. 9 shows, in the imaging lens SL4 according to Example 1-4, a first lens group G1 comprises a negative meniscus lens L1 (first lens component) having a convex surface facing the object, and a positive meniscus lens L2 (second lens component) having a convex surface facing the object, which are disposed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post-positions of the aperture stop S.

In Example 1-4, an axial air distance d6 between the first lens group G1 and the second lens group G2, and an axial air distance d12 between the second lens group G2 and the filter group FL, change upon focusing.

Table 1-4 shows a table on each parameter of Example 1-4. The surface numbers 1 to 18 in Table 1-4 correspond to the surfaces 1 to 18 in FIG. 9. In Example 1-4, the second surface and the twelfth surface are aspherical.

TABLE 1-4

[Surface data]

| Surface number | r | d | nd | vd |
|---|---|---|---|---|
| 1 | 9.9874 | 0.90 | 1.68893 | 31.08 |
| *2 | 5.0739 | 0.45 | | |
| 3 | 6.3837 | 1.76 | 1.85026 | 32.35 |
| 4 | 17.4312 | 0.30 | | |
| 5 | 0.0000 | 1.95 | (Flare stop S1) | |
| 6 | 0.0000 | 0.45 | (Aperture stop S) | |
| 7 | 0.0000 | 1.50 | (Flare stop S2) | |
| 8 | −4.8003 | 0.90 | 1.80810 | 22.76 |
| 9 | −18.5588 | 2.98 | 1.81600 | 46.62 |
| 10 | −6.7015 | 0.20 | | |
| 11 | 20.2148 | 2.86 | 1.66910 | 55.42 |
| *12 | −30.3443 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 5.0739
κ = −2.9635
C4 = +3.4708E−03
C6 = −1.4779E−04
C8 = +8.3851E−06
C10 = −2.3110E−07

Twelfth surface r = −30.3443
κ = −0.7304
C4 = +1.2477E−04
C6 = +4.7254E−07
C8 = +9.6784E−09
C10 = −1.1595E−10

[Various data]

f = 14.26
FNO = 2.91
2ω = 62.12
Y = 8.50
TL = 30.00

[Variable distance data]

| | Infinity | Close Object |
|---|---|---|
| d6 | 1.7473 | 0.4500 |
| d12 | 8.4731 | 9.7704 |
| Bf | 0.4998 | 0.4998 |

[Lens group data]

| | First surface | Focal length |
|---|---|---|
| First lens group | 1 | 38.8259 |
| Second lens group | 7 | 14.1972 |

TABLE 1-4-continued

[Conditional expression]

nd1 = 1.68893
f = 14.2560
f1 = 39.8259
D12 = 0.4500
r1R = 5.0739
r2F = 6.3837
Conditional expression (1) f/f1 = 0.3580
Conditional expression (2) D12/f = 0.0316
Conditional expression (3) nd1 = 1.68893
Conditional expression (4) (r2F + r1R)/(r2F − r1R) = 8.7473

As the parameter table in Table 1-4 shows, the imaging lens SL4 according to Example 1-4 satisfies all the conditional expressions (1) to (4).

Figure 10A:
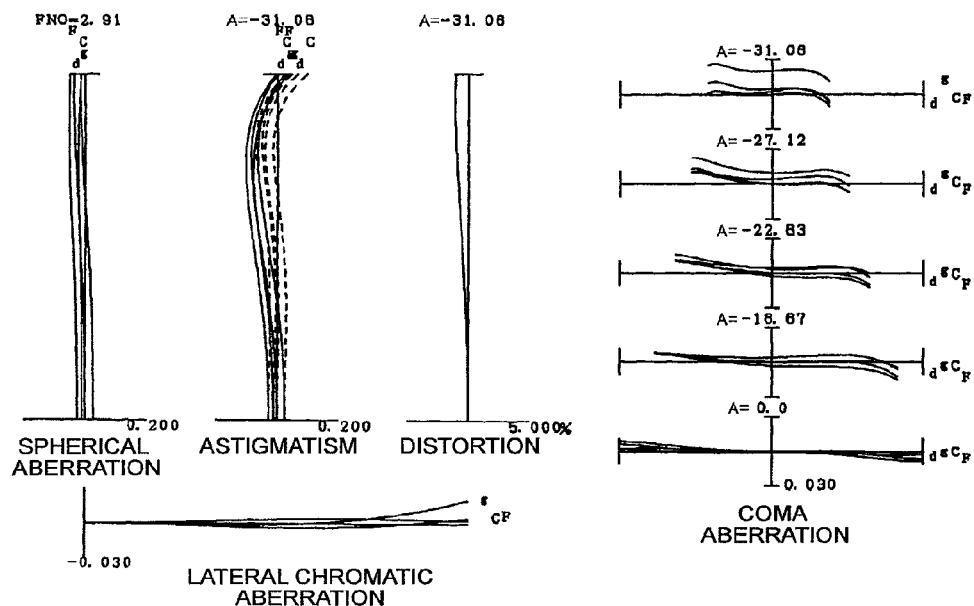
FIGS. 10A and 10B are graphs showing various aberrations of Example 1-4, where 10A are graphs showing various aberrations upon focusing on infinity, and 10B are graphs showing various aberrations upon focusing on a close object.
Figure 10B:
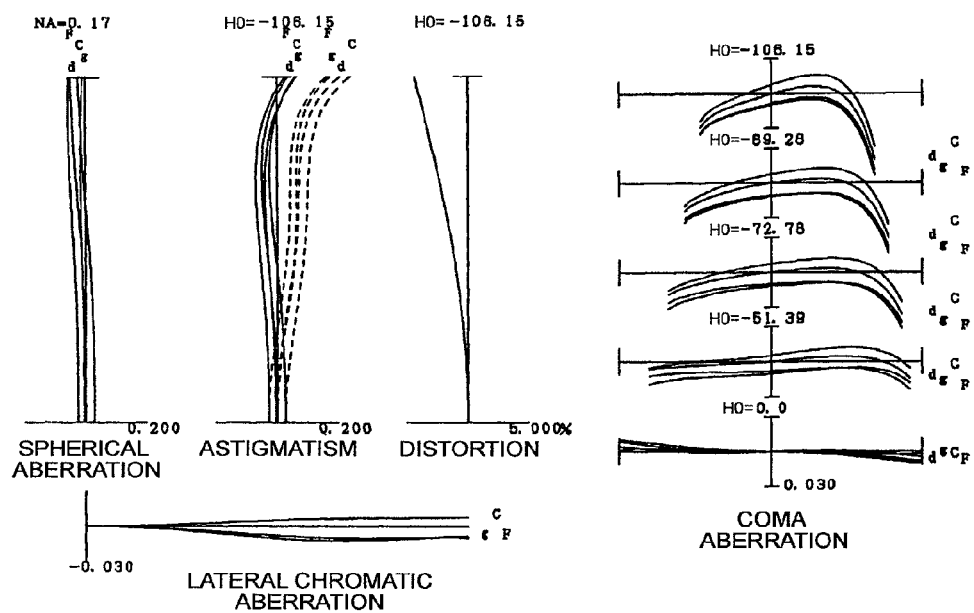

FIGS. 10A and 10B are graphs showing various aberrations of the imaging lens SL4 according to Example 1-4, where FIG. 10A are graphs showing various aberrations upon focusing on infinity, and FIG. 10B are graphs showing various aberrations upon focusing on a close object. As each graph showing aberrations shows, according to the imaging lens SL4 of the Example 1-4, various aberrations can be corrected satisfactorily from a state of focusing on infinity to a state of focusing on a close object, and excellent image forming performance is implemented.

Example 1-5

The imaging lens SL5 according to Example 1-5 will now be described with reference to FIG. 11, FIGS. 12A and 12B and Table 1-5. As FIG. 11 shows, in the imaging lens SL5 according to Example 1-5, a first lens group G1 comprises a negative meniscus lens L1 (first lens component) having a convex surface facing the object, and a positive meniscus lens L2 (second lens component) having a convex surface facing the object, which are disposed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post-positions of the aperture stop S.

In Example 1-5, an axial air distance d6 between the first lens group G1 and the second lens group G2, and an axial air distance d12 between the second lens group G2 and the filter group FL, change upon focusing.

Table 1-5 shows a table on each parameter of Example 1-5. The surface numbers 1 to 18 in Table 1-5 correspond to the surfaces 1 to 18 in FIG. 11. In Example 1-5, the second surface and the twelfth surface are aspherical.

TABLE 1-5

[Surface data]

| Surface number | r | d | nd | vd |
|---|---|---|---|---|
| 1 | 9.3520 | 0.90 | 1.67790 | 54.89 |
| *2 | 4.8208 | 0.45 | | |
| 3 | 5.9177 | 1.85 | 1.81600 | 46.62 |
| 4 | 15.9734 | 0.35 | | |

TABLE 1-5-continued

| | | | | |
|---|---|---|---|---|
| 5 | 0.0000 | 1.95 | (Flare stop S1) | |
| 6 | 0.0000 | (d6) | (Aperture stop S) | |
| 7 | 0.0000 | 1.60 | (Flare stop S2) | |
| 8 | −4.6847 | 0.90 | 1.80810 | 22.76 |
| 9 | −18.5193 | 3.04 | 1.81600 | 46.62 |
| 10 | −6.7523 | 0.20 | | |
| 11 | 19.5054 | 3.10 | 1.66910 | 55.42 |
| *12 | −28.1863 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 4.8208
κ = −2.2502
C4 = +3.2855E−03
C6 = −1.1017E−04
C8 = +6.2421E−06
C10 = −1.6029E−07

Twelfth surface r = −28.1863
κ = +3.4908
C4 = +1.4959E−04
C6 = −3.4328E−07
C8 = +5.0300E−09
C10 = −5.9841E−11

[Various data]

f = 14.26
FNO = 2.92
2ω = 62.12
Y = 8.50
TL = 30.00

[Variable distance data]

| | Infinity | Close Object |
|---|---|---|
| d6 | 1.6152 | 0.3000 |
| d12 | 8.0762 | 9.3915 |
| Bf | 0.4989 | 0.4989 |

[Lens group data]

| | First surface | Focal length |
|---|---|---|
| First lens group | 1 | 36.9620 |
| Second lens group | 7 | 14.0056 |

[Conditional expression]

nd1 = 1.67790
f = 14.2560
f1 = 36.9620
D12 = 0.4500
r1R = 4.8208
r2F = 5.9177
Conditional expression (1) f/f1 = 0.3857
Conditional expression (2) D12/f = 0.0316
Conditional expression (3) nd1 = 1.67790
Conditional expression (4) (r2F + r1R)/(r2F − r1R) = 9.7901

As the parameter table in Table 1-5 shows, the imaging lens SL5 according to Example 1-5 satisfies all the conditional expressions (1) to (4).

Figure 12A:
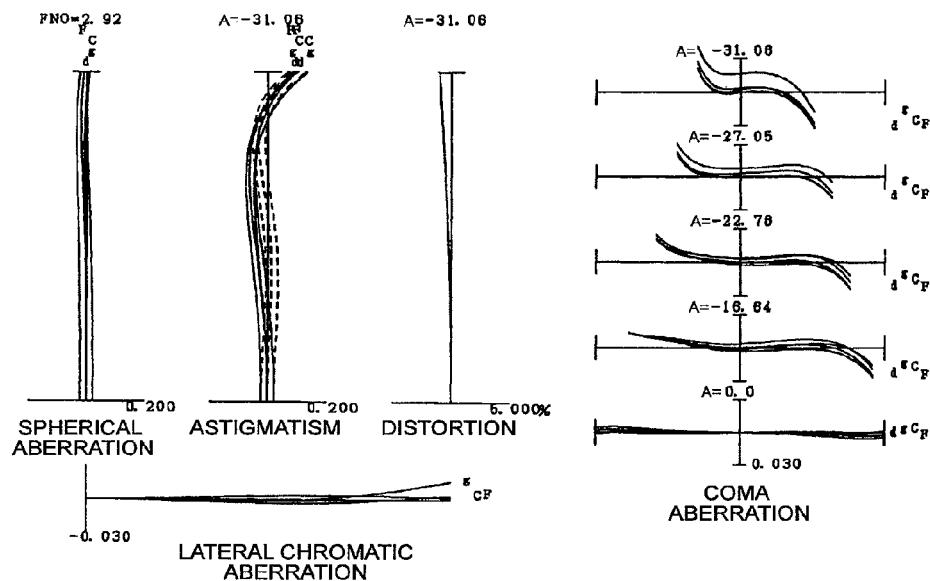
FIGS. 12A and 12B are graphs showing various aberrations of Example 1-5, where 12A are graphs showing various aberrations upon focusing on infinity, and 12B are graphs showing various aberrations upon focusing on a close object.
Figure 12B:
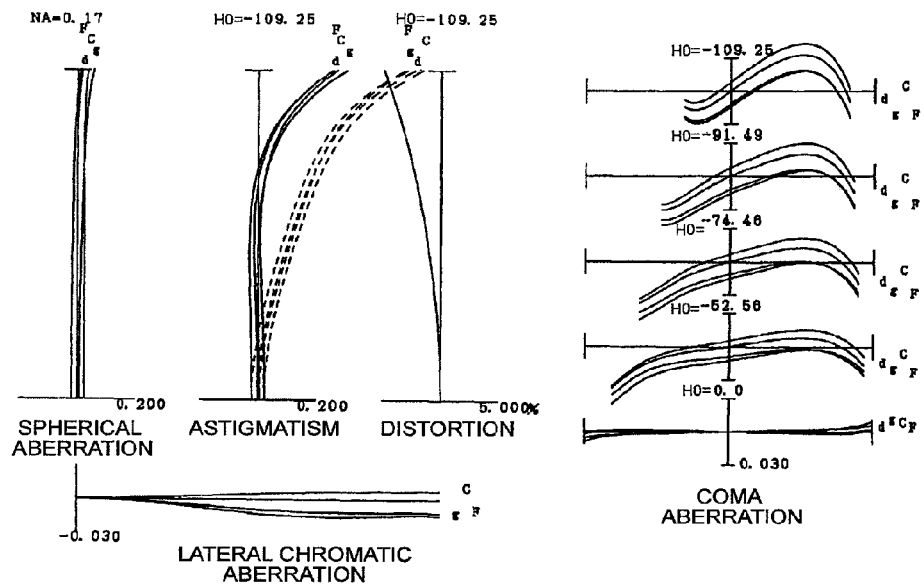

FIGS. 12A and 12B are graphs showing various aberrations of the imaging lens SL5 according to Example 1-5, where FIG. 12A are graphs showing various aberrations upon focusing on infinity, and FIG. 12B are graphs showing various aberrations upon focusing on a close object. As each graph showing aberrations shows, according to the imaging lens SL5 of the Example 1-5, various aberrations can be corrected satisfactorily from a state of focusing on infinity to a state of focusing on a close object, and excellent image forming performance is implemented.

Example 1-6

The imaging lens SL6 according to Example 1-6 will now be described with reference to FIG. 13, FIGS. 14A and 14B and Table 1-6. As FIG. 13 shows, in the imaging lens SL6 according to Example 1-6, a first lens group G1 comprises a negative meniscus lens L1 (first lens component) having a convex surface facing the object, and a positive meniscus lens L2 (second lens component) having a convex surface facing the object, which are disposed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post-positions of the aperture stop S.

In Example 1-6, an axial air distance d6 between the first lens group G1 and the second lens group G2, and an axial air distance d12 between the second lens group G2 and the filter group FL, change upon focusing.

Table 1-6 shows a table on each parameter of Example 1-6. The surface numbers 1 to 18 in Table 1-6 correspond to the surfaces 1 to 18 in FIG. 13. In Example 1-6, the second surface and the twelfth surface are aspherical.

TABLE 1-6

[Surface data]

| Surface number | r | d | nd | vd |
|---|---|---|---|---|
| 1 | 8.7469 | 0.90 | 1.67790 | 54.89 |
| *2 | 4.6799 | 0.45 | | |
| 3 | 5.8268 | 1.85 | 1.81600 | 46.62 |
| 4 | 14.7269 | 0.35 | | |
| 5 | 0.0000 | 1.95 | (Flare stop S1) | |
| 6 | 0.0000 | (d6) | (Aperture stop S) | |
| 7 | 0.0000 | 1.45 | (Flare stop S2) | |
| 8 | −4.7008 | 0.90 | 1.80810 | 22.76 |
| 9 | −19.5674 | 3.05 | 1.81600 | 46.62 |
| 10 | −6.8100 | 0.20 | | |
| 11 | 20.7908 | 3.10 | 1.66910 | 55.42 |
| *12 | −24.7647 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 4.6799
κ = −1.0342
C4 = +2.1291E−03
C6 = −2.5886E−05
C8 = +2.2070E−06
C10 = −5.3593E−08

TABLE 1-6-continued

[Twelfth surface]

r = −24.7647
κ = −7.3551
C4 = +6.0709E−05
C6 = +1.2096E−08
C8 = +2.7737E−09
C10 = −5.6169E−11

[Various data]

f = 14.26
FNO = 2.91
2ω = 62.12
Y = 8.50
TL = 30.00

[Variable distance data]

|  | Infinity | Close Object |
|---|---|---|
| d6 | 1.6575 | 0.3500 |
| d12 | 8.1725 | 9.4800 |
| Bf | 0.4953 | 0.4953 |

[Lens group data]

|  | First surface | Focal length |
|---|---|---|
| First lens group | 1 | 37.8004 |
| Second lens group | 7 | 13.8767 |

[Conditional expression]

nd1 = 1.67790
f = 14.2560
f1 = 37.8004
D12 = 0.4500
r1R = 4.6800
r2F = 5.8268
Conditional expression (1) f/f1 = 0.3771
Conditional expression (2) D12/f = 0.0316
Conditional expression (3) nd1 = 1.67790
Conditional expression (4) (r2F + r1R)/(r2F − r1R) = 9.1613

As the parameter table in Table 1-6 shows, the imaging lens SL6 according to Example 1-6 satisfies all the conditional expressions (1) to (4).

Figure 14A:
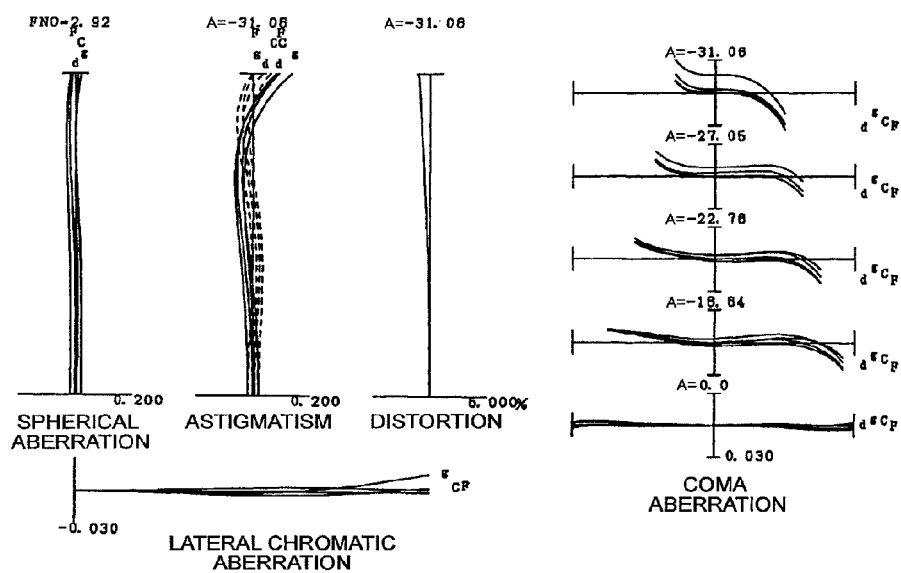
FIGS. 14A and 14B are graphs showing various aberrations of Example 1-6, where 14A are graphs showing various aberrations upon focusing on infinity, and 14B are graphs showing various aberrations upon focusing on a close object.
Figure 14B:
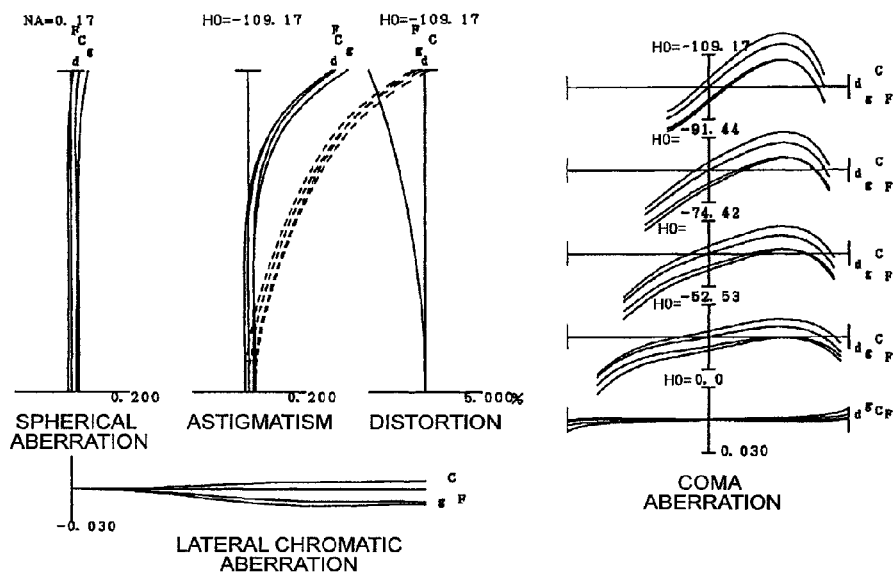

FIGS. 14A and 14B are graphs showing various aberrations of the imaging lens SL6 according to Example 1-6, where FIG. 14A are graphs showing various aberrations upon focusing on infinity, and FIG. 14B are graphs showing various aberrations upon focusing on a close object. As each graph showing aberrations shows, according to the imaging lens SL6 of the Example 1-6, various aberrations can be corrected satisfactorily from a state of focusing on infinity to a state of focusing on a close object, and excellent image forming performance is implemented.

Example 1-7

The imaging lens SL7 according to Example 1-7 will now be described with reference to FIG. 15, FIGS. 16A and 16B and Table 1-7. As FIG. 15 shows, in the imaging lens SL7 according to Example 1-7, a first lens group G1 comprises a negative meniscus lens L1 (first lens component) having a convex surface facing the object, and a positive meniscus lens L2 (second lens component) having a convex surface facing the object, which are disposed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post-positions of the aperture stop S.

In Example 1-7, an axial air distance d6 between the first lens group G1 and the second lens group G2, and an axial air distance d12 between the second lens group G2 and the filter group FL, change upon focusing.

Table 1-7 shows a table on each parameter of Example 1-7. The surface numbers 1 to 18 in Table 1-7 correspond to the surfaces 1 to 18 in FIG. 15. In Example 1-7, the second surface and the twelfth surface are aspherical.

TABLE 1-7

[Surface data]

| Surface number | r | d | nd | νd |
|---|---|---|---|---|
| 1 | 14.0147 | 0.90 | 1.67790 | 54.89 |
| *2 | 5.4694 | 0.90 |  |  |
| 3 | 7.6437 | 1.75 | 1.88300 | 40.76 |
| 4 | 30.8895 | 0.25 |  |  |
| 5 | 0.0000 | 1.60 | (Flare stop S1) |  |
| 6 | 0.0000 | (d6) | (Aperture stop S) |  |
| 7 | 0.0000 | 1.25 | (Flare stop S2) |  |
| 8 | −5.1623 | 0.95 | 1.80810 | 22.76 |
| 9 | −14.4718 | 2.75 | 1.75500 | 52.32 |
| 10 | −6.7218 | 0.20 |  |  |
| 11 | 26.5149 | 2.85 | 1.59201 | 67.02 |
| *12 | −18.8905 | (d12) |  |  |
| 13 | 0.0000 | 1.00 | 1.51633 | 64.14 |
| 14 | 0.0000 | 1.50 |  |  |
| 15 | 0.0000 | 1.87 | 1.51633 | 64.14 |
| 16 | 0.0000 | 0.40 |  |  |
| 17 | 0.0000 | 0.70 | 1.51633 | 64.14 |
| 18 | 0.0000 | (Bf) |  |  |

[Aspherical data]

Second surface r = 5.4694
κ = +1.4173
C4 = −6.4702E−04
C6 = −2.1283E−05
C8 = −4.5161E−07
C10 = −6.2922E−08

Twelfth surface r = −18.8905
κ = +5.5850
C4 = +2.2637E−04
C6 = +8.5167E−07
C8 = +1.1963E−08
C10 = +1.5290E−10

[Various data]

f = 14.26
FNO = 2.83
2ω = 62.07
Y = 8.50
TL = 32.01

[Variable distance data]

|  | Infinity | Close Object |
|---|---|---|
| d6 | 2.0676 | 0.8000 |
| d12 | 10.5324 | 11.8300 |
| Bf | 0.5145 | 0.5145 |

TABLE 1-7-continued

[Lens group data]

|  | First surface | Focal length |
|---|---|---|
| First lens group | 1 | 51.9495 |
| Second lens group | 7 | 15.2959 |

[Conditional expression]

nd1 = 1.67790
f = 14.2560
f1 = 51.9495
D12 = 0.9000
r1R = 5.4694
r2F = 7.6437
Conditional expression (1) f/f1 = 0.2744
Conditional expression (2) D12/f = 0.0631
Conditional expression (3) nd1 = 1.67790
Conditional expression (4) (r2F + r1R)/(r2F − r1R) = 6.0310

As the parameter table in Table 1-7 shows, the imaging lens SL7 according to Example 1-7 satisfies all the conditional expressions (1) to (4).

Figure 16A:
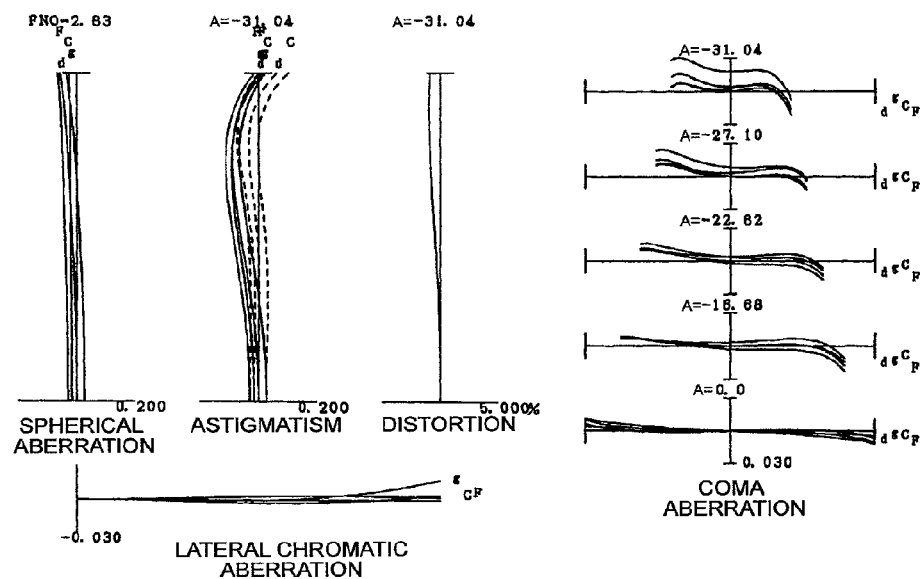
FIGS. 16A and 16B are graphs showing various aberrations of Example 1-7, where 16A are graphs showing various aberrations upon focusing on infinity, and 16B are graphs showing various aberrations upon focusing on a close object.
Figure 16B:
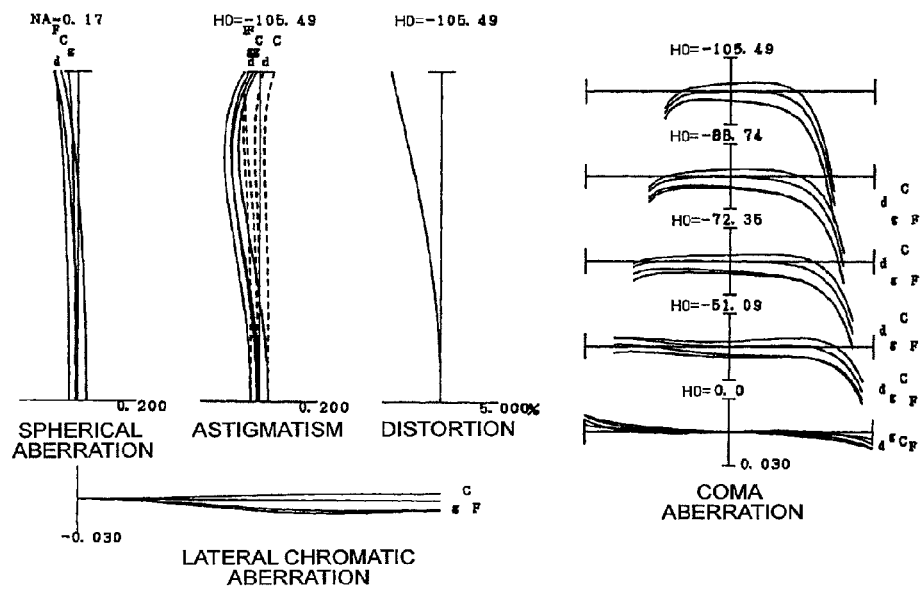

FIGS. 16A and 16B are graphs showing various aberrations of the imaging lens SL7 according to Example 1-7, where FIG. 16A are graphs showing various aberrations upon focusing on infinity, and FIG. 16B are graphs showing various aberrations upon focusing on a close object. As each graph showing aberrations shows, according to the imaging lens SL7 of the Example 1-7, various aberrations can be corrected satisfactorily from a state of focusing on infinity to a state of focusing on a close object, and excellent image forming performance is implemented.

Example 1-8

The imaging lens SL8 according to Example 1-8 will now be described with reference to FIG. 17, FIGS. 18A and 18B and Table 1-8. As FIG. 17 shows, in the imaging lens SL8 according to Example 1-8, a first lens group G1 comprises a negative meniscus lens L1 (first lens component) having a convex surface facing the object, and a positive meniscus lens L2 (second lens component) having a convex surface facing the object, which are disposed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post-positions of the aperture stop S.

In Example 1-8, an axial air distance d6 between the first lens group G1 and the second lens group G2, and an axial air distance d12 between the second lens group G2 and the filter group FL, change upon focusing.

Table 1-8 shows a table on each parameter of Example 1-8. The surface numbers 1 to 18 in Table 1-8 correspond to the surfaces 1 to 18 in FIG. 17. In Example 1-8, the second surface and the twelfth surface are aspherical.

TABLE 1-8

[Surface data]

| Surface number | r | d | nd | vd |
|---|---|---|---|---|
| 1 | 14.0077 | 1.30 | 1.67790 | 54.89 |
| *2 | 5.3933 | 0.60 | | |
| 3 | 7.5715 | 1.95 | 1.88300 | 40.76 |
| 4 | 28.3663 | 0.25 | | |
| 5 | 0.0000 | 1.75 | (Flare stop S1) | |
| 6 | 0.0000 | (d6) | (Aperture stop S) | |
| 7 | 0.0000 | 1.25 | (Flare stop S2) | |
| 8 | −5.2273 | 0.98 | 1.80810 | 22.76 |
| 9 | −15.1471 | 2.88 | 1.75500 | 52.32 |
| 10 | −6.7013 | 0.20 | | |
| 11 | 23.0044 | 2.94 | 1.59201 | 67.02 |
| *12 | −20.7345 | 8.96 | | |
| 13 | 0.0000 | 0.50 | 1.51633 | 64.14 |
| 14 | 0.0000 | 4.60 | | |
| 15 | 0.0000 | 1.87 | 1.51633 | 64.14 |
| 16 | 0.0000 | 0.30 | | |
| 17 | 0.0000 | 0.70 | 1.51633 | 64.14 |
| 18 | 0.0000 | (Bf) | | |

[Aspherical data]

Second surface r = 5.3933
κ = +1.7327
C4 = −9.1467E−04
C6 = −4.4123E−05
C8 = +8.7126E−07
C10 = −2.7436E−07

Twelfth surface r = −20.7345
κ = −19.0000
C4 = −1.4487E−04
C6 = +4.4684E−06
C8 = −5.5750E−08
C10 = +3.1253E−10

[Various data]

f = 14.26
FNO = 2.92
2ω = 62.50
Y = 8.50
TL = 32.36

[Variable distance data]

|  | Infinity | Close Object |
|---|---|---|
| d6 | 2.0376 | 0.8000 |
| d12 | 7.7203 | 8.9579 |
| Bf | 0.5348 | 0.5348 |

[Lens group data]

|  | First surface | Focal length |
|---|---|---|
| First lens group | 1 | 51.9495 |
| Second lens group | 7 | 14.3554 |

[Conditional expression]

nd1 = 1.67790
f = 14.2560
f1 = 67.2632
D12 = 0.6000
r1R = 5.3933
r2F = 7.5715
Conditional expression (1) f/f1 = 0.2119
Conditional expression (2) D12/f = 0.0421
Conditional expression (3) nd1 = 1.67790
Conditional expression (4) (r2F + r1R)/(r2F − r1R) = 5.9520

As the parameter table in Table 1-8 shows, the imaging lens SL8 according to Example 1-8 satisfies all the conditional expressions (1) to (4).

Figure 18A:
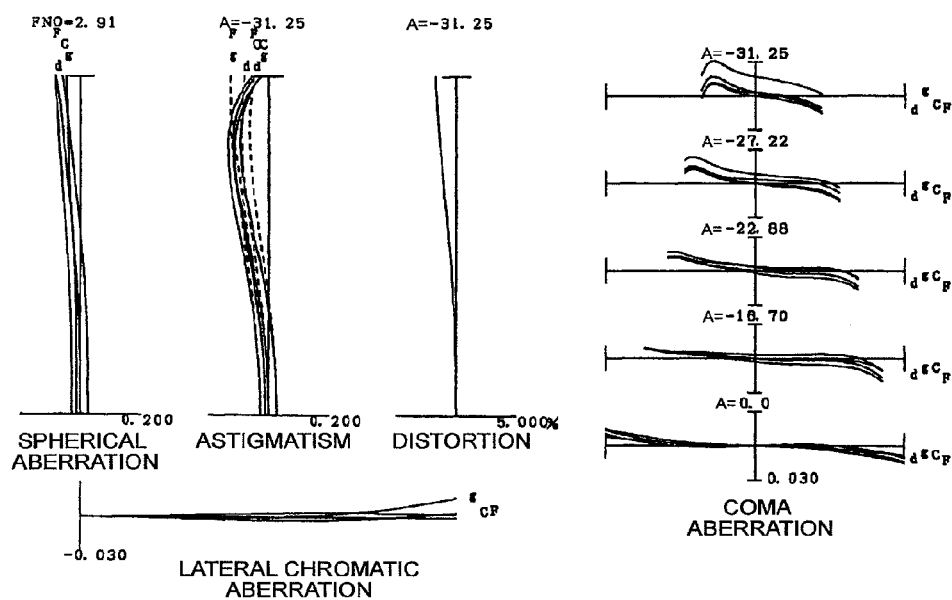
FIGS. 18A and 18B are graphs showing various aberrations of Example 1-8, where 18A are graphs showing various aberrations upon focusing on infinity, and 18B are graphs showing various aberrations upon focusing on a close object.
Figure 18B:
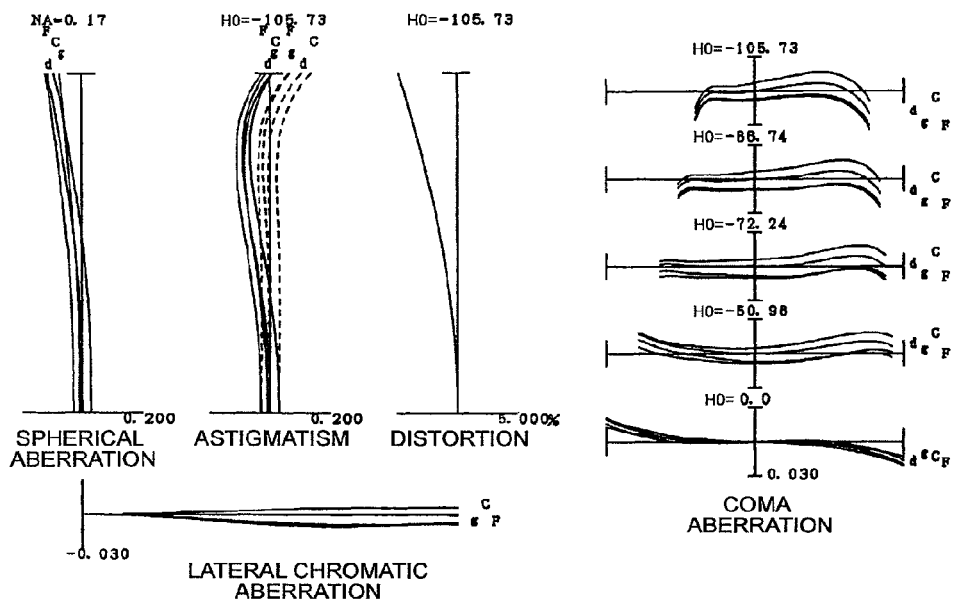

FIGS. 18A and 18B are graphs showing various aberrations of the imaging lens SL8 according to Example 1-8, where FIG. 18A are graphs showing various aberrations upon focusing on infinity, and FIG. 18B are graphs showing various aberrations upon focusing on a close object. As each graph showing aberrations shows, according to the imaging lens SL8 of the Example 1-8, various aberrations can be corrected satisfactorily from a state of focusing on infinity to a state of focusing on a close object, and excellent image forming performance is implemented.

Second Embodiment

A second embodiment of the imaging lens according to the present invention will now be described. The second embodiment includes examples (Example 2-1 to Example 2-8) herein below.

The imaging lens SL according to the second embodiment includes configurations of Example 2-1 to Example 2-8 shown in FIG. 19, FIG. 21, FIG. 23, FIG. 25, FIG. 27, FIG. 29, FIG. 31 and FIG. 33, but is described using the configuration in FIG. 19 as an example. This imaging lens SL comprises a first lens group G1 having a positive refractive power, and a second lens group G2 having a positive refractive power, which are disposed in order from an object, wherein the first lens group G1 further comprises a plurality of lenses (two lenses, lens L1 and lens L2 in FIG. 19), and the second lens group G2 further comprises a cemented lens L34 of a negative lens L3 having a concave surface facing the object and a positive lens L4 having a convex surface facing the image, and a biconvex positive lens L5, which are disposed in order from the object. Because of this configuration, the imaging lens SL according to the second embodiment, of which angle of view exceeds 60°, and which is compact and can implement excellent image forming performance, can be created.

In the second embodiment having the above configuration, a condition expressed by the following expression (5)

$$3.0 < TL/Y\text{max} < 4.0 \tag{5}$$

is satisfied, where TL is the total length of the imaging lens (length on the optical axis from the first surface from the object to the image plane in FIG. 19), and Ymax is the maximum image height.

The conditional expression (5) is a conditional expression to specify an appropriate total length for implementing downsizing and higher performance. If the upper limit value of the conditional expression (5) is exceeded, the total length of the lens system increases, which is advantageous for correcting aberrations, but looses the balance of downsizing and higher performance, and an increase in the total length of the lens system runs counter to the intent of the present invention, therefore is not preferable. If the lower limit value of the conditional expression (5) is not reached, on the other hand, this is advantageous for downsizing, but the spherical aberration, coma aberration and curvature of field generated in the imaging lens cannot be corrected satisfactorily, which is not preferable.

To make the effect of the present invention certain, it is preferable that the upper limit value of the conditional expression (5) is 3.95. To make the effect of the present invention more certain, it is preferable that the upper limit value of the conditional expression (5) is 3.90.

To make the effect of the present invention certain, it is preferable that the lower limit value of the conditional expression (5) is 3.10. To make the effect of the present invention more certain, it is preferable that the lower limit value of the conditional expression (5) is 3.30.

In the second embodiment, it is preferable that a condition expressed by the following expression (6)

$$1.7 < TL/\Sigma d < 2.2 \tag{6}$$

is satisfied, where TL is a total length of the imaging lens, and $\Sigma d$ is a length on the optical axis from the lens surface closest to the object in the first lens group (first surface from the object in FIG. 19), and the lens surface closest to the image in the second lens group (twelfth surface from the object in FIG. 19).

The conditional expression (6) is a conditional expression to specify an appropriate total length for implementing downsizing and higher performance. If the upper limit value of the conditional expression (6) is exceeded, the total length of the lens system increases, which is advantageous for correcting aberrations, but looses the balance of downsizing and higher performance, and the increase in total length of the lens system runs counter to the intent of the present invention, therefore is not preferable. If the lower limit value of the conditional expression (6) is not reached, on the other hand, this is advantageous for downsizing, but the spherical aberration, coma aberration and curvature of field generated in the imaging lens cannot be corrected satisfactorily, which is not preferable. This also makes it difficult to increase back focus.

To make the effect of the present invention certain, it is preferable that the upper limit value of the conditional expression (6) is 2.15. To make the effect of the present invention more certain, it is preferable that the upper limit value of the conditional expression (6) is 2.10. To make the effect of the present invention even more certain, it is preferable that the upper limit value of the conditional expression (6) is 2.05.

To make the effect of the present invention certain, it is preferable that the lower limit value of the conditional expression (6) is 1.75. To make the effect of the present invention more certain, it is preferable that the lower limit value of the conditional expression (6) is 1.80. To make the effect of the present invention even more certain, it is preferable that the lower limit value of the conditional expression (6) is 1.85.

In the second embodiment, it is preferable that the first lens group G1 further comprises a negative meniscus lens L1 having a convex surface facing the object, and a positive meniscus lens L2 having a convex surface facing the object. Because of this configuration, in the imaging lens SL of the second embodiment, higher performance and downsizing can be balanced satisfactorily, and the spherical aberration and curvature of field generated in the first lens group G1 alone can be corrected satisfactorily.

In the second embodiment, it is preferable that the first lens group G1 includes at least one aspherical surface (second surface from the object in FIG. 19). Because of this configuration, higher performance and downsizing can be balanced, and the spherical aberration and curvature of field can be corrected satisfactorily.

In the second embodiment, it is preferable that the second lens group G2 further comprises a cemented lens L34 of a negative meniscus lens L3 having a concave surface facing the object and a positive meniscus lens L4 having a convex surface facing the image, and a biconvex positive lens L5, which are disposed in order from the object. Because of this configuration, curvature of field and coma aberration can be corrected satisfactorily, and higher performance of the present imaging lens SL can be implemented.

In the second embodiment, it is preferable that focus on a close object is adjusted by moving the second lens group G2 toward the object. Because of this configuration, fluctuation of aberration upon focus adjustment can be suppressed, and interference of a lens or a mechanical component to support a lens can be prevented, since the feed pitch of the second lens group G2 toward the object upon focus adjustment is very small. It is possible to adjust focus on a close object using the first lens group G1, but the feed pitch toward the object becomes very large, which causes a change in the total length of the lens. Along with this change, such a mechanism as a drive system becomes complicated, and downsizing becomes difficult. Also deterioration of the spherical aberration and curvature of field increase, which is not preferable.

In the second embodiment, it is preferable that the second lens group G2 includes at least one aspherical surface (twelfth surface from the object in FIG. 19). Because of this configuration, fluctuation of distortion and curvature of field generated upon focusing can be corrected satisfactorily, and higher performance of the present imaging lens SL can be implemented.

In the second embodiment, in order to prevent failure of photography due to an image blur caused by camera motion, it is possible that a blur detection system for detecting the blur of the lens system and the drive means are combined in the lens system, and all or a part of one lens group, out of the lens group constituting the lens system, are decentered as a shift lens group, and an image is shifted by driving the shift lens group by the drive means so as to correct the image blur (fluctuation of image plane position) caused by a blur of the lens system detected by the blur detection system, thereby the image blur can be corrected. As mentioned above, the imaging lens SL of the second embodiment can function as a vibration proof optical system.

The imaging lens SL according to the second embodiment comprises two lens groups, that is, the first lens group G1 and the second lens group G2, but another lens group may be added between the lens groups, or another lens group may be added adjacent to the image side of the first lens group G1 or the object side of the second lens group G2.

In the imaging lens SL according to the second embodiment, it is preferable that the distance from the image side lens surface to the image plane (back focus) of the positive lens L5 disposed closest to the image is about 10 to 30 mm in the shortest state. In the imaging lens SL, it is preferable that the image height is 5 to 12.5 mm, and more preferably is 5 to 9.5 mm.

Examples of the Second Embodiment

Example 2-1 to Example 2-8 according to the second embodiment will now be described with reference to the drawings. FIG. 19, FIG. 21, FIG. 23, FIG. 25, FIG. 27, FIG. 29, FIG. 31 and FIG. 33 are cross-sectional views depicting a configuration of the imaging lens SL (SL1 to SL8) according to each example, where the change of focusing state, from focusing on infinity to focusing on a close object of the imaging lenses SL1 to SL8, that is, the state of movement of each lens group upon focusing, is shown by an arrow.

As described above, the imaging lens SL1 to SL8 according to each example comprises a first lens group G1 having a positive refractive power, an aperture stop S, a second lens group G2 having a positive refractive power, and a filter group FL which includes a low pass filter, infrared cut filter or the like, which are disposed in order from an object. Upon focusing from the state of focusing on infinity to the state of focusing on a close object, the first lens group G1 is fixed with respect to the image plane I, and the second lens group G2 is moved with respect to the image plane I, so as to change the distance between the first lens group G1 and the second lens group G2. The image plane I is formed on an unillustrated image sensing element, and this image sensing element is CCD or CMOS, for example.

Table 2-1 to Table 2-8 shown below are tables of each parameter according to Example 2-1 to Example 2-8. Description of the tables, which is the same as the tables of the first embodiment, is omitted. In the [conditional expression], values corresponding to the expressions (5) and (6) are shown.

Example 2-1

The imaging lens SL1 according to Example 2-1 will now be described with reference to FIG. 19, FIGS. 20A and 20B and Table 2-1. As FIG. 19 shows, in the imaging lens SL1 according to Example 2-1, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 2-1, an axial air distance d6, between the first lens group G1 and the second lens group G2, and an axial air distance d12 between the second lens group G2 and the filter group FL change upon focusing.

Table 2-1 shows a table on each parameter of Example 2-1. The surface numbers 1 to 18 in Table 2-1 correspond to the surfaces 1 to 18 in FIG. 19. In Example 2-1, the second surface and the twelfth surface are aspherical.

TABLE 2-1

[Surface data]

| Surface number | r | d | nd | vd |
|---|---|---|---|---|
| 1 | 12.5540 | 0.90 | 1.67790 | 54.89 |
| *2 | 5.1200 | 0.80 | | |
| 3 | 7.2279 | 1.90 | 1.88300 | 40.76 |
| 4 | 25.2952 | 0.80 | | |
| 5 | 0.0000 | 1.40 | (Flare stop S1) | |
| 6 | 0.0000 | (d6) | (Aperture stop S) | |
| 7 | 0.0000 | 1.00 | (Flare stop S2) | |
| 8 | −5.1593 | 0.90 | 1.80810 | 22.76 |
| 9 | −15.0968 | 2.65 | 1.75500 | 52.32 |
| 10 | −6.5278 | 0.20 | | |
| 11 | 25.0474 | 2.70 | 1.58913 | 61.16 |
| *12 | −19.8008 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

TABLE 2-1-continued

[Aspherical data]

Second surface r = 5.1200
κ = +0.9952
C4 = −3.5496E−04
C6 = −1.3835E−05
C8 = −6.4411E−08
C10 = −2.8213E−08

Twelfth surface r = −19.8008
κ = +5.2781
C4 = +2.1953E−04
C6 = −1.0580E−07
C8 = +2.9574E−08
C10 = −2.6872E−10

[Various data]

f = 14.26
FNO = 2.83
2ω = 62.12
Y = 8.50
TL = 31.51

[Variable distance data]

|  | Infinity | Close Object |
|---|---|---|
| d6 | 1.8514 | 0.6000 |
| d12 | 10.4286 | 11.6800 |
| Bf | 0.5058 | 0.5058 |

[Lens group data]

|  | First surface | Focal length |
|---|---|---|
| First lens group | 1 | 58.2236 |
| Second lens group | 7 | 14.9735 |

[Conditional expression]

TL = 31.5058
Ymax = 8.5000
Σd = 15.1014
Conditional expression (5) TL/Ymax = 3.7066
Conditional expression (6) TL/Σd = 2.0863

As the parameter table in Table 2-1 shows, the imaging lens SL1 according to Example 2-1 satisfies the conditional expressions (5) and (6).

Figure 20A:
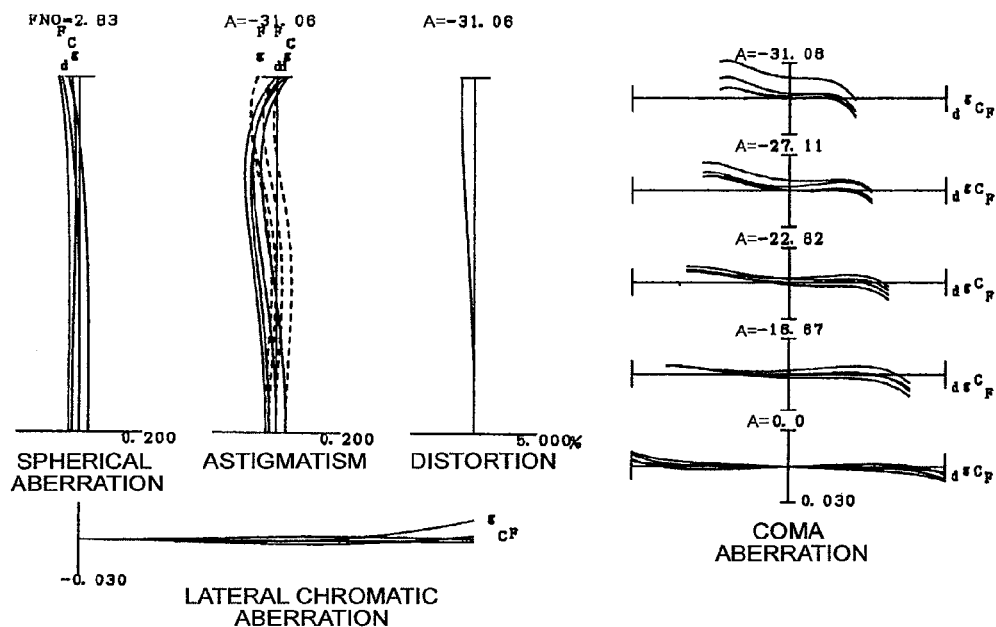
FIGS. 20A and 20B are graphs showing various aberrations of Example 2-1, where 20A are graphs showing various aberrations upon focusing on infinity, and 20B are graphs showing various aberrations upon focusing on a close object.
Figure 20B:
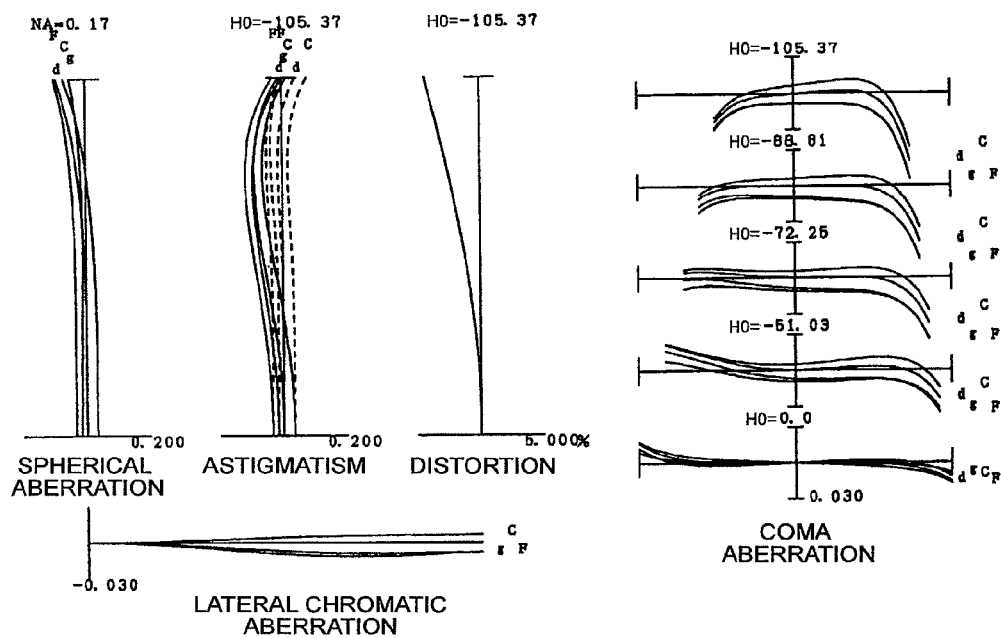

FIGS. 20A and 20B are graphs showing various aberrations of the imaging lens SL1 according to Example 2-1, where FIG. 20A are graphs showing various aberrations upon focusing on infinity, and FIG. 20B are graphs showing various aberrations upon focusing on a close object. In each graph showing aberrations, NA is a numerical aperture, FNO is an F number, A is a half angle of view with respect to each image height, and HO is a height of an object. d indicates aberrations with respect to the d-line (wavelength: 587.6 nm), g indicates aberrations with respect to the g-line (wavelength: 435.8 nm), C indicates aberrations with respect to the C-line (wavelength: 656.3 nm), and F indicates aberrations with respect to the F-line (wavelength: 486.1 nm). Aberrations with no description indicate aberrations with respect to the d-line. In the graph showing astigmatism, a solid line indicates a sagittal image surface, and a broken line indicates a meridional image surface.

The above description on the graphs showing aberrations is the same for other examples, therefore description thereof is omitted.

Also each graph showing aberrations show, according to the imaging lens SL1 of Example 2-1, various aberrations can be corrected satisfactorily from a state of focusing on infinity to a state of focusing on a close object, and excellent imaging performance is Implemented.

Example 2-2

The imaging lens SL2 according to Example 2-2 will now be described with reference to FIG. 21, FIGS. 22A and 22B and Table 2-2. As FIG. 21 shows, in the imaging lens SL2 according to Example 2-2, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 2-2, an axial air distance d6, between the first lens group G1 and the second lens group G2, and an axial air distance d12 between the second lens group G2 and the filter group FL change upon focusing.

Table 2-2 shows a table on each parameter of Example 2-2. The surface numbers 1 to 18 in Table 2-2 correspond to the surfaces 1 to 18 in FIG. 21. In Example 2-2, the second surface and the twelfth surface are aspherical.

TABLE 2-2

[Surface data]

| Surface number | r | d | nd | νd |
|---|---|---|---|---|
| 1 | 11.8261 | 0.90 | 1.67790 | 54.89 |
| *2 | 5.0108 | 0.65 |  |  |
| 3 | 7.0263 | 1.85 | 1.88300 | 40.76 |
| 4 | 23.3567 | 0.70 |  |  |
| 5 | 0.0000 | 1.40 | (Flare stop S1) |  |
| 6 | 0.0000 | (d6) | (Aperture stop S) |  |
| 7 | 0.0000 | 1.00 | (Flare stop S2) |  |
| 8 | −5.0661 | 0.90 | 1.80810 | 22.76 |
| 9 | −14.6310 | 2.70 | 1.75500 | 52.32 |
| 10 | −6.3977 | 0.20 |  |  |
| 11 | 23.5294 | 2.70 | 1.58913 | 61.16 |
| *12 | −21.4493 | (d12) |  |  |
| 13 | 0.0000 | 1.00 | 1.51633 | 64.14 |
| 14 | 0.0000 | 1.50 |  |  |
| 15 | 0.0000 | 1.87 | 1.51633 | 64.14 |
| 16 | 0.0000 | 0.40 |  |  |
| 17 | 0.0000 | 0.70 | 1.51633 | 64.14 |
| 18 | 0.0000 | (Bf) |  |  |

[Aspherical data]

Second surface r = 5.0108
κ = +0.1277
C4 = +4.8479E−04
C6 = +5.6078E−06
C8 = +1.1439E−07
C10 = +2.6889E−09

TABLE 2-2-continued

Twelfth surface r = −21.4493
κ = −5.6807
C4 = +6.6823E−05
C6 = −6.8560E−08
C8 = +2.3185E−08
C10 = −3.6236E−10

[Various data]

f = 14.26
FNO = 2.88
2ω = 62.12
Y = 8.50
TL = 31.01

[Variable distance data]

|  | Infinity | Close Object |
|---|---|---|
| d6 | 1.8508 | 0.6000 |
| d12 | 10.1792 | 11.4301 |
| Bf | 0.5070 | 0.5070 |

[Lens group data]

|  | First surface | Focal length |
|---|---|---|
| First lens group | 1 | 56.8827 |
| Second lens group | 7 | 14.7636 |

[Conditional expression]

TL = 31.0070
Ymax = 8.5000
Σd = 14.8508
Conditional expression (5) TL/Ymax = 3.6479
Conditional expression (6) TL/Σd = 2.0879

As the parameter table in Table 2-2 shows, the imaging lens SL2 according to Example 2-2 satisfies the conditional expressions (5) and (6).

Figure 22A:
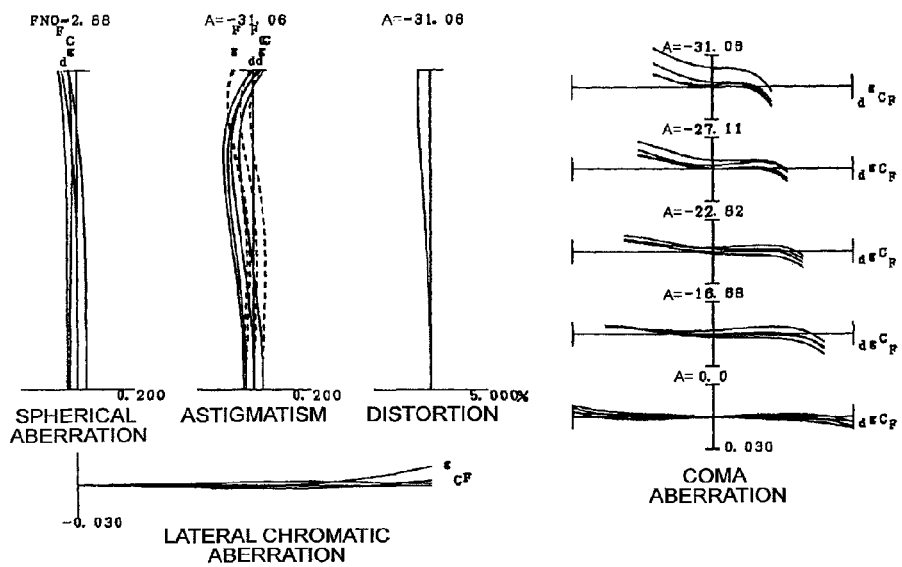
FIGS. 22A and 22B are graphs showing various aberrations of Example 2-2, where 22A are graphs showing various aberrations upon focusing on infinity, and 22B are graphs showing various aberrations upon focusing on a close object.
Figure 22B:
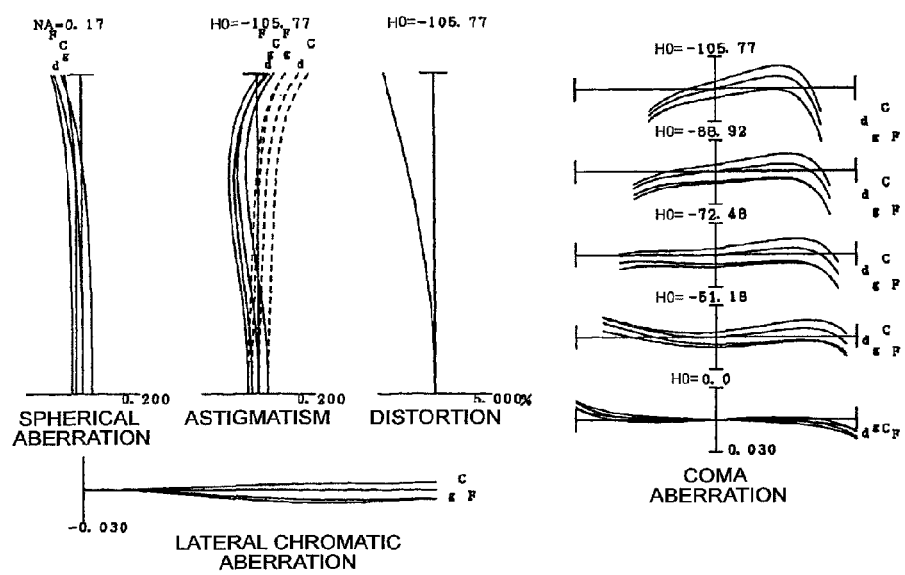

FIGS. 22A and 22B are graphs showing various aberrations of the imaging lens SL2 according to Example 2-2, where FIG. 22A are graphs showing various aberrations upon focusing on infinity, and FIG. 22B are graphs showing various aberrations upon focusing on a close object. Also each graph showing aberrations show, according to the imaging lens SL2 of Example 2-2, various aberrations can be corrected satisfactorily from a state of focusing on infinity to a state of focusing on a close object, and excellent imaging performance is implemented.

Example 2-3

The imaging lens SL3 according to Example 2-3 will now be described with reference to FIG. 23, FIGS. 24A and 24B and Table 2-3. As FIG. 23 shows, in the imaging lens SL3 according to Example 2-3, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 2-3, an axial air distance d6, between the first lens group G1 and the second lens group G2, and an axial air distance d12 between the second lens group G2 and the filter group FL change upon focusing.

Table 2-3 shows a table on each parameter of Example 2-3. The surface numbers 1 to 18 in Table 2-3 correspond to the surfaces 1 to 18 in FIG. 23. In Example 2-3, the second surface and the twelfth surface are aspherical.

TABLE 2-3

| Surface number | r | d | nd | νd |
|---|---|---|---|---|
| 1 | 12.6464 | 0.90 | 1.66910 | 55.42 |
| *2 | 5.7001 | 0.75 |  |  |
| 3 | 7.7231 | 1.67 | 1.88300 | 40.76 |
| 4 | 24.6238 | 0.20 |  |  |
| 5 | 0.0000 | 1.40 | (Flare stop S1) |  |
| 6 | 0.0000 | (d6) | (Aperture stop S) |  |
| 7 | 0.0000 | 1.50 | (Flare stop S2) |  |
| 8 | −5.0699 | 0.90 | 1.80810 | 22.76 |
| 9 | −18.5950 | 3.00 | 1.80400 | 46.57 |
| 10 | −7.0355 | 0.20 |  |  |
| 11 | 26.7580 | 3.12 | 1.61881 | 63.85 |
| *12 | −18.8179 | (d12) |  |  |
| 13 | 0.0000 | 1.00 | 1.51633 | 64.14 |
| 14 | 0.0000 | 1.50 |  |  |
| 15 | 0.0000 | 1.87 | 1.51633 | 64.14 |
| 16 | 0.0000 | 0.40 |  |  |
| 17 | 0.0000 | 0.70 | 1.51633 | 64.14 |
| 18 | 0.0000 | (Bf) |  |  |

[Aspherical data]

Second surface r = 5.7001
κ = +1.7002
C4 = −7.4793E−04
C6 = −3.1424E−05
C8 = +2.0843E−07
C10 = −1.3010E−07

Twelfth surface r = −18.8179
κ = −7.0961
C4 = −3.0038E−05
C6 = +1.0404E−06
C8 = −1.2568E−09
C10 = −4.7030E−11

[Various data]

f = 14.26
FNO = 2.91
2ω = 62.12
Y = 8.50
TL = 32.01

[Variable distance data]

|  | Infinity | Close Object |
|---|---|---|
| d6 | 2.4197 | 1.1500 |
| d12 | 9.9683 | 11.2380 |
| Bf | 0.5123 | 0.5123 |

[Lens group data]

|  | First surface | Focal length |
|---|---|---|
| First lens group | 1 | 48.8782 |
| Second lens group | 7 | 14.6742 |

TABLE 2-3-continued

[Conditional expression]

TL = 32.0123
Ymax = 8.5000
Σd = 16.0617
Conditional expression (5) TL/Ymax = 3.7661
Conditional expression (6) TL/Σd = 1.9931

As the parameter table in Table 2-3 shows, the imaging lens SL3 according to Example 2-3 satisfies the conditional expressions (5) and (6).

Figure 24A:
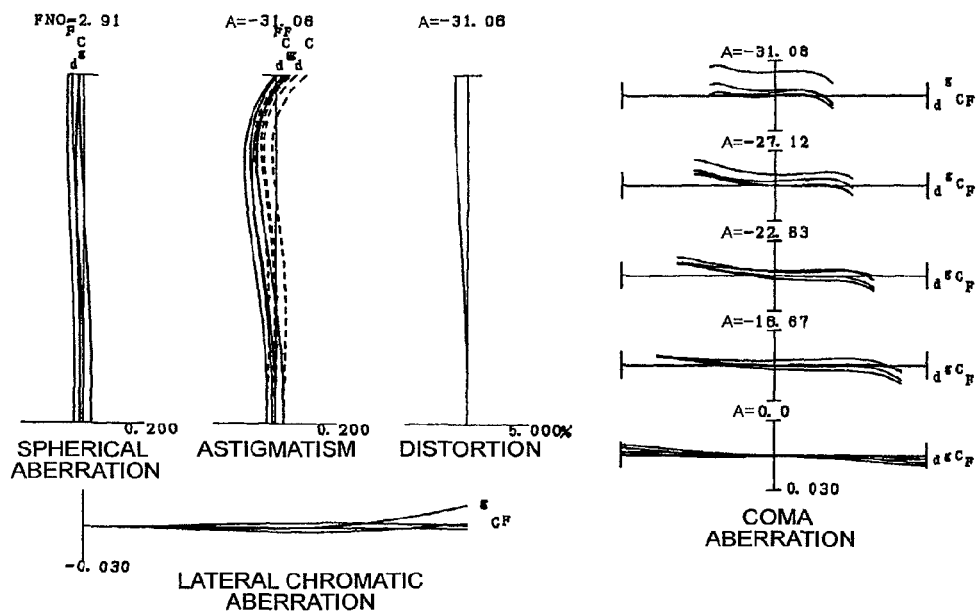
FIGS. 24A and 24B are graphs showing various aberrations of Example 2-3, where 24A are graphs showing various aberrations upon focusing on infinity, and 24B are graphs showing various aberrations upon focusing on a close object.
Figure 24B:
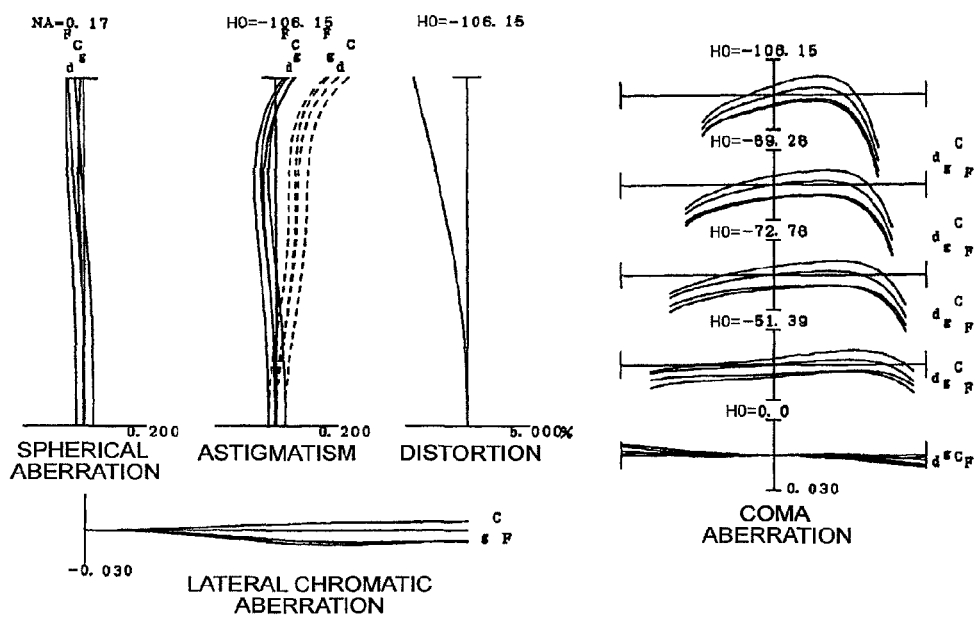

FIGS. 24A and 24B are graphs showing various aberrations of the imaging lens SL3 according to Example 2-3, where FIG. 24A are graphs showing various aberrations upon focusing on infinity, and FIG. 24B are graphs showing various aberrations upon focusing on a close object. Also each graph showing aberrations show, according to the imaging lens SL3 of Example 2-3, various aberrations can be corrected satisfactorily from a state of focusing on infinity to a state of focusing on a close object, and excellent imaging performance is implemented.

Example 2-4

Figure 25:
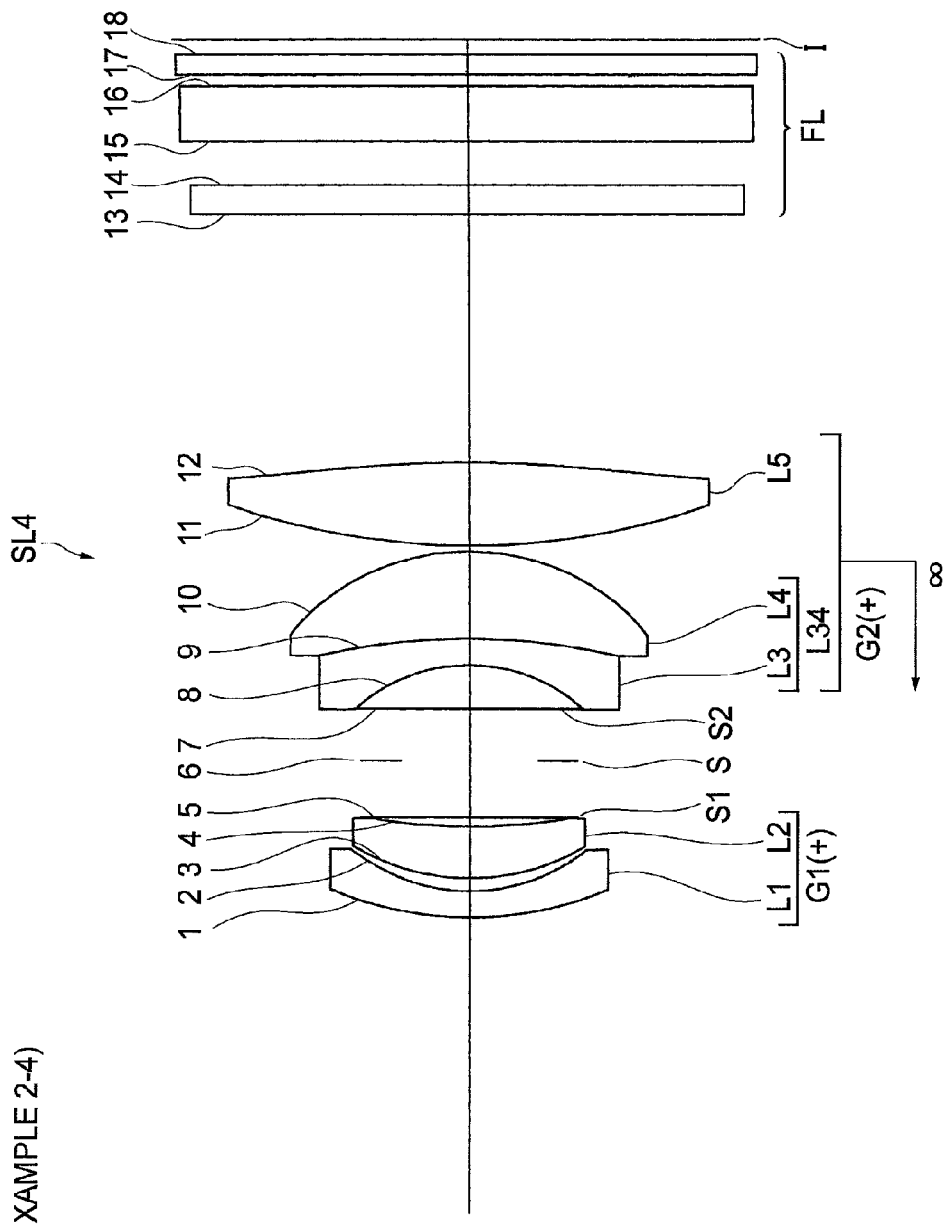
FIG. 25 is a cross-sectional view depicting a configuration of the imaging lens according to Example 2-4.

The imaging lens SL4 according to Example 2-4 will now be described with reference to FIG. 25, FIGS. 26A and 263 and Table 2-4. As FIG. 25 shows, in the imaging lens SL4 according to Example 2-4, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 2-4, an axial air distance d6, between the first lens group G1 and the second lens group G2, and an axial air distance d12 between the second lens group G2 and the filter group FL change upon focusing.

Table 2-4 shows a table on each parameter of Example 2-4. The surface numbers 1 to 18 in Table 2-4 correspond to the surfaces 1 to 18 in FIG. 25. In Example 2-4, the second surface and the twelfth surface are aspherical.

TABLE 2-4

[Surface data]

| Surface number | r | d | nd | vd |
|---|---|---|---|---|
| 1 | 9.9874 | 0.90 | 1.68893 | 31.08 |
| *2 | 5.0739 | 0.45 | | |
| 3 | 6.3837 | 1.76 | 1.85026 | 32.35 |
| 4 | 17.4312 | 0.30 | | |
| 5 | 0.0000 | 1.95 | (Flare stop S1) | |
| 6 | 0.0000 | 0.45 | (Aperture stop S) | |
| 7 | 0.0000 | 1.50 | (Flare stop S2) | |
| 8 | −4.8003 | 0.90 | 1.80810 | 22.76 |
| 9 | −18.5588 | 2.98 | 1.81600 | 46.62 |
| 10 | −6.7015 | 0.20 | | |
| 11 | 20.2148 | 2.86 | 1.66910 | 55.42 |
| *12 | −30.3443 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 5.0739
κ = −2.9635
C4 = +3.4708E−03
C6 = −1.4779E−04
C8 = +8.3851E−06
C10 = −2.3110E−07

Twelfth surface r = −30.3443
κ = −0.7304
C4 = +1.2477E−04
C6 = +4.7254E−07
C8 = +9.6784E−09
C10 = −1.1595E−10

[Various data]

f = 14.26
FNO = 2.91
2ω = 62.12
Y = 8.50
TL = 30.00

[Variable distance data]

| | Infinity | Close Object |
|---|---|---|
| d6 | 1.7473 | 0.4500 |
| d12 | 8.4731 | 9.7704 |
| Bf | 0.4998 | 0.4998 |

[Lens group data]

| | First surface | Focal length |
|---|---|---|
| First lens group | 1 | 39.8259 |
| Second lens group | 7 | 14.1972 |

[Conditional expression]

TL = 29.9998
Ymax = 8.5000
Σd = 15.5569
Conditional expression (5) TL/Ymax = 3.5294
Conditional expression (6) TL/Σd = 1.9284

As the parameter table in Table 2-4 shows, the imaging lens SL4 according to Example 2-4 satisfies the conditional expressions (5) and (6).

Figure 26A:
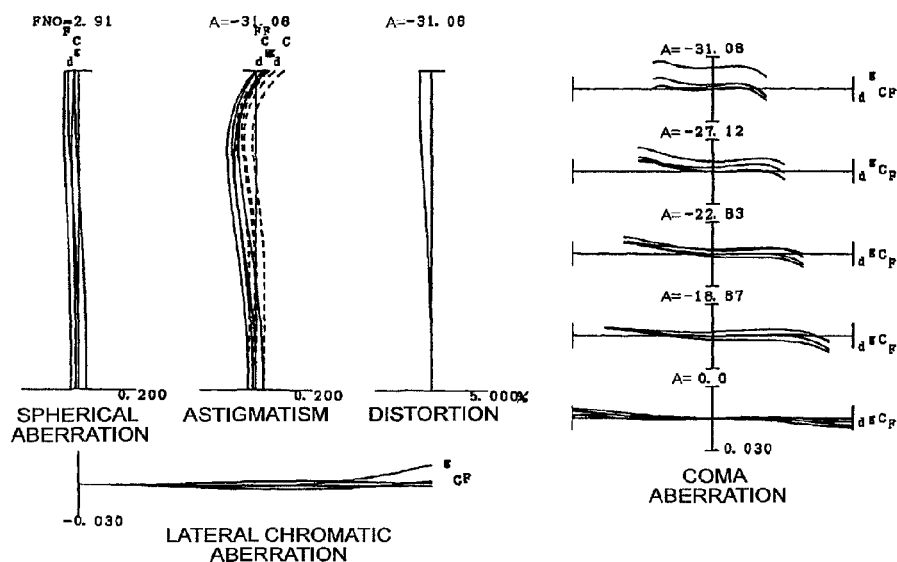
FIGS. 26A and 26B are graphs showing various aberrations of Example 2-4, where 26A are graphs showing various aberrations upon focusing on infinity, and 26B are graphs showing various aberrations upon focusing on a close object.
Figure 26B:
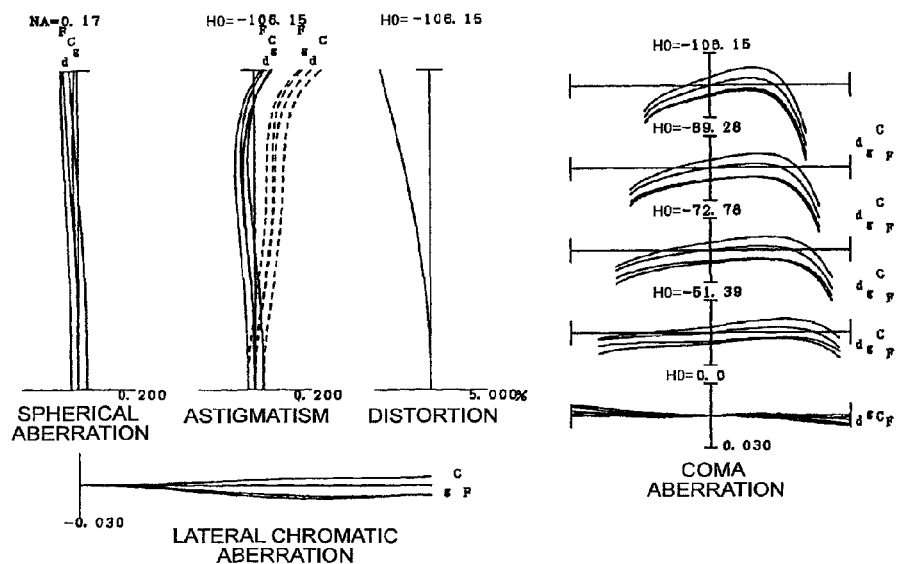

FIGS. 26A and 26B are graphs showing various aberrations of the imaging lens SL4 according to Example 2-4, where FIG. 26A are graphs showing various aberrations upon focusing on infinity, and FIG. 26B are graphs showing various aberrations upon focusing on a close object. Also each graph showing aberrations show, according to the imaging lens SL4 of Example 2-4, various aberrations can be corrected satisfactorily from a state of focusing on infinity to a state of focusing on a close object, and excellent imaging performance is implemented.

Example 2-5

The imaging lens SL5 according to Example 2-5 will now be described with reference to FIG. 27, FIGS. 28A and 28B and Table 2-5. As FIG. 27 shows, in the imaging lens SL5 according to Example 2-5, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 2-5, an axial air distance d6, between the first lens group G1 and the second lens group G2, and an axial air distance d12 between the second lens group G2 and the filter group FL change upon focusing.

Table 2-5 shows a table on each parameter of Example 2-5. The surface numbers 1 to 18 in Table 2-5 correspond to the surfaces 1 to 18 in FIG. 27. In Example 2-5, the second surface and the twelfth surface are aspherical.

TABLE 2-5

[Surface data]

| Surface number | r | d | nd | νd |
|---|---|---|---|---|
| 1 | 9.3520 | 0.90 | 1.67790 | 54.89 |
| *2 | 4.8208 | 0.45 | | |
| 3 | 5.9177 | 1.85 | 1.81600 | 46.62 |
| 4 | 15.9734 | 0.35 | | |
| 5 | 0.0000 | 1.95 | (Flare stop S1) | |
| 6 | 0.0000 | (d6) | (Aperture stop S) | |
| 7 | 0.0000 | 1.60 | (Flare stop S2) | |
| 8 | −4.6847 | 0.90 | 1.80810 | 22.76 |
| 9 | −18.5193 | 3.04 | 1.81600 | 46.62 |
| 10 | −6.7523 | 0.20 | | |
| 11 | 19.5054 | 3.10 | 1.66910 | 55.42 |
| *12 | −28.1863 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 4.8208
κ = −2.2502
C4 = +3.2855E−03
C6 = −1.1017E−04
C8 = +6.2421E−06
C10 = −1.6029E−07

Twelfth surface r = −28.1863
κ = +3.4908
C4 = +1.4959E−04
C6 = −3.4328E−07
C8 = +5.0300E−09
C10 = −5.9841E−11

TABLE 2-5-continued

[Various data]

f = 14.26
FNO = 2.92
2ω = 62.12
Y = 8.50
TL = 30.00

[Variable distance data]

| | Infinity | Close Object |
|---|---|---|
| d6 | 1.6152 | 0.3000 |
| d12 | 8.0762 | 9.3915 |
| Bf | 0.4989 | 0.4989 |

[Lens group data]

| | First surface | Focal length |
|---|---|---|
| First lens group | 1 | 36.9620 |
| Second lens group | 7 | 14.0056 |

[Conditional expression]

TL = 29.9989
Ymax = 8.5000
Σd = 15.9538
Conditional expression (5) TL/Ymax = 3.5293
Conditional expression (6) TL/Σd = 1.8804

As the parameter table in Table 2-5 shows, the imaging lens SL5 according to Example 2-5 satisfies the conditional expressions (5) and (6).

Figure 28A:
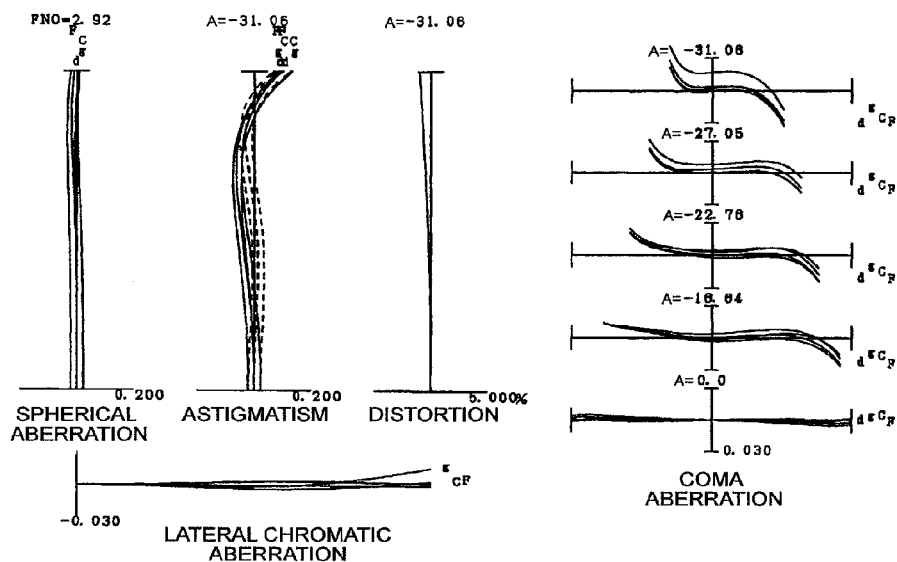
FIGS. 28A and 28B are graphs showing various aberrations of Example 2-5, where 38A are graphs showing various aberrations upon focusing on infinity, and 28B are graphs showing various aberrations upon focusing on a close object.
Figure 28B:
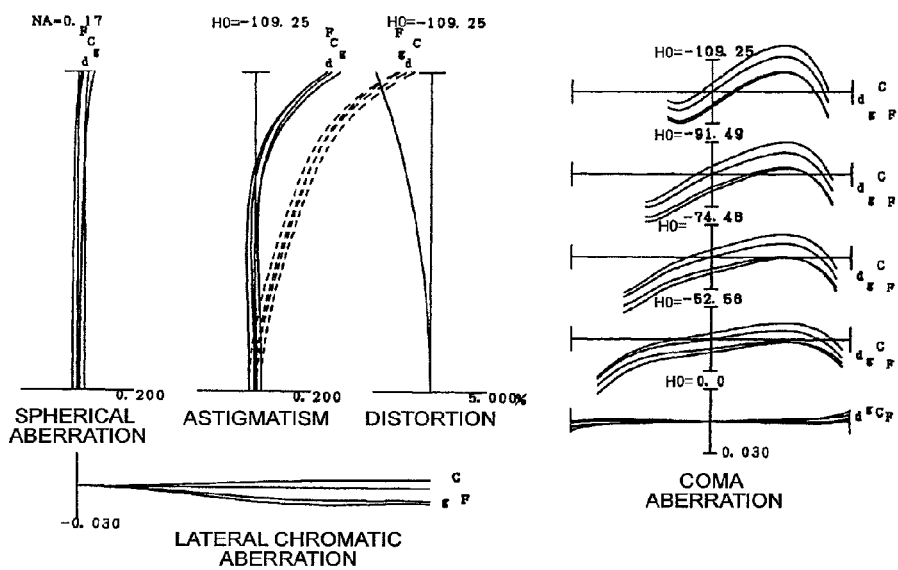

FIGS. 28A and 28B are graphs showing various aberrations of the imaging lens SL5 according to Example 2-5, where FIG. 28A are graphs showing various aberrations upon focusing on infinity, and FIG. 28B are graphs showing various aberrations upon focusing on a close object. Also each graph showing aberrations show, according to the imaging lens SL5 of Example 2-5, various aberrations can be corrected satisfactorily from a state of focusing on infinity to a state of focusing on a close object, and excellent imaging performance is implemented.

Example 2-6

The imaging lens SL6 according to Example 2-6 will now be described with reference to FIG. 29, FIGS. 30A and 30B and Table 2-6. As FIG. 29 shows, in the imaging lens SL6 according to Example 2-6, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 2-6, an axial air distance d6, between the first lens group G1 and the second lens group G2, and an axial air distance d12 between the second lens group G2 and the filter group FL change upon focusing.

Table 2-6 shows a table on each parameter of Example 2-6. The surface numbers 1 to 18 in Table 2-6 correspond to the surfaces 1 to 18 in FIG. 29. In Example 2-6, the second surface and the twelfth surface are aspherical.

TABLE 2-6

[Surface data]

| Surface number | r | d | nd | vd |
|---|---|---|---|---|
| 1 | 8.7469 | 0.90 | 1.67790 | 54.89 |
| *2 | 4.6799 | 0.45 | | |
| 3 | 5.8268 | 1.85 | 1.81600 | 46.62 |
| 4 | 14.7269 | 0.35 | | |
| 5 | 0.0000 | 1.95 | (Flare stop S1) | |
| 6 | 0.0000 | (d6) | (Aperture stop S) | |
| 7 | 0.0000 | 1.45 | (Flare stop S2) | |
| 8 | −4.7008 | 0.90 | 1.80810 | 22.76 |
| 9 | −19.5674 | 3.05 | 1.81600 | 46.62 |
| 10 | −6.8100 | 0.20 | | |
| 11 | 20.7908 | 3.10 | 1.66910 | 55.42 |
| *12 | −24.7647 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 4.6799
κ = −1.0342
C4 = +2.1291E−03
C6 = −2.5886E−05
C8 = +2.2070E−06
C10 = −5.3593E−08

Twelfth surface r = −24.7647
κ = −7.3551
C4 = +6.0709E−05
C6 = +1.2096E−08
C8 = +2.7737E−09
C10 = −5.6169E−11

[Various data]

f = 14.26
FNO = 2.91
2ω = 62.12
Y = 8.50
TL = 30.00

[Variable distance data]

| | Infinity | Close Object |
|---|---|---|
| d6 | 1.6575 | 0.3500 |
| d12 | 8.1725 | 9.4800 |
| Bf | 0.4953 | 0.4953 |

[Lens group data]

| | First surface | Focal length |
|---|---|---|
| First lens group | 1 | 37.8004 |
| Second lens group | 7 | 13.8767 |

[Conditional expression]

TL = 29.9953
Ymax = 8.5000
Σd = 15.8575
Conditional expression (5) TL/Ymax = 3.5289
Conditional expression (6) TL/Σd = 1.8916

As the parameter table in Table 2-6 shows, the imaging lens SL6 according to Example 2-6 satisfies the conditional expressions (5) and (6).

Figure 30A:
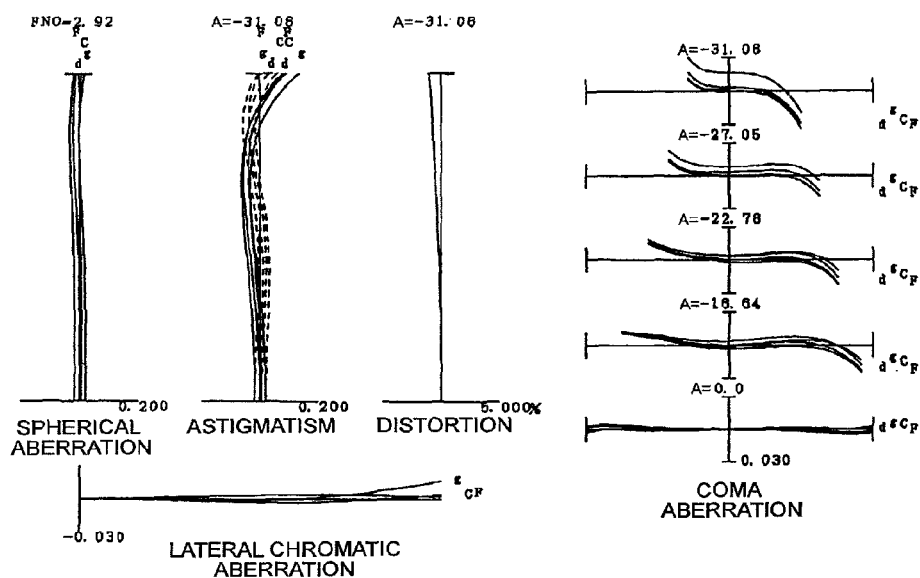
FIGS. 30A and 30B are graphs showing various aberrations of Example 2-6, where 30A are graphs showing various aberrations upon focusing on infinity, and 30B are graphs showing various aberrations upon focusing on a close object.
Figure 30B:
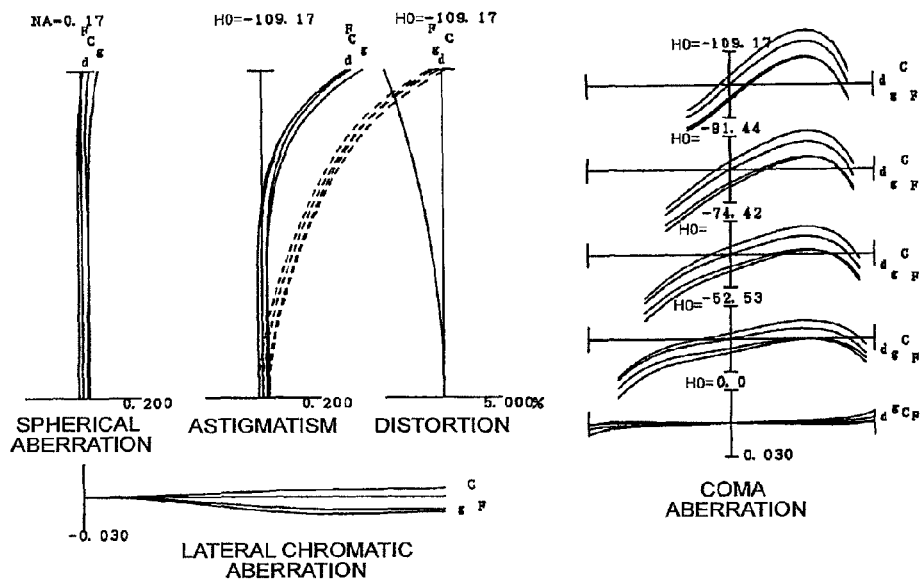

FIGS. 30A and 30B are graphs showing various aberrations of the imaging lens SL6 according to Example 2-6, where FIG. 30A are graphs showing various aberrations upon focusing on infinity, and FIG. 30B are graphs showing various aberrations upon focusing on a close object. Also each graph showing aberrations show, according to the imaging lens SL6 of Example 2-6, various aberrations can be corrected satisfactorily from a state of focusing on infinity to a state of focusing on a close object, and excellent imaging performance is implemented.

Example 2-7

The imaging lens SL7 according to Example 2-7 will now be described with reference to FIG. 31, FIGS. 32A and 32B and Table 2-7. As FIG. 31 shows, in the imaging lens SL7 according to Example 2-7, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 2-7, an axial air distance d6, between the first lens group G1 and the second lens group G2, and an axial air distance d12 between the second lens group G2 and the filter group FL change upon focusing.

Table 2-7 shows a table on each parameter of Example 2-7. The surface numbers 1 to 18 in Table 2-7 correspond to the surfaces 1 to 18 in FIG. 31. In Example 2-7, the second surface and the twelfth surface are aspherical.

TABLE 2-7

[Surface data]

| Surface number | r | d | nd | vd |
|---|---|---|---|---|
| 1 | 14.0147 | 0.90 | 1.67790 | 54.89 |
| *2 | 5.4694 | 0.90 | | |
| 3 | 7.6437 | 1.75 | 1.88300 | 40.76 |
| 4 | 30.8895 | 0.25 | | |
| 5 | 0.0000 | 1.60 | (Flare stop S1) | |
| 6 | 0.0000 | (d6) | (Aperture stop S) | |
| 7 | 0.0000 | 1.25 | (Flare stop S2) | |
| 8 | −5.1623 | 0.95 | 1.80810 | 22.76 |
| 9 | −14.4718 | 2.75 | 1.75500 | 52.32 |
| 10 | −6.7218 | 0.20 | | |
| 11 | 26.5149 | 2.85 | 1.59201 | 67.02 |
| *12 | −18.8905 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

TABLE 2-7-continued

[Aspherical data]

Second surface r = 5.4694
κ = +1.4173
C4 = −6.4702E−04
C6 = −2.1283E−05
C8 = −4.5161E−07
C10 = −6.2922E−08

Twelfth surface r = −18.8905
κ = +5.5850
C4 = +2.2637E−04
C6 = +8.5167E−07
C8 = +1.1963E−08
C10 = +1.5290E−10

[Various data]

f = 14.26
FNO = 2.83
2ω = 62.07
Y = 8.50
TL = 32.01

[Variable distance data]

|  | Infinity | Close Object |
|---|---|---|
| d6 | 2.0676 | 0.8000 |
| d12 | 10.5324 | 11.8300 |
| Bf | 0.5145 | 0.5145 |

[Lens group data]

|  | First surface | Focal length |
|---|---|---|
| First lens group | 1 | 51.9495 |
| Second lens group | 7 | 15.2959 |

[Conditional expression]

TL = 32.0145
Ymax = 8.5000
Σd = 15.4676
Conditional expression (5) TL/Ymax = 3.7664
Conditional expression (6) TL/Σd = 2.0698

As the parameter table in Table 2-7 shows, the imaging lens SL7 according to Example 2-7 satisfies the conditional expressions (5) and (6).

Figure 32A:
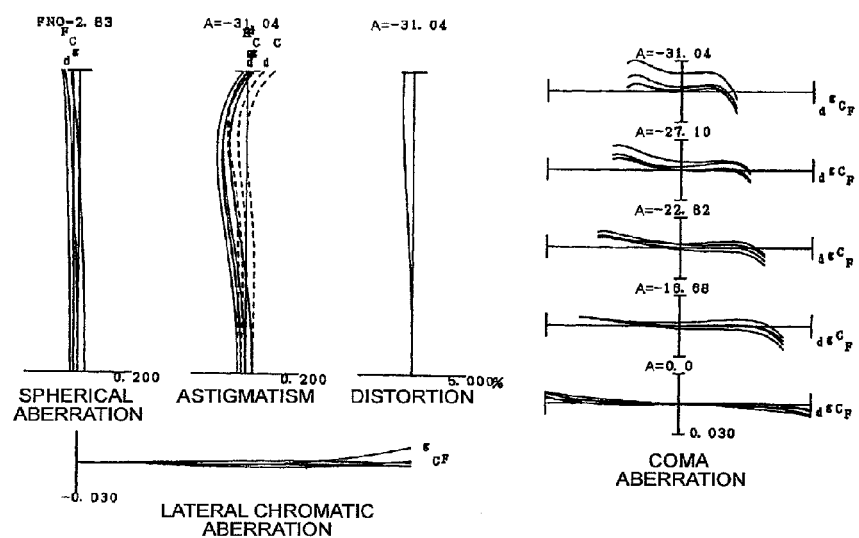
FIGS. 32A and 32B are graphs showing various aberrations of Example 2-7, where 32A are graphs showing various aberrations upon focusing on infinity, and 32B are graphs showing various aberrations upon focusing on a close object.
Figure 32B:
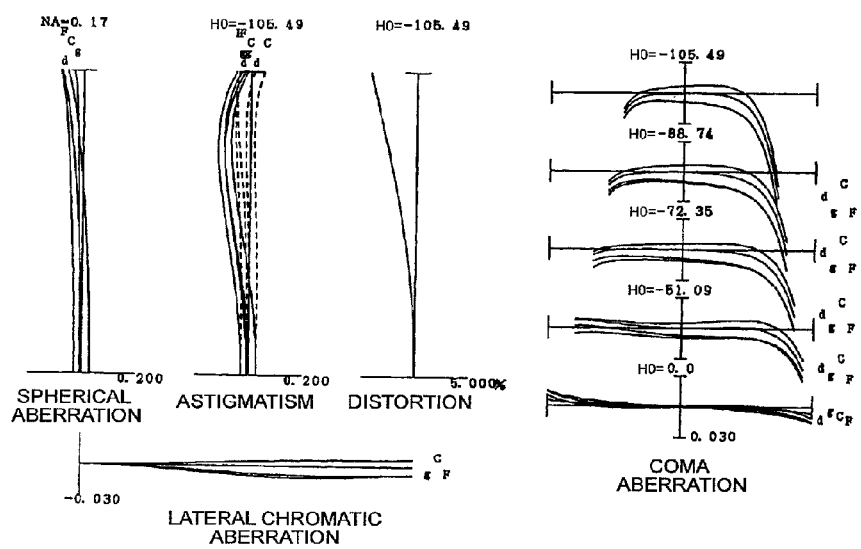

FIGS. 32A and 32B are graphs showing various aberrations of the imaging lens SL7 according to Example 2-7, where FIG. 32A are graphs showing various aberrations upon focusing on infinity, and FIG. 32B are graphs showing various aberrations upon focusing on a close object. Also each graph showing aberrations show, according to the imaging lens SL7 of Example 2-7, various aberrations can be corrected satisfactorily from a state of focusing on infinity to a state of focusing on a close object, and excellent imaging performance is implemented.

Example 2-8

The imaging lens SL8 according to Example 2-8 will now be described with reference to FIG. 33, FIGS. 34A and 34B and Table 2-8. As FIG. 33 shows, in the imaging lens SL8 according to Example 2-8, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 having a convex surface facing the image, and a biconvex positive lens L5, which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 2-8, an axial air distance d6, between the first lens group G1 and the second lens group G2, and an axial air distance d12 between the second lens group G2 and the filter group FL change upon focusing.

Table 2-8 shows a table on each parameter of Example 2-8. The surface numbers 1 to 18 in Table 2-8 correspond to the surfaces 1 to 18 in FIG. 33. In Example 2-8, the second surface and the twelfth surface are aspherical.

TABLE 2-8

[Surface data]

| Surface number | r | d | nd | νd |
|---|---|---|---|---|
| 1 | 14.0077 | 1.30 | 1.67790 | 54.89 |
| *2 | 5.3933 | 0.60 |  |  |
| 3 | 7.5715 | 1.95 | 1.88300 | 40.76 |
| 4 | 28.3663 | 0.25 |  |  |
| 5 | 0.0000 | 1.75 | (Flare stop S1) |  |
| 6 | 0.0000 | (d6) | (Aperture stop S) |  |
| 7 | 0.0000 | 1.25 | (Flare stop S2) |  |
| 8 | −5.2273 | 0.98 | 1.80810 | 22.76 |
| 9 | −15.1471 | 2.88 | 1.75500 | 52.32 |
| 10 | −6.7013 | 0.20 |  |  |
| 11 | 23.0044 | 2.94 | 1.59201 | 67.02 |
| *12 | −20.7345 | 8.96 |  |  |
| 13 | 0.0000 | 0.50 | 1.51633 | 64.14 |
| 14 | 0.0000 | 4.60 |  |  |
| 15 | 0.0000 | 1.87 | 1.51633 | 64.14 |
| 16 | 0.0000 | 0.30 |  |  |
| 17 | 0.0000 | 0.70 | 1.51633 | 64.14 |
| 18 | 0.0000 | (Bf) |  |  |

[Aspherical data]

Second surface r = 5.3933
κ = +1.7327
C4 = −9.1467E−04
C6 = −4.4123E−05
C8 = +8.7126E−07
C10 = −2.7436E−07

Twelfth surface r = −20.7345
κ = −19.0000
C4 = −1.4487E−04
C6 = +4.4684E−06
C8 = −5.5750E−08
C10 = +3.1253E−10

[Various data]

f = 14.26
FNO = 2.92
2ω = 62.50
Y = 8.50
TL = 32.36

TABLE 2-8-continued

[Variable distance data]

|  | Infinity | Close Object |
|---|---|---|
| d6 | 2.0376 | 0.8000 |
| d12 | 7.7203 | 8.9579 |
| Bf | 0.5348 | 0.5348 |

[Lens group data]

|  | First surface | Focal length |
|---|---|---|
| First lens group | 1 | 51.9495 |
| Second lens group | 7 | 14.3554 |

[Conditional expression]

TL = 32.3620
Ymax = 8.5000
Σd = 16.1369
Conditional expression (5) TL/Ymax = 3.8073
Conditional expression (6) TL/Σd = 2.0055

As the parameter table in Table 2-8 shows, the imaging lens SL8 according to Example 2-8 satisfies the conditional expressions (5) and (6).

Figure 34A:
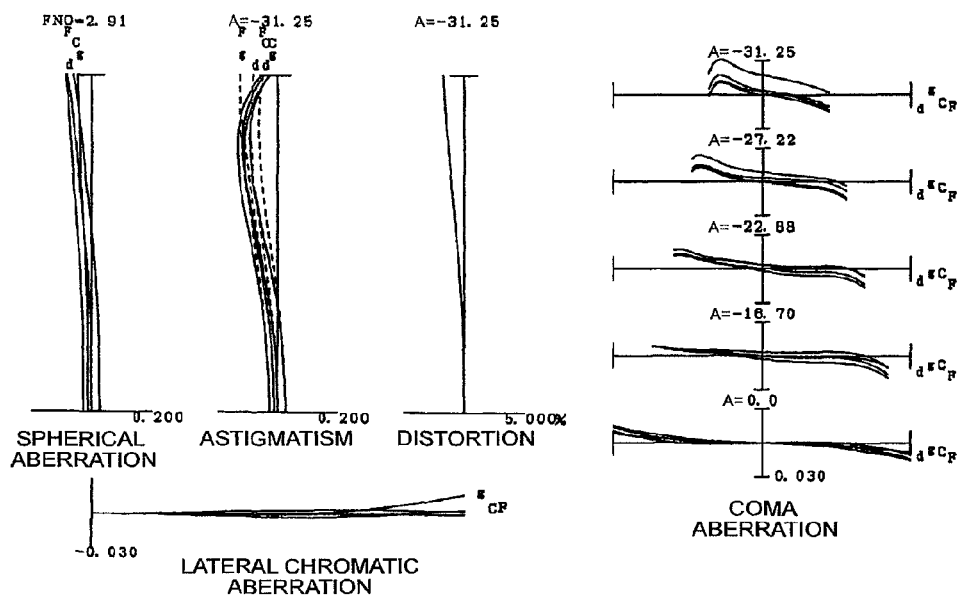
FIGS. 34A and 34B are graphs showing various aberrations of Example 2-8, where 34A are graphs showing various aberrations upon focusing on infinity, and 34B are graphs showing various aberrations upon focusing on a close object.
Figure 34B:
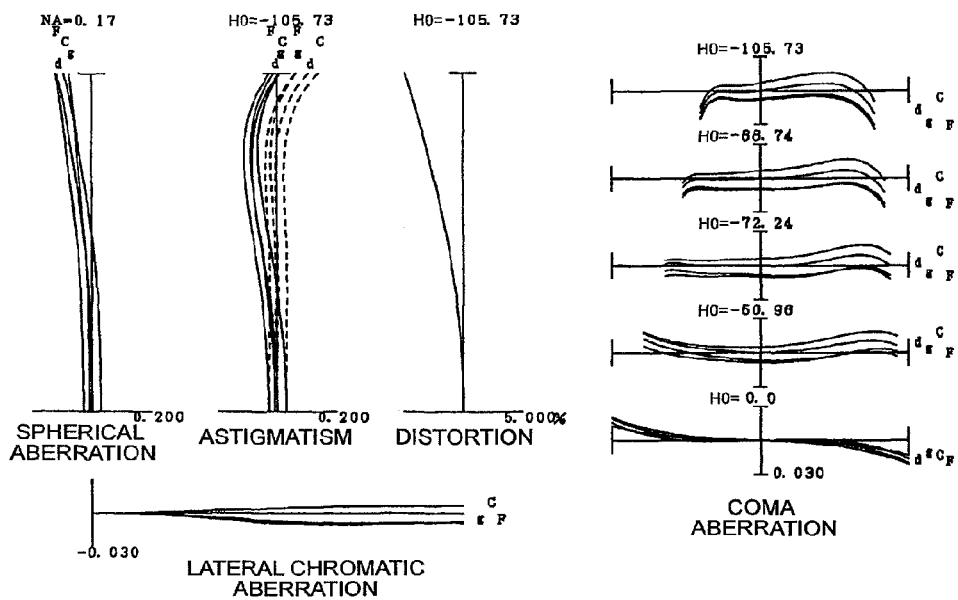

FIGS. 34A and 34B are graphs showing various aberrations of the imaging lens SL8 according to Example 2-8, where FIG. 34A are graphs showing various aberrations upon focusing on infinity, and FIG. 34B are graphs showing various aberrations upon focusing on a close object. Also each graph showing aberrations show, according to the imaging lens SL8 of Example 2-8, various aberrations can be corrected satisfactorily from a state of focusing on infinity to a state of focusing on a close object, and excellent imaging performance is implemented.

Third Embodiment

A third embodiment of the imaging lens according to the present invention will now be described. The third embodiment includes examples (Example 3-1 to Example 3-8) herein below.

The imaging lens SL according to the third embodiment includes configurations of Example 3-1 to Example 3-8 shown in FIG. 35, FIG. 37, FIG. 39, FIG. 41, FIG. 43, FIG. 45, FIG. 47 and FIG. 49, but is described using the configuration in FIG. 35 as an example. This imaging lens SL comprises an object side lens group G1 having a positive refractive power and an image side lens group G2 having a positive refractive power with an air distance from the object side lens group G1, which are disposed in order from the object, wherein the image side lens group G2 further comprises a cemented lens L34 of a negative lens L3 having a concave surface facing the object and a positive lens L4 having a convex surface facing the image, and a biconvex positive lens L5, which are disposed in order from the object, and all or a part of the image side lens group G2 can be shifted in a direction substantially perpendicular to the optical axis. Because of this configuration, the imaging lens SL according to the third embodiment, in which an image on the image plane can be shifted, an angle of view exceeds 60°, and a compact and excellent image forming performance can be implemented, can be created.

In the third embodiment, it is preferable that a condition expressed by the following expression (7)

$$0.80 < f/fS < 1.10 \tag{7}$$

is satisfied, where f is a focal length of the imaging lens, and fS (focal length f2 of the image side lens group G2 in the third embodiment) is a focal length of the shift lens group (image side lens group G2 in FIG. 35).

The conditional expression (7) is a conditional expression to specify the focal length fS of the shift lens group. If the upper limit value of the conditional expression (7) is exceeded, the refractive power of the shift lens group increases, and the spherical aberrations generated in the shift lens group alone increase, which is not preferable. If the lower limit value of the conditional expression (7) is not reached, on the other hand, the refractive power of the shift lens group becomes weak, and [the lens] is no longer a focal, so the change of curvature of field when the lens is shifted increases, which is not preferable.

To make the effect of the present invention certain, it is preferable that the upper limit value of the conditional expression (7) is 1.07. To make the effect of the present invention more certain, it is preferable that the upper limit value of the conditional expression (7) is 1.05.

To make the effect of the present invention more certain, it is preferable that the lower limit value of the conditional expression (7) is 0.83. To make the effect of the present invention more certain, it is preferable that the lower limit value of the conditional expression (7) is 0.86. To make the effect of the present invention even more certain, it is preferable that the lower limit value of the conditional expression (7) is 0.90.

In the third embodiment, it is preferable that the condition expressed by the following expression (8)

$$0.13 < f2/f1 < 0.47 \tag{8}$$

is satisfied, where f1 is a focal length of the object side lens group G1 and f2 is a focal length of the image side lens group G2.

The conditional expression (8) is a conditional expression to specify an optimum range of the focal length ratio of the object side lens group G1 and the image side lens group G2. If the upper limit value of the conditional expression (8) is exceeded, the refractive power of the object side lens group G1 becomes relatively high, which makes it difficult to correct the spherical aberration and coma aberration generated in the object side lens group G1 alone. Also the refractive power of the image side lens group G2 becomes relatively weak, and the curvature of field cannot be corrected satisfactorily, which is not preferable. If the lower limit value of the conditional expression (8) is not reached, on the other hand, the refractive power of the object side lens group G1 becomes relatively weak, and correction of the spherical aberration becomes insufficient, which is not preferable. Also the refractive power of the image side lens G2 becomes relatively strong, which increases the coma aberration generated in the image side lens group G2, and makes it impossible to achieve the object of the present invention, that is, implementing an excellent optical performance.

To make the effect of the present invention certain, it is preferable that the upper limit value of the conditional expression (8) is 0.45. To make the effect of the present invention more certain, it is preferable that the upper limit value of the conditional expression (8) is 0.43. To make the effect of the present invention even more certain, it is preferable that the upper limit value of the conditional expression (8) is 0.40.

To make the effect of the present invention certain, it is preferable that the lower limit value of the conditional expression (8) is 0.15. To make the effect of the present invention more certain, it is preferable that the lower limit value of the conditional expression (8) is 0.17. To make the effect of the present invention even more certain, it is preferable that the lower limit value of the conditional expression (8) is 0.19.

In the third embodiment, it is preferable that the cemented lens L34 of the image side lens group G2 further comprises a negative meniscus lens L3 having a concave surface facing the object and a positive meniscus lens L4 having a convex surface facing the image. Because of this configuration, the curvature of field can be corrected satisfactorily, and higher performance of the imaging lens SL can be implemented.

In the third embodiment, it is preferable that the biconvex positive lens component L5 of the image side lens group G2 has at least one aspherical surface (twelfth surface from the object in FIG. 35). Because of this configuration, fluctuation of distortion and curvature of field generated upon focusing can be corrected satisfactorily, even if the focusing lens group includes the positive lens component L5, and higher performance of the imaging lens SL can be implemented.

In the third embodiment, it is preferable that an aperture stop S is disposed between the object side lens group G1 and the image side lens group G2. Because of this configuration, the refractive power is distributed in a more symmetric way, that is, the object side lens group G1 having a positive refractive power, the aperture stop S, and the image side lens group G2 having a positive refractive power, are disposed in order from the object, so that the curvature of field and distortion can be corrected satisfactorily.

In the third embodiment, it is preferable that focus on a close object is adjusted by moving the image side lens group G2 toward the object. Because of this configuration, fluctuation of aberration upon focus adjustment can be suppressed, and interference of a lens or a mechanical component to support a lens can be prevented, since a feed pitch of the image side lens group G2 toward the object upon focus adjustment is very small. It is possible to adjust focus on a close object using the object side lens group G1, but a feed pitch toward the object becomes very large, which causes a change in the total length of the lens. Along with this change, such a mechanism as a drive system becomes complicated, and downsizing becomes difficult. Also deterioration of the spherical aberration and curvature of field increase, which is not preferable.

The imaging lens SL according to the third embodiment comprises two lens groups, that is, the object side lens group G1 and the image side lens group G2, but another lens group may be added between the lens groups or another lens group may be added adjacent to the image side of the object side lens group G1 or the object side of the image side lens group G2.

In the imaging lens SL according to the third embodiment, it is preferable that the distance from the image side lens surface to the image plane (back focus) of the positive lens disposed closest to the image is about 10 to 30 mm in the shortest state. In the imaging lens SL, it is preferable that the image height is 5 to 12.5 mm, and more preferably 5 to 9.5 mm.

Examples of the Third Embodiment

Example 3-1 to Example 3-8 according to the third embodiment will now be described with reference to the drawings. FIG. 35, FIG. 37, FIG. 39, FIG. 41, FIG. 43, FIG. 45, FIG. 47 and FIG. 49 are cross-sectional views depicting a configuration of the imaging lens SL (SL1 to SL8) according to each example, where the change of focusing state, from focusing on infinity to focusing on a close object of the imaging lenses SL1 to SL8, that is, the state of movement of each lens group upon focusing, is shown by an arrow.

As described above, the imaging lens SL1 to SL8 according to each example comprises the object side lens group G1 having a positive refractive power, the aperture stop S, the image side lens group G2 having a positive refractive power, and the filter group FL which includes a low pass filter, infrared cut filter or the like, which are disposed in order from the object. Upon focusing from a state of focusing on infinity to the state of focusing on a close object, the object side lens group G1 is fixed with respect to the image plane I, and the image side lens group G2 is moved with respect to the image plane I, so as to change the distance between the object side lens group G1 and the image side lens group G2. The image plane I is formed on an unillustrated image sensing element, and this image sensing element is CCD or CMOS, for example.

Table 3-1 to Table 3-8 shown below are tables of parameters according to Example 3-1 to Example 3-8. Description on the tables, which is the same as the table of the first embodiment, is omitted. In [conditional expression], values corresponding to the conditional expressions (7) and (8) are shown.

Example 3-1

The imaging lens SL1 according to Example 3-1 will now be described with reference to FIG. 35, FIGS. 36A and 36B and Table 3-1. As FIG. 35 shows, in the imaging lens SL1 according to Example 3-1, the object side lens G1 comprises a negative meniscus lens L1 having a convex surface facing the object and a positive meniscus lens L2 having a convex surface facing the object, which are disposed in order from the object. The image side lens group G2 comprises a cemented lens L34 of a negative meniscus lens L3 having a concave surface facing the object and a positive meniscus lens L4 having a convex surface facing the image side, and a biconvex positive lens L5, which are disposed in order from the object.

An aperture stop S is disposed between the object side lens group G1 and the image side lens group G2, and is fixed with respect to the object side lens group G1 or image plane I upon focusing from infinity to a close object. Also a flare stop FS1 and flare stop FS2 are disposed at pre-positions and post positions of the aperture stop S.

In Example 3-1, an axial air distance d6 between the object side lens group G1 and the image side lens group G2, and the axial air distance d12 between the image side lens group G2 and the filter group FL, change upon focusing.

Also in Example 3-1, the image side lens group G2 can be shifted in a direction substantially perpendicular to the optical axis as a shift lens group.

Table 3-1 shows a table on each parameter of Example 3-1. The surface numbers 1 to 18 in Table 3-1 correspond to the surfaces 1 to 18 in FIG. 35. In Example 3-1, the second surface and the twelfth surface are aspherical.

TABLE 3-1

[Surface data]

| Surface number | r | d | nd | vd |
|---|---|---|---|---|
| 1 | 12.5540 | 0.90 | 1.67790 | 54.89 |
| *2 | 5.1200 | 0.80 | | |
| 3 | 7.2279 | 1.90 | 1.88300 | 40.76 |
| 4 | 25.2952 | 0.80 | | |
| 5 | 0.0000 | 1.40 | (Flare stop S1) | |
| 6 | 0.0000 | (d6) | (Aperture stop S) | |
| 7 | 0.0000 | 1.00 | (Flare stop S2) | |
| 8 | −5.1593 | 0.90 | 1.80810 | 22.76 |
| 9 | −15.0968 | 2.65 | 1.75500 | 52.32 |
| 10 | −6.5278 | 0.20 | | |
| 11 | 25.0474 | 2.70 | 1.58913 | 61.16 |

TABLE 3-1-continued

| *12 | −19.8008 | (d12) | | |
|---|---|---|---|---|
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 5.1200
κ = +0.9952
C4 = −3.5496E−04
C6 = −1.3835E−05
C8 = −6.4411E−08
C10 = −2.8213E−08

Twelfth surface r = −19.8008
κ = +5.2781
C4 = +2.1953E−04
C6 = −1.0580E−07
C8 = +2.9574E−08
C10 = −2.6872E−10

[Various data]

f = 14.26
FNO = 2.83
2ω = 62.12
Y = 8.50
TL = 31.51

[Variable distance data]

| | Infinity | Close Object |
|---|---|---|
| d6 | 1.8514 | 0.6000 |
| d12 | 10.4286 | 11.6800 |
| Bf | 0.5058 | 0.5058 |

[Lens group data]

| | First surface | Focal length |
|---|---|---|
| Object side lens group | 1 | 58.2236 |
| Image side lens group | 7 | 14.9735 |

[Conditional expression]

f = 14.2560
f1 = 58.2236
fS(=f2) = 14.9765
Conditional expression (7) f/fS = 0.9521
Conditional expression (8) f2/f1 = 0.2572

As the parameter table in Table 3-1 shows, the imaging lens SL according to Example 3-1 satisfies the conditional expressions (7) and (8).

Figure 36A:
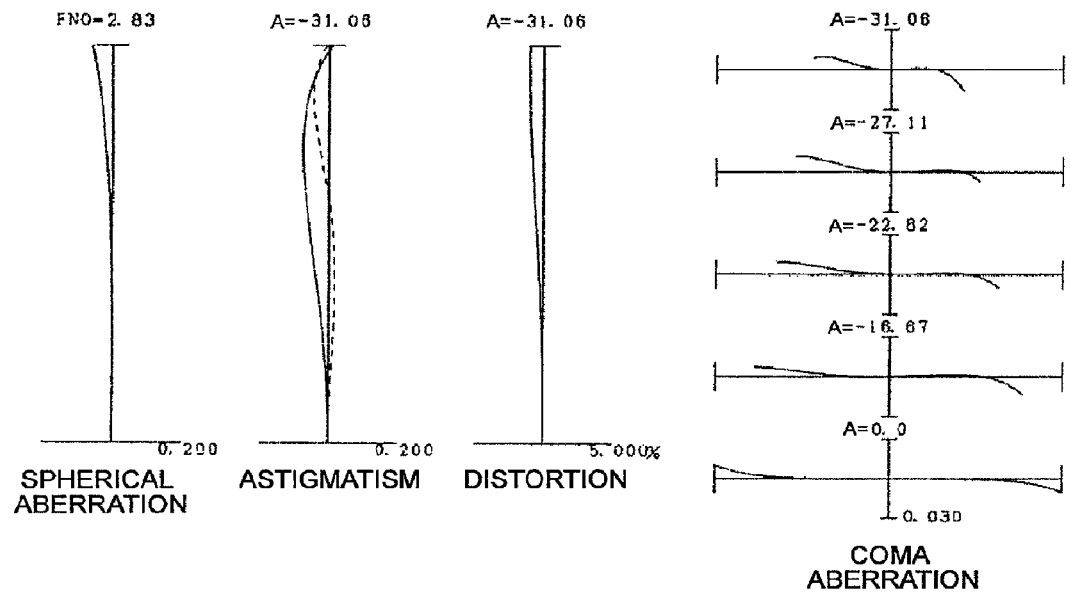
FIGS. 36A and 36B are graphs showing various aberrations of Example 3-1, where 36A are graphs showing various aberrations upon focusing on infinity, and 36B are graphs showing coma aberrations during a lens shift (0.1 mm)
Figure 36B:
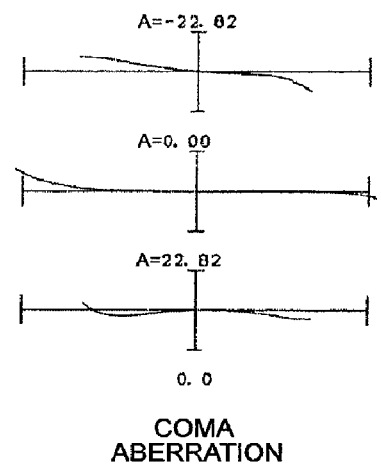

FIGS. 36A and 36B are graphs showing various aberrations of the imaging lens SL1 according to Example 3-1, where FIG. 36A are graphs showing various aberrations upon focusing on infinity, and FIG. 363 are graphs showing coma aberration during lens shift. In each graph showing aberrations, all data is shown with respect to the d-line (wavelength: 587.6 nm), and FNO is an F number, and A is a half angle of view with respect to each image height respectively. In the graph showing astigmatism, a solid line indicates a sagittal image surface, and a broken line indicates a meridional image surface. The above description on the graphs showing aberrations is the same for other examples, therefore description thereof is omitted.

As each graph showing aberrations shows, in the imaging lens SL according to Example 3-1, various aberrations are corrected satisfactorily during lens shift, and excellent image forming performance is implemented.

Example 3-2

The imaging lens SL2 according to Example 3-2 will now be described with reference to FIG. 37 and FIGS. 38A and 38B and Table 3-2. As FIG. 37 shows, in the imaging lens SL2 according to Example 3-2, the object side lens G1 comprises a negative meniscus lens L1 having a convex surface facing the object and a positive meniscus lens L2 having a convex surface facing the object, which are disposed in order from the object. The image side lens group G2 comprises a cemented lens L34 of a negative meniscus lens L3 having a concave surface facing the object and a positive meniscus lens L4 having a convex surface facing the image side, and a biconvex positive lens L5, which are disposed in order from the object.

An aperture stop S is disposed between the object side lens group G1 and the image side lens group G2, and is fixed with respect to the object side lens group G1 or image plane I upon focusing from infinity to a close object. Also a flare stop FS1 and flare stop FS2 are disposed at pre-positions and post positions of the aperture stop S.

In Example 3-2, an axial air distance d6 between the object side lens group G1 and the image side lens group G2, and the axial air distance d12 between the image side lens group G2 and the filter group FL, change upon focusing.

Also in Example 3-2, the image side lens group G2 can be shifted in a direction substantially perpendicular to the optical axis as a shift lens group.

Table 3-2 shows a table on each parameter of Example 3-2. The surface numbers 1 to 18 in Table 3-2 correspond to the surfaces 1 to 18 in FIG. 37. In Example 3-2, the second surface and the twelfth surface are aspherical.

TABLE 3-2

[Surface data]

| Surface number | r | d | nd | νd |
|---|---|---|---|---|
| 1 | 11.8261 | 0.90 | 1.67790 | 54.89 |
| *2 | 5.0108 | 0.65 | | |
| 3 | 7.0263 | 1.85 | 1.88300 | 40.76 |
| 4 | 23.3567 | 0.70 | | |
| 5 | 0.0000 | 1.40 | (Flare stop S1) | |
| 6 | 0.0000 | (d6) | (Aperture stop S) | |
| 7 | 0.0000 | 1.00 | (Flare stop S2) | |
| 8 | −5.0661 | 0.90 | 1.80810 | 22.76 |
| 9 | −14.6310 | 2.70 | 1.75500 | 52.32 |
| 10 | −6.3977 | 0.20 | | |
| 11 | 23.5294 | 2.70 | 1.58913 | 61.16 |
| *12 | −21.4493 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 5.0108
κ = +0.1277
C4 = +4.8479E−04
C6 = +5.6078E−06
C8 = +1.1439E−07
C10 = +2.6889E−09

TABLE 3-2-continued

[Twelfth surface]

r = −21.4493
κ = −5.6807
C4 = +6.6823E−05
C6 = −6.8560E−08
C8 = +2.3185E−08
C10 = −3.6236E−10

[Various data]

f = 14.26
FNO = 2.88
2ω = 62.12
Y = 8.50
TL = 31.01

[Variable distance data]

|  | Infinity | Close Object |
|---|---|---|
| d6 | 1.8508 | 0.6000 |
| d12 | 10.1792 | 11.4301 |
| Bf | 0.5070 | 0.5070 |

[Lens group data]

|  | First surface | Focal length |
|---|---|---|
| Object side lens group | 1 | 56.8827 |
| Image side lens group | 7 | 14.7636 |

[Conditional expression]

f = 14.2560
f1 = 56.8827
fS(=f2) = 14.7636
Conditional expression (7) f/fS = 0.9656
Conditional expression (8) f2/f1 = 0.2595

As the parameter table in Table 3-2 shows, the imaging lens SL2 according to Example 3-2 satisfies the conditional expressions (7) and (8).

Figure 38A:
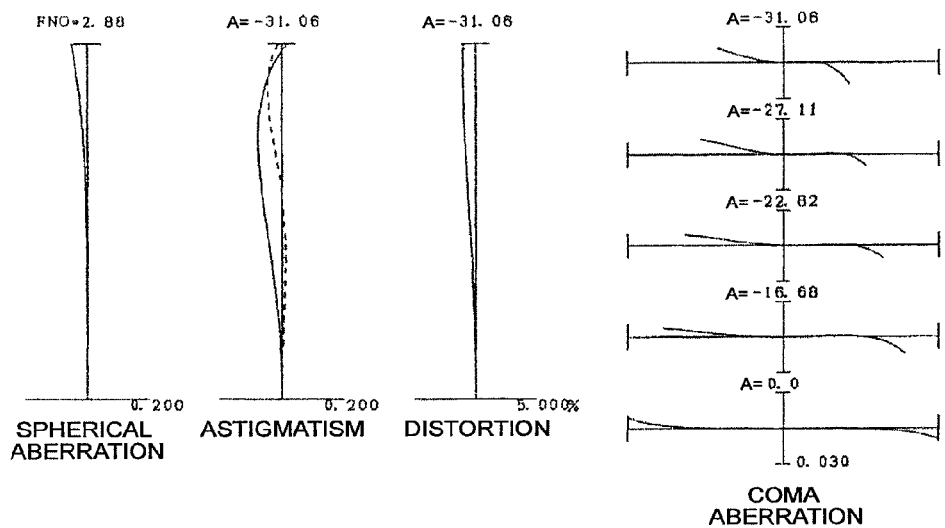
FIGS. 38A and 38B are graphs showing various aberrations of Example 3-2, where 38A are graphs showing various aberrations upon focusing on infinity, and 38B are graphs showing coma aberrations during a lens shift (0.1 mm)
Figure 38B:
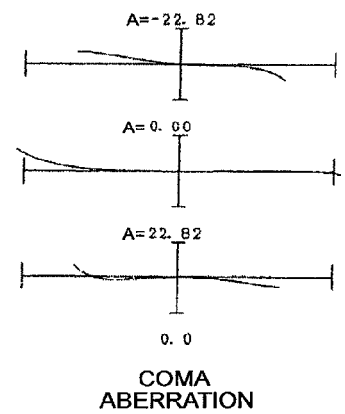

FIGS. 38A and 38B are graphs showing various aberrations of the imaging lens SL2 according to Example 3-2, where FIG. 38A are graphs showing various aberrations upon focusing on infinity, and FIG. 38B are graphs showing coma aberration during lens shift. As each graph showing aberrations shows, in the imaging lens SL2 according to Example 3-2, various aberrations are corrected satisfactorily during lens shift, and excellent image forming performance is implemented.

Example 3-3

The imaging lens SL3 according to Example 3-3 will now be described with reference to FIG. 39 and FIGS. 40A and 40B and Table 3-3. As FIG. 39 shows, in the imaging lens SL3 according to Example 3-3, the object side lens G1 comprises a negative meniscus lens L1 having a convex surface facing the object and a positive meniscus lens L2 having a convex surface facing the object, which are disposed in order from the object. The image side lens group G2 comprises a cemented lens L34 of a negative meniscus lens L3 having a concave surface facing the object and a positive meniscus lens L4 having a convex surface facing the image side, and a biconvex positive lens L5, which are disposed in order from the object.

An aperture stop S is disposed between the object side lens group G1 and the image side lens group G2, and is fixed with respect to the object side lens group G1 or image plane I upon focusing from infinity to a close object. Also a flare stop FS1 and flare stop FS2 are disposed at pre-positions and post positions of the aperture stop S.

In Example 3-3, an axial air distance d6 between the object side lens group G1 and the image side lens group G2, and the axial air distance d12 between the image side lens group G2 and the filter group FL, change upon focusing.

Also in Example 3-3, the image side lens group G2 can be shifted in a direction substantially perpendicular to the optical axis as a shift lens group.

Table 3-3 shows a table on each parameter of Example 3-3. The surface numbers 1 to 18 in Table 3-3 correspond to the surfaces 1 to 18 in FIG. 39. In Example 3-3, the second surface and the twelfth surface are aspherical.

TABLE 3-3

[Surface data]

| Surface number | r | d | nd | νd |
|---|---|---|---|---|
| 1 | 12.6464 | 0.90 | 1.66910 | 55.42 |
| *2 | 5.7001 | 0.75 |  |  |
| 3 | 7.7231 | 1.67 | 1.88300 | 40.76 |
| 4 | 24.6238 | 0.20 |  |  |
| 5 | 0.0000 | 1.40 | (Flare stop S1) |  |
| 6 | 0.0000 | (d6) | (Aperture stop S) |  |
| 7 | 0.0000 | 1.50 | (Flare stop S2) |  |
| 8 | −5.0699 | 0.90 | 1.80810 | 22.76 |
| 9 | −18.5950 | 3.00 | 1.80400 | 46.57 |
| 10 | −7.0355 | 0.20 |  |  |
| 11 | 26.7580 | 3.12 | 1.61881 | 63.85 |
| *12 | −18.8179 | (d12) |  |  |
| 13 | 0.0000 | 1.00 | 1.51633 | 64.14 |
| 14 | 0.0000 | 1.50 |  |  |
| 15 | 0.0000 | 1.87 | 1.51633 | 64.14 |
| 16 | 0.0000 | 0.40 |  |  |
| 17 | 0.0000 | 0.70 | 1.51633 | 64.14 |
| 18 | 0.0000 | (Bf) |  |  |

[Aspherical data]

Second surface r = 5.7001
κ = +1.7002
C4 = −7.4793E−04
C6 = −3.1424E−05
C8 = +2.0843E−07
C10 = −1.3010E−07

Twelfth surface r = −18.8179
κ = −7.0961
C4 = −3.0038E−05
C6 = +1.0404E−06
C8 = −1.2568E−09
C10 = −4.7030E−11

[Various data]

f = 14.26
FNO = 2.91
2ω = 62.12
Y = 8.50
TL = 32.01

[Variable distance data]

|  | Infinity | Close Object |
|---|---|---|
| d6 | 2.4197 | 1.1500 |
| d12 | 9.9683 | 11.2380 |
| Bf | 0.5123 | 0.5123 |

TABLE 3-3-continued

[Lens group data]

|  | First surface | Focal length |
|---|---|---|
| Object side lens group | 1 | 48.8782 |
| Image side lens group | 7 | 14.6742 |

[Conditional expression]

f = 14.2560
f1 = 48.8782
fS(=f2) = 14.6742
Conditional expression (7) f/fS = 0.9715
Conditional expression (8) f2/f1 = 0.3002

As the parameter table in Table 3-3 shows, the imaging lens SL3 according to Example 3-3 satisfies the conditional expressions (7) and (8).

Figure 40A:
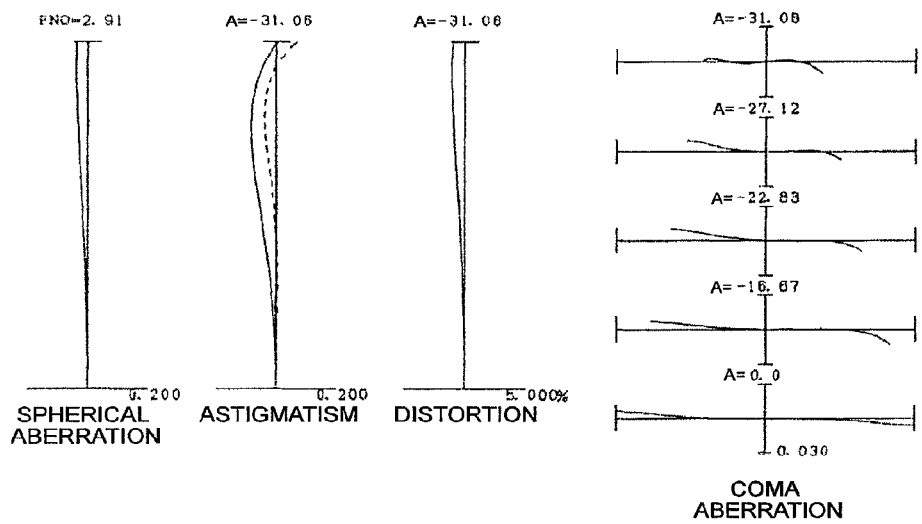
FIGS. 40A and 40B are graphs showing various aberrations of Example 3-3, where 40A are graphs showing various aberrations upon focusing on infinity, and 40B are graphs showing coma aberrations during a lens shift (0.1 mm)
Figure 40B:
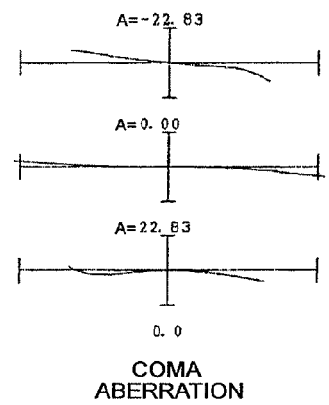

FIGS. 40A and 40B are graphs showing various aberrations of the imaging lens SL3 according to Example 3-3, where FIG. 40A are graphs showing various aberrations upon focusing on infinity, and FIG. 40B are graphs showing coma aberration during lens shift. As each graph showing aberrations shows, in the imaging lens SL3 according to Example 3-3, various aberrations are corrected satisfactorily during lens shift, and excellent image forming performance is implemented.

Example 3-4

Figure 41:
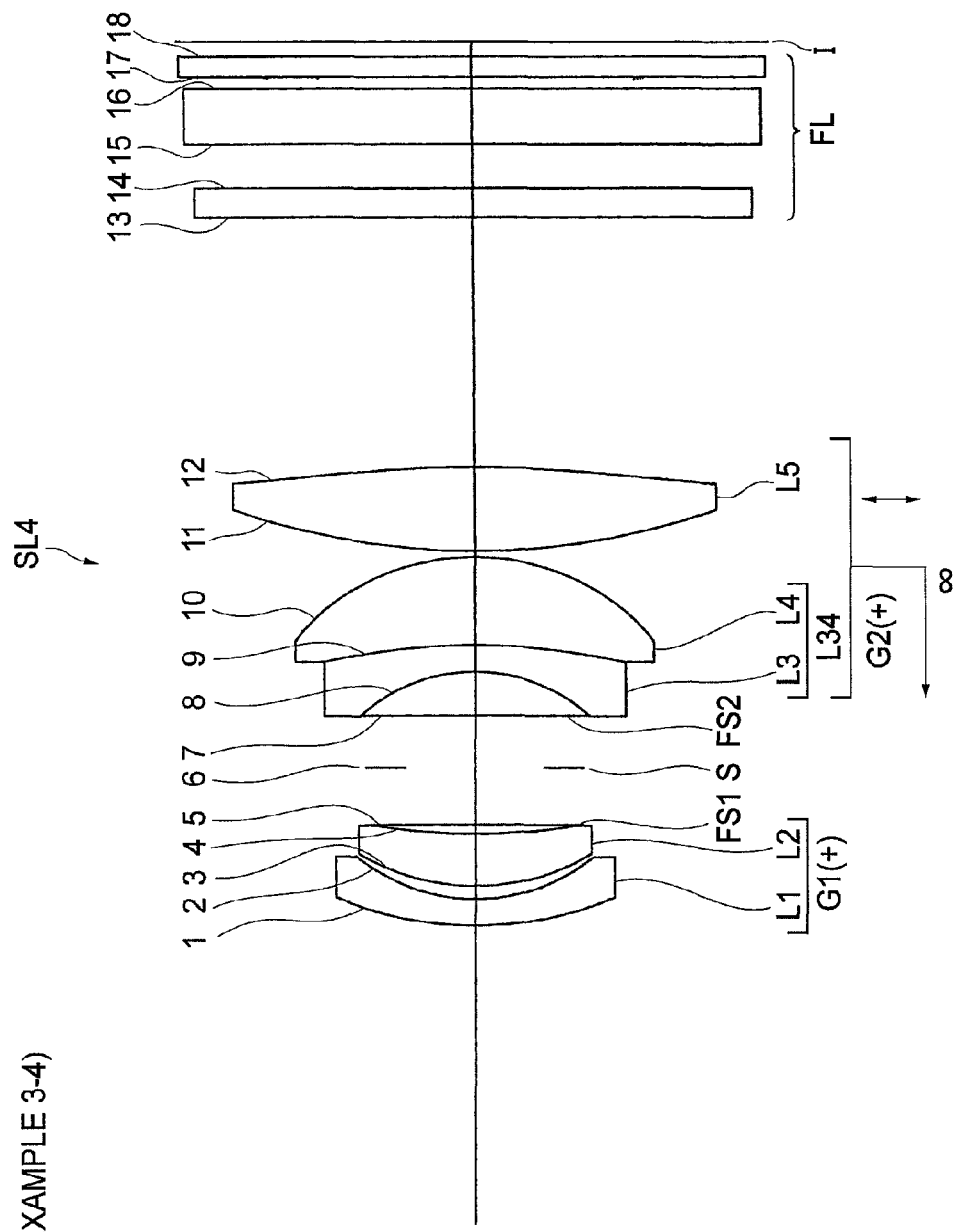
FIG. 41 is a cross-sectional view depicting a configuration of the imaging lens according to Example 3-4.

The imaging lens SL4 according to Example 3-4 will now be described with reference to FIG. 41 and FIGS. 42A and 42B and Table 3-4. As FIG. 41 shows, in the imaging lens SL4 according to Example 3-4, the object side lens G1 comprises a negative meniscus lens L1 having a convex surface facing the object and a positive meniscus lens L2 having a convex surface facing the object, which are disposed in order from the object. The image side lens group G2 comprises a cemented lens L34 of a negative meniscus lens L3 having a concave surface facing the object and a positive meniscus lens L4 having a convex surface facing the image side, and a biconvex positive lens L5, which are disposed in order from the object.

An aperture stop S is disposed between the object side lens group G1 and the image side lens group G2, and is fixed with respect to the object side lens group G1 or image plane I upon focusing from infinity to a close object. Also a flare stop FS1 and flare stop FS2 are disposed at pre-positions and post positions of the aperture stop S.

In Example 3-4, an axial air distance d6 between the object side lens group G1 and the image side lens group G2, and the axial air distance d12 between the image side lens group G2 and the filter group FL, change upon focusing.

Also in Example 3-4, the image side lens group G2 can be shifted in a direction substantially perpendicular to the optical axis as a shift lens group.

Table 3-4 shows a table on each parameter of Example 3-4. The surface numbers 1 to 18 in Table 3-4 correspond to the surfaces 1 to 18 in FIG. 41. In Example 3-4, the second surface and the twelfth surface are aspherical.

TABLE 3-4

[Surface data]

| Surface number | r | d | nd | vd |
|---|---|---|---|---|
| 1 | 9.9874 | 0.90 | 1.68893 | 31.08 |
| *2 | 5.0739 | 0.45 | | |
| 3 | 6.3837 | 1.76 | 1.85026 | 32.35 |
| 4 | 17.4312 | 0.30 | | |
| 5 | 0.0000 | 1.95 | (Flare stop S1) | |
| 6 | 0.0000 | 0.45 | (Aperture stop S) | |
| 7 | 0.0000 | 1.50 | (Flare stop S2) | |
| 8 | −4.8003 | 0.90 | 1.80810 | 22.76 |
| 9 | −18.5588 | 2.98 | 1.81600 | 46.62 |
| 10 | −6.7015 | 0.20 | | |
| 11 | 20.2148 | 2.86 | 1.66910 | 55.42 |
| *12 | −30.3443 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 5.0739
κ = −2.9635
C4 = +3.4708E−03
C6 = −1.4779E−04
C8 = +8.3851E−06
C10 = −2.3110E−07

Twelfth surface r = −30.3443
κ = −0.7304
C4 = +1.2477E−04
C6 = +4.7254E−07
C8 = +9.6784E−09
C10 = −1.1595E−10

[Various data]

f = 14.26
FNO = 2.91
2ω = 62.12
Y = 8.50
TL = 30.00

[Variable distance data]

|  | Infinity | Close Object |
|---|---|---|
| d6 | 1.7473 | 0.4500 |
| d12 | 8.4731 | 9.7704 |
| Bf | 0.4998 | 0.4998 |

[Lens group data]

|  | First surface | Focal length |
|---|---|---|
| Object side lens group | 1 | 39.8259 |
| Image side lens group | 7 | 14.1972 |

[Conditional expression]

f = 14.2560
f1 = 39.8259
fS(=f2) = 14.1972
Conditional expression (7) f/fS = 1.0041
Conditional expression (8) f2/f1 = 0.3565

As the parameter table in Table 3-4 shows, the imaging lens SL4 according to Example 3-4 satisfies the conditional expressions (7) and (8).

Figure 42A:
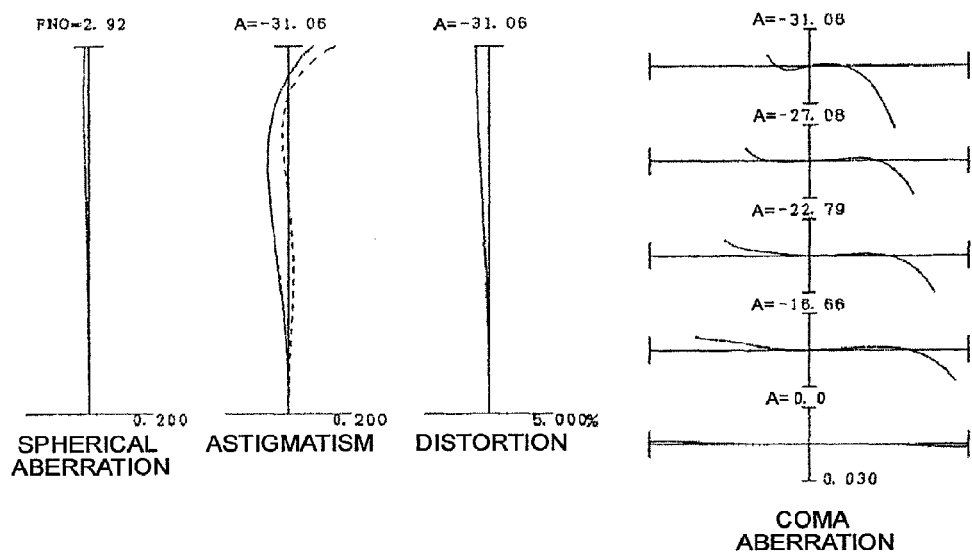
FIGS. 42A and 42B are graphs showing various aberrations of Example 3-4, where 42A are graphs showing various aberrations upon focusing on infinity, and 42B are graphs showing coma aberrations during a lens shift (0.1 mm)
Figure 42B:
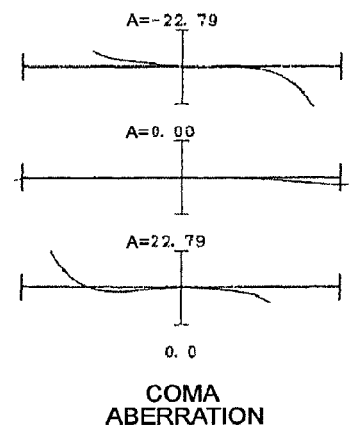

FIGS. 42A and 42B are graphs showing various aberrations of the imaging lens SL4 according to Example 3-4, where FIG. 42A are graphs showing various aberrations upon focusing on infinity, and FIG. 42B are graphs showing coma aberration during lens shift. As each graph showing aberrations shows, in the imaging lens SL4 according to Example 3-4, various aberrations are corrected satisfactorily during lens shift, and excellent image forming performance is implemented.

Example 3-5

Figure 43:
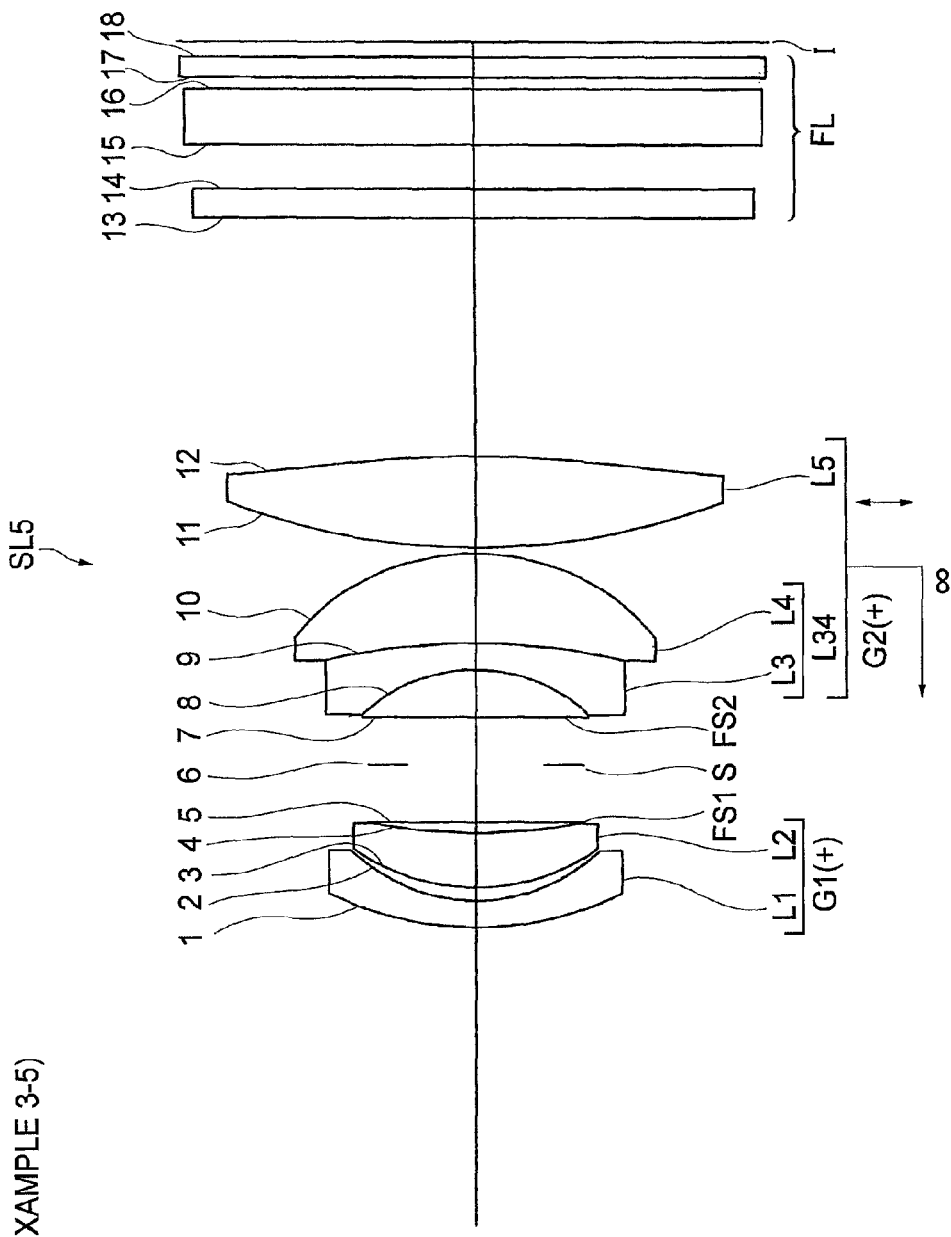
FIG. 43 is a cross-sectional view depicting a configuration of the imaging lens according to Example 3-5.

The imaging lens SL5 according to Example 3-5 will now be described with reference to FIG. 43 and FIGS. 44A and 44B and Table 3-5. As FIG. 43 shows, in the imaging lens SL5 according to Example 3-5, the object side lens G1 comprises a negative meniscus lens L1 having a convex surface facing the object and a positive meniscus lens L2 having a convex surface facing the object, which are disposed in order from the object. The image side lens group G2 comprises a cemented lens L34 of a negative meniscus lens L3 having a concave surface facing the object and a positive meniscus lens L4 having a convex surface facing the image side, and a biconvex positive lens L5, which are disposed in order from the object.

An aperture stop S is disposed between the object side lens group G1 and the image side lens group G2, and is fixed with respect to the object side lens group G1 or image plane I upon focusing from infinity to a close object. Also a flare stop FS1 and flare stop FS2 are disposed at pre-positions and post positions of the aperture stop S.

In Example 3-5, an axial air distance d6 between the object side lens group G1 and the image side lens group G2, and the axial air distance d12 between the image side lens group G2 and the filter group FL, change upon focusing.

Also in Example 3-5, the image side lens group G2 can be shifted in a direction substantially perpendicular to the optical axis as a shift lens group.

Table 3-5 shows a table on each parameter of Example 3-5. The surface numbers 1 to 18 in Table 3-5 correspond to the surfaces 1 to 18 in FIG. 43. In Example 3-5, the second surface and the twelfth surface are aspherical.

TABLE 3-5

| Surface number | r | d | nd | vd |
|---|---|---|---|---|
| 1 | 9.3520 | 0.90 | 1.67790 | 54.89 |
| *2 | 4.8208 | 0.45 | | |
| 3 | 5.9177 | 1.85 | 1.81600 | 46.62 |
| 4 | 15.9734 | 0.35 | | |
| 5 | 0.0000 | 1.95 | (Flare stop S1) | |
| 6 | 0.0000 | (d6) | (Aperture stop S) | |
| 7 | 0.0000 | 1.60 | (Flare stop S2) | |
| 8 | −4.6847 | 0.90 | 1.80810 | 22.76 |
| 9 | −18.5193 | 3.04 | 1.81600 | 46.62 |
| 10 | −6.7523 | 0.20 | | |
| 11 | 19.5054 | 3.10 | 1.66910 | 55.42 |
| *12 | −28.1863 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 4.8208
κ = −2.2502
C4 = +3.2855E−03
C6 = −1.1017E−04
C8 = +6.2421E−06
C10 = −1.6029E−07

TABLE 3-5-continued

Twelfth surface r = −28.1863
κ = +3.4908
C4 = +1.4959E−04
C6 = −3.4328E−07
C8 = +5.0300E−09
C10 = −5.9841E−11

[Various data]

f = 14.26
FNO = 2.92
2ω = 62.12
Y = 8.50
TL = 30.00

[Variable distance data]

| | Infinity | Close Object |
|---|---|---|
| d6 | 1.6152 | 0.3000 |
| d12 | 8.0762 | 9.3915 |
| Bf | 0.4989 | 0.4989 |

[Lens group data]

| | First surface | Focal length |
|---|---|---|
| Object side lens group | 1 | 36.9620 |
| Image side lens group | 7 | 14.0056 |

[Conditional expression]

f = 14.2560
f1 = 36.9620
fS(=f2) = 14.0056
Conditional expression (7) f/fS = 1.0179
Conditional expression (8) f2/f1 = 0.3789

As the parameter table in Table 3-5 shows, the imaging lens SL5 according to Example 3-5 satisfies the conditional expressions (7) and (8).

Figure 44A:
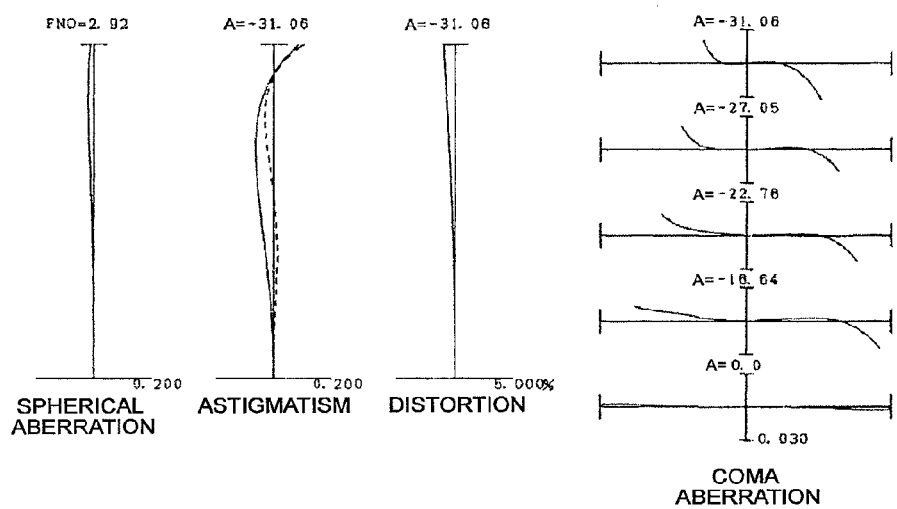
FIGS. 44A and 44B are graphs showing various aberrations of Example 3-5, where 44A are graphs showing various aberrations upon focusing on infinity, and 44B are graphs showing coma aberrations during a lens shift (0.1 mm)
Figure 44B:
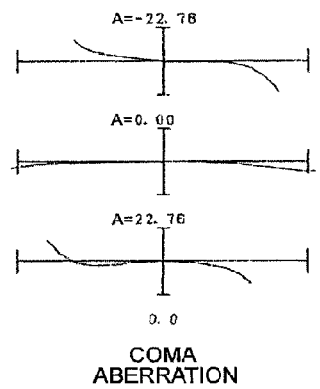

FIGS. 44A and 44B are graphs showing various aberrations of the imaging lens SL5 according to Example 3-5, where FIG. 44A are graphs showing various aberrations upon focusing on infinity, and FIG. 44B are graphs showing coma aberration during lens shift. As each graph showing aberrations shows, in the imaging lens SL5 according to Example 3-5, various aberrations are corrected satisfactorily during lens shift, and excellent image forming performance is implemented.

Example 3-6

The imaging lens SL6 according to Example 3-6 will now be described with reference to FIG. 45 and FIGS. 46A and 46B and Table 3-6. As FIG. 45 shows, in the imaging lens SL6 according to Example 3-6, the object side lens G1 comprises a negative meniscus lens L1 having a convex surface facing the object and a positive meniscus lens L2 having a convex surface facing the object, which are disposed in order from the object. The image side lens group G2 comprises a cemented lens L34 of a negative meniscus lens L3 having a concave surface facing the object and a positive meniscus lens L4 having a convex surface facing the image side, and a biconvex positive lens L5, which are disposed in order from the object.

An aperture stop S is disposed between the object side lens group G1 and the image side lens group G2, and is fixed with respect to the object side lens group G1 or image plane I upon focusing from infinity to a close object. Also a flare stop FS1 and flare stop FS2 are disposed at pre-positions and post positions of the aperture stop S.

In Example 3-6, an axial air distance d6 between the object side lens group G1 and the image side lens group G2, and the axial air distance d12 between the image side lens group G2 and the filter group FL, change upon focusing.

Also in Example 3-6, the image side lens group G2 can be shifted in a direction substantially perpendicular to the optical axis as a shift lens group.

Table 3-6 shows a table on each parameter of Example 3-6. The surface numbers 1 to 18 in Table 3-6 correspond to the surfaces 1 to 18 in FIG. 45. In Example 3-6, the second surface and the twelfth surface are aspherical.

TABLE 3-6

[Surface data]

| Surface number | r | d | nd | vd |
| --- | --- | --- | --- | --- |
| 1 | 8.7469 | 0.90 | 1.67790 | 54.89 |
| *2 | 4.6799 | 0.45 | | |
| 3 | 5.8268 | 1.85 | 1.81600 | 46.62 |
| 4 | 14.7269 | 0.35 | | |
| 5 | 0.0000 | 1.95 | (Flare stop S1) | |
| 6 | 0.0000 | (d6) | (Aperture stop S) | |
| 7 | 0.0000 | 1.45 | (Flare stop S2) | |
| 8 | −4.7008 | 0.90 | 1.80810 | 22.76 |
| 9 | −19.5674 | 3.05 | 1.81600 | 46.62 |
| 10 | −6.8100 | 0.20 | | |
| 11 | 20.7908 | 3.10 | 1.66910 | 55.42 |
| *12 | −24.7647 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 4.6799
κ = −1.0342
C4 = +2.1291E−03
C6 = −2.5886E−05
C8 = +2.2070E−06
C10 = −5.3593E−08

Twelfth surface r = −24.7647
κ = −7.3551
C4 = +6.0709E−05
C6 = +1.2096E−08
C8 = +2.7737E−09
C10 = −5.6169E−11

[Various data]

f = 14.26
FNO = 2.91
2ω = 62.12
Y = 8.50
TL = 30.00

[Variable distance data]

| | Infinity | Close Object |
| --- | --- | --- |
| d6 | 1.6575 | 0.3500 |
| d12 | 8.1725 | 9.4800 |
| Bf | 0.4953 | 0.4953 |

TABLE 3-6-continued

[Lens group data]

| | First surface | Focal length |
| --- | --- | --- |
| Object side lens group | 1 | 37.8004 |
| Image side lens group | 7 | 13.8767 |

[Conditional expression]

f = 14.2560
f1 = 37.8004
fS(=f2) = 13.8767
Conditional expression (7) f/fS = 1.0273
Conditional expression (8) f2/f1 = 0.3671

As the parameter table in Table 3-6 shows, the imaging lens SL6 according to Example 3-6 satisfies the conditional expressions (7) and (8).

Figure 46A:
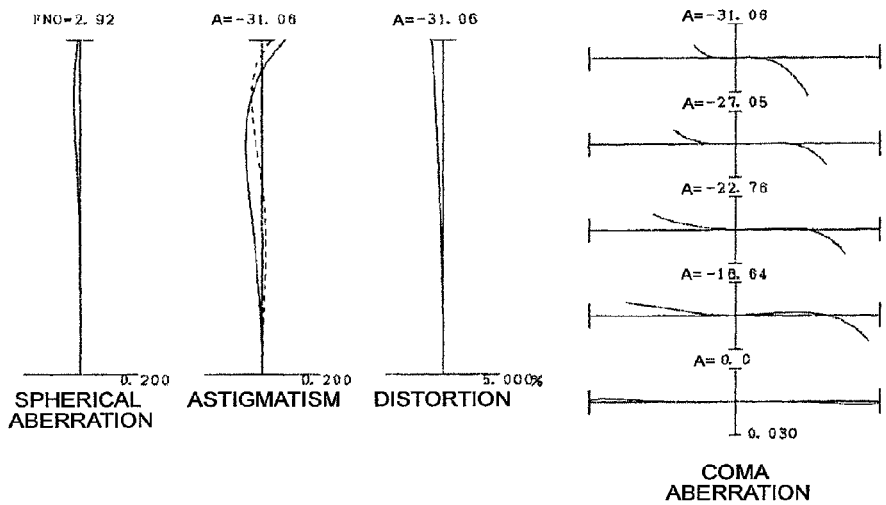
FIGS. 46A and 46B are graphs showing various aberrations of Example 3-6, where 46A are graphs showing various aberrations upon focusing on infinity, and 44B are graphs showing coma aberrations during a lens shift (0.1 mm)
Figure 46B:
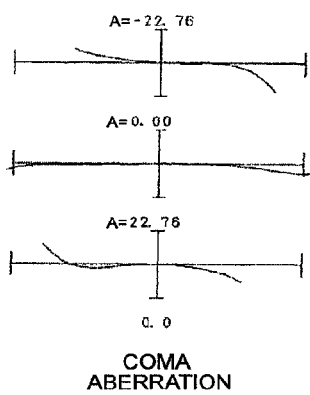

FIGS. 46A and 46B are graphs showing various aberrations of the imaging lens SL6 according to Example 3-6, where FIG. 46A are graphs showing various aberrations upon focusing on infinity, and FIG. 46B are graphs showing coma aberration during lens shift. As each graph showing aberrations shows, in the imaging lens SL6 according to Example 3-6, various aberrations are corrected satisfactorily during lens shift, and excellent image forming performance is implemented.

Example 3-7

The imaging lens SL7 according to Example 3-7 will now be described with reference to FIG. 47 and FIGS. 48A and 48B and Table 3-7. As FIG. 47 shows, in the imaging lens SL7 according to Example 3-7, the object side lens G1 comprises a negative meniscus lens L1 having a convex surface facing the object and a positive meniscus lens L2 having a convex surface facing the object, which are disposed in order from the object. The image side lens group G2 comprises a cemented lens L34 of a negative meniscus lens L3 having a concave surface facing the object and a positive meniscus lens L4 having a convex surface facing the image side, and a biconvex positive lens L5, which are disposed in order from the object.

An aperture stop S is disposed between the object side lens group G1 and the image side lens group G2, and is fixed with respect to the object side lens group G1 or image plane I upon focusing from infinity to a close object. Also a flare stop FS1 and flare stop FS2 are disposed at pre-positions and post positions of the aperture stop S.

In Example 3-7, an axial air distance d6 between the object side lens group G1 and the image side lens group G2, and the axial air distance d12 between the image side lens group G2 and the filter group FL, change upon focusing.

Also in Example 3-7, the image side lens group G2 can be shifted in a direction substantially perpendicular to the optical axis as a shift lens group.

Table 3-7 shows a table on each parameter of Example 3-7. The surface numbers 1 to 18 in Table 3-7 correspond to the surfaces 1 to 18 in FIG. 47. In Example 3-7, the second surface and the twelfth surface are aspherical.

TABLE 3-7

[Surface data]

| Surface number | r | d | nd | vd |
| --- | --- | --- | --- | --- |
| 1 | 14.0147 | 0.90 | 1.67790 | 54.89 |
| *2 | 5.4694 | 0.90 | | |

TABLE 3-7-continued

| | | | | |
|---|---|---|---|---|
| 3 | 7.6437 | 1.75 | 1.88300 | 40.76 |
| 4 | 30.8895 | 0.25 | | |
| 5 | 0.0000 | 1.60 | (Flare stop S1) | |
| 6 | 0.0000 | (d6) | (Aperture stop S) | |
| 7 | 0.0000 | 1.25 | (Flare stop S2) | |
| 8 | −5.1623 | 0.95 | 1.80810 | 22.76 |
| 9 | −14.4718 | 2.75 | 1.75500 | 52.32 |
| 10 | −6.7218 | 0.20 | | |
| 11 | 26.5149 | 2.85 | 1.59201 | 67.02 |
| *12 | −18.8905 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 5.4694
κ = +1.4173
C4 = −6.4702E−04
C6 = −2.1283E−05
C8 = −4.5161E−07
C10 = −6.2922E−08

Twelfth surface r = −18.8905
κ = +5.5850
C4 = +2.2637E−04
C6 = +8.5167E−07
C8 = +1.1963E−08
C10 = +1.5290E−10

[Various data]

f = 14.26
FNO = 2.83
2ω = 62.07
Y = 8.50
TL = 32.01

[Variable distance data]

| | Infinity | Close Object |
|---|---|---|
| d6 | 2.0676 | 0.8000 |
| d12 | 10.5324 | 11.8300 |
| Bf | 0.5145 | 0.5145 |

[Lens group data]

| | First surface | Focal length |
|---|---|---|
| Object side lens group | 1 | 51.9495 |
| Image side lens group | 7 | 15.2959 |

[Conditional expression]

f = 14.2560
f1 = 51.9495
fS(=f2) = 15.2959
Conditional expression (7) f/fS = 0.9320
Conditional expression (8) f2/f1 = 0.2944

As the parameter table in Table 3-7 shows, the imaging lens SL7 according to Example 3-7 satisfies the conditional expressions (7) and (8).

Figure 48A:
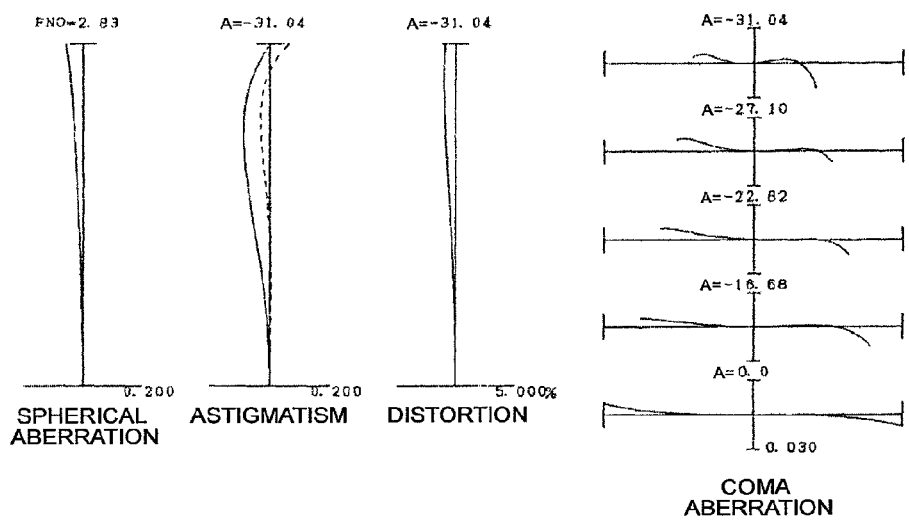
FIGS. 48A and 48B are graphs showing various aberrations of Example 3-7, where 48A are graphs showing various aberrations upon focusing on infinity, and 48B are graphs showing coma aberrations during a lens shift (0.1 mm)
Figure 48B:
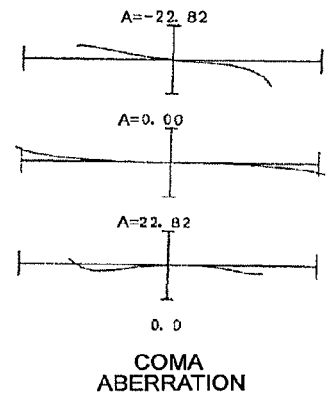

FIGS. 48A and 48B are graphs showing various aberrations of the imaging lens SL7 according to Example 3-7, where FIG. 48A are graphs showing various aberrations upon focusing on infinity, and FIG. 48B are graphs showing coma aberration during lens shift. As each graph showing aberrations shows, in the imaging lens SL7 according to Example 3-7, various aberrations are corrected satisfactorily during lens shift, and excellent image forming performance is implemented.

Example 3-8

The imaging lens SL8 according to Example 3-8 will now be described with reference to FIG. 49 and FIGS. 50A and 50B and Table 3-8. As FIG. 49 shows, in the imaging lens SL8 according to Example 3-8, the object side lens G1 comprises a negative meniscus lens L1 having a convex surface facing the object and a positive meniscus lens L2 having a convex surface facing the object, which are disposed in order from the object. The image side lens group G2 comprises a cemented lens L34 of a negative meniscus lens L3 having a concave surface facing the object and a positive meniscus lens L4 having a convex surface facing the image side, and a biconvex positive lens L5, which are disposed in order from the object.

An aperture stop S is disposed between the object side lens group G1 and the image side lens group G2, and is fixed with respect to the object side lens group G1 or image plane I upon focusing from infinity to a close object. Also a flare stop FS1 and flare stop FS2 are disposed at pre-positions and post positions of the aperture stop S.

In Example 3-8, an axial air distance d6 between the object side lens group G1 and the image side lens group G2, and the axial air distance d12 between the image side lens group G2 and the filter group FL, change upon focusing.

Also in Example 3-8, the image side lens group G2 can be shifted in a direction substantially perpendicular to the optical axis as a shift lens group.

Table 3-8 shows a table on each parameter of Example 3-8. The surface numbers 1 to 18 in Table 3-8 correspond to the surfaces 1 to 18 in FIG. 49. In Example 3-8, the second surface and the twelfth surface are aspherical.

TABLE 3-8

[Surface data]

| Surface number | r | d | nd | vd |
|---|---|---|---|---|
| 1 | 14.0077 | 1.30 | 1.67790 | 54.89 |
| *2 | 5.3933 | 0.60 | | |
| 3 | 7.5715 | 1.95 | 1.88300 | 40.76 |
| 4 | 28.3663 | 0.25 | | |
| 5 | 0.0000 | 1.75 | (Flare stop S1) | |
| 6 | 0.0000 | (d6) | (Aperture stop S) | |
| 7 | 0.0000 | 1.25 | (Flare stop S2) | |
| 8 | −5.2273 | 0.98 | 1.80810 | 22.76 |
| 9 | −15.1471 | 2.88 | 1.75500 | 52.32 |
| 10 | −6.7013 | 0.20 | | |
| 11 | 23.0044 | 2.94 | 1.59201 | 67.02 |
| *12 | −20.7345 | 8.96 | | |
| 13 | 0.0000 | 0.50 | 1.51633 | 64.14 |
| 14 | 0.0000 | 4.60 | | |
| 15 | 0.0000 | 1.87 | 1.51633 | 64.14 |
| 16 | 0.0000 | 0.30 | | |
| 17 | 0.0000 | 0.70 | 1.51633 | 64.14 |
| 18 | 0.0000 | (Bf) | | |

[Aspherical data]

Second surface r = 5.3933
κ = +1.7327
C4 = −9.1467E−04
C6 = −4.4123E−05
C8 = +8.7126E−07
C10 = −2.7436E−07

TABLE 3-8-continued

[Twelfth surface]

r = −20.7345
κ = −19.0000
C4 = −1.4487E−04
C6 = +4.4684E−06
C8 = −5.5750E−08
C10 = +3.1253E−10

[Various data]

f = 14.26
FNO = 2.92
2ω = 62.50
Y = 8.50
TL = 32.36

[Variable distance data]

|  | Infinity | Close Object |
|---|---|---|
| d6 | 2.0376 | 0.8000 |
| d12 | 7.7203 | 8.9579 |
| Bf | 0.5348 | 0.5348 |

[Lens group data]

|  | First surface | Focal length |
|---|---|---|
| Object side lens group | 1 | 51.9495 |
| Image side lens group | 7 | 14.3554 |

[Conditional expression]

f = 14.2560
f1 = 67.2632
fS(=f2) = 14.3554
Conditional expression (7) f/fS = 0.9931
Conditional expression (8) f2/f1 = 0.2134

As the parameter table in Table 3-8 shows, the imaging lens SL8 according to Example 3-8 satisfies the conditional expressions (7) and (8).

Figure 50A:
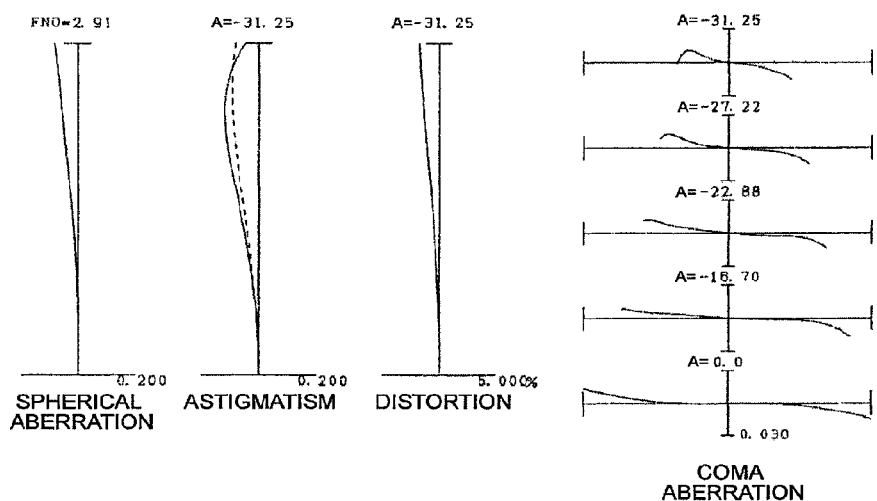
FIGS. 50A and 50B are graphs showing various aberrations of Example 3-8, where 50A are graphs showing various aberrations upon focusing on infinity, and 50B are graphs showing coma aberrations during a lens shift (0.1 mm)
Figure 50B:
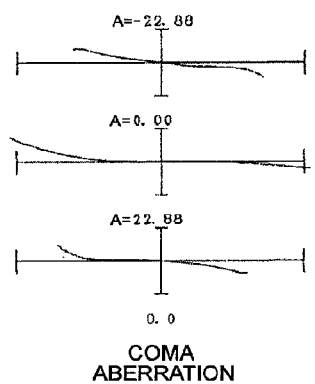

FIGS. 50A and 50B are graphs showing various aberrations of the imaging lens SL8 according to Example 3-8, where FIG. 50A are graphs showing various aberrations upon focusing on infinity, and FIG. 50B are graphs showing coma aberration during lens shift. As each graph showing aberrations shows, in the imaging lens SL8 according to Example 3-8, various aberrations are corrected satisfactorily during lens shift, and excellent image forming performance is implemented.

Fourth Embodiment

A fourth embodiment of the imaging lens according to the present invention will now be described. The fourth embodiment includes examples (Example 4-1 to Example 4-8) herein below.

The imaging lens SL according to the fourth embodiment includes configurations of Example 4-1 to Example 4-8 shown in FIG. 51, FIG. 53, FIG. 55, FIG. 57, FIG. 59, FIG. 61, FIG. 63 and FIG. 65, but is described using the configuration in FIG. 51 as an example. As FIG. 51 shows, this imaging lens SL comprises a first lens group G1 having a positive refractive power, an aperture stop S and a second lens group G2 having a positive refractive power, which are disposed in order from an object, where the first lens group G1 further comprises a negative lens component L1 and a positive lens component L2, which are disposed in order from the object, and the second lens group G2 further comprises a cemented lens component L34 of a negative lens L3 and a positive lens L4, and a positive lens component L5, which are disposed in order from the object. Because of this configuration, the imaging lens SL according to the fourth embodiment, of which angle of view exceeds 60° and which is compact and can implement excellent image forming performance, can be created.

In the fourth embodiment having the above configuration, conditions of the following expressions (9) and (10)

$$nd5 < 1.67 \quad (9)$$

$$vd5 > 50.0 \quad (10)$$

are satisfied, where nd5 is a refractive index of the second positive lens component L5 of the second lens group G2 with respect to the d-line, and vd5 is an Abbe number of the second positive lens component L5 of the second lens group G2 with respect to the d-line.

The conditional expressions (9) and (10) are conditions to minimize deterioration of lateral chromatic aberration. If the conditional expressions (9) and (10) are not satisfied, fluctuation of the lateral chromatic aberration upon focusing increases, and photographic performance at close distance deteriorates, which is not preferable.

To make the effect of the fourth embodiment certain, it is preferable that the lower limit value of the conditional expression (10) is 51.50. To make the effect of the fourth embodiment more certain, it is preferable that the lower limit value of the conditional expression (10) is 53.00. To make the effect of the fourth embodiment even more certain, it is preferable that the lower limit value of the conditional expression (10) is 54.50.

In the fourth embodiment, it is preferable that a condition expressed by the following expression (11)

$$-0.30 < (r5R + r5F)/(r5R - r5F) < 0.40 \quad (11)$$

is satisfied, where r5F is a radius of curvature of the object side lens surface of the second positive lens component L5 of the second lens group G2, and r5R is a radius of curvature of the image side lens surface of the second positive lens component L5 of the second lens group G2.

The conditional expression (11) is a conditional expression to correct the coma aberration and distortion generated in the second positive lens component L5 of the second lens group G2 alone satisfactorily. If the upper limit value of the conditional expression (11) is exceeded, the coma aberration generated in the second positive lens component L5 of the second lens group G2 alone cannot be corrected. Distortion also increases, which is not preferable. If the lower limit value of the conditional expression (11) is not reached, on the other hand, the coma aberration generated in the second positive lens component L5 of the second lens group G2 alone increases too much, and performance in the shortest photographic distance deteriorates, which is not preferable.

To make the effect of the fourth embodiment certain, it is preferable that the upper limit value of the conditional expression (11) is 0.35. To make the effect of the fourth embodiment more certain, it is preferable that the upper limit value of the conditional expression (11) is 0.30. To make the effect of the fourth embodiment even more certain, it is preferable that the upper limit value of the conditional expression (11) is 0.25.

To make the effect of the fourth embodiment certain, it is preferable that the lower limit value of the conditional expression (11) is −0.25. To make the effect of the fourth embodiment more certain, it is preferable that the lower limit value of the conditional expression (11) is −0.22. To make the effect of the fourth embodiment even more certain, it is preferable that the lower limit value of the conditional expression (11) is −0.19.

In the fourth embodiment, it is preferable that a condition expressed by the following expression (12)

$$0.60 < f/f5 < 0.90 \tag{12}$$

is satisfied, where f is a focal length of the imaging lens, and f5 is a focal length of the second positive lens component L5 of the second lens group G2.

The conditional expression (12) is a conditional expression to specify an appropriate range of refractive power distribution of the second positive lens component L5 of the second lens group G2. If the upper limit value of the conditional expression (12) is exceeded, the refractive power of the second positive lens component L5 of the second lens group G2 becomes strong, and the spherical aberration and coma aberration deteriorate. If the lower limit value of the conditional expression (12) is not reached, on the other hand, the focal length f5 of the second positive lens component L5 increases, and the spherical aberration is corrected satisfactorily. However, the focal length of the second lens group G2 also increases, that is, the total length of the lens increases, and as a result, downsizing of the imaging lens cannot be implemented. Also the refractive power of the second lens group G2 decreases, and if the second lens group G2 is a focusing lens group, the moving distance during focus adjustment increases, which is not preferable.

To make the effect of the fourth embodiment certain, it is preferable that the upper limit value of the conditional expression (12) is 0.88. To make the effect of the fourth embodiment more certain, it is preferable that the upper limit value of the conditional expression (12) is 0.86. To make the effect of the fourth embodiment even more certain, it is preferable that the upper limit value of the conditional expression (12) is 0.84.

To make the effect of the fourth embodiment certain, it is preferable that the lower limit value of the conditional expression (12) is 0.63. To make the effect of the fourth embodiment more certain, it is preferable that the lower limit value of the conditional expression (12) is 0.66. To make the effect of the fourth embodiment even more certain, it is preferable that the lower limit value of the conditional expression (12) is 0.70.

In the fourth embodiment, it is preferable that the first lens group G1 further comprises a negative meniscus lens L1 having a convex surface facing the object, and a positive meniscus lens L2 having a convex surface facing the object, which are disposed in order from the object. Because of this configuration, higher performance and downsizing can be balanced, and the spherical aberration and curvature of field generated in the first lens group G1 alone can be corrected satisfactorily.

In the fourth embodiment, it is preferable that the second lens group G2 further comprises a cemented lens L34 of the negative meniscus lens L3 having a concave surface facing the object and a positive meniscus lens L4 having a convex surface facing the image, and a biconvex positive lens L5, which are disposed in order from the object. Because of this configuration, in the imaging lens SL of the fourth embodiment the curvature of field and coma aberration can be corrected satisfactorily, and higher performance of the imaging lens SL can be implemented.

In the fourth embodiment, it is preferable that the first lens group G1 includes at least one aspherical surface (second surface from the object in FIG. 51). Because of this configuration, higher performance and downsizing can be balanced, and the spherical aberration and curvature of field can be corrected satisfactorily.

In the fourth embodiment, it is preferable that the negative lens L1 of the first lens group G1 includes at least one aspherical surface (second surface from the object in FIG. 51). Because of this configuration, higher performance and downsizing can be balanced, and the spherical aberration and curvature of field can be corrected satisfactorily.

In the fourth embodiment, it is preferable that the second lens group G2 includes at least one aspherical surface (twelfth surface from the object in FIG. 51). Because of this configuration, fluctuation of distortion and curvature of field generated upon focusing can be corrected satisfactorily, and higher performance of the imaging lens SL can be implemented.

It is also preferable that the second positive lens component L5 of the second lens group G2 includes at least one aspherical surface (twelfth surface from the object in FIG. 51). Because of this configuration, fluctuation of distortion and curvature of field generated upon focusing can be corrected satisfactorily, and higher performance of the imaging lens SL can be implemented.

In the fourth embodiment, it is preferable that focus on a close object is adjusted by moving the second lens group G2 toward the object. Because of this configuration, fluctuation of aberration upon focus adjustment can be suppressed, and interference of a lens or a mechanism component to support a lens can be prevented, since the feed pitch of the second lens group G2 toward the object upon focus adjustment is very small. It is possible to adjust focus on a close object using the first lens group G1, but the feed pitch toward the object becomes very large, which causes a change in the total length of the lens. Along with this change, such a mechanism as a drive system becomes complicated, and downsizing becomes difficult. Also deterioration of the spherical aberration and curvature of field increase, which is not preferable.

In the fourth embodiment, in order to prevent failure of photography due to an image blur caused by camera motion, it is possible that a blur detection system for detecting the blur of the lens system and drive means are combined in the lens system, and all or a part of one lens group, out of the lens group constituting the lens system, are decentered as a shift lens group, and an image is shifted by driving the shift lens group by the drive means, so as to correct the image blur (fluctuation of image plane position) caused by a blur of the lens system detected by the blur detection system, thereby the image blur can be corrected. As mentioned above, the imaging lens SL of the fourth embodiment can function as a vibration proof optical system.

The imaging lens SL according to the fourth embodiment comprises two lens groups, that is, the first lens group G1 and the second lens group G2, but another lens group may be added between the lens groups or another lens group may be added adjacent to the image side of the first lens group G1 or the object side of the second lens group G2.

In the imaging lens SL according to the fourth embodiment, it is preferable that the distance from the image side lens surface to the image plane (back focus) of the positive lens L5 disposed closest to the image is about 10 to 30 mm in the shortest state. In the imaging lens SL, it is preferable that the image height is 5 to 12.5 mm, and more preferably is 5 to 9.5 mm.

Examples of the Fourth Embodiment

Example 4-1 to Example 4-8 according to the fourth embodiment will now be described with reference to the drawings. FIG. 51, FIG. 53, FIG. 55, FIG. 57, FIG. 59, FIG. 61, FIG. 63 and FIG. 65 are cross-sectional views depicting a configuration of the imaging lens SL (SL1 to SL8) according to each example, where the change of focusing state, from focusing on infinity to focusing on a close object of the imaging lenses SL1 to SL8, that is, the state of movement of each lens group upon focusing, is shown by an arrow.

As described above, the imaging lens SL1 to SL8 according to each example comprises a first lens group G1 having a positive refractive power, an aperture stop S, a second lens group G2 having a positive refractive power, and a filter group FL which includes a low pass filter, infrared cut filter or the like, which are disposed in order from an object. Upon focusing from the state of focusing on infinity to the state of focusing on a close object, the first lens group G1 is fixed with respect to the image plane I, and the second lens group G2 is moved with respect to the image plane I, so as to change the distance between the first lens group G1 and the second lens group G2. The image plane I is formed on an unillustrated image sensing element, and this image sensing element is CCD or CMOS, for example.

Table 4-1 to Table 4-8 shown below are tables of each parameter according to Example 4-1 to Example 4-8. Description on the tables, which is the same as the table of the first embodiment, is omitted. In [conditional expression], values corresponding to the conditional expressions (9) to (12) are shown.

Example 4-1

The imaging lens SL1 according to Example 4-1 will now be described with reference to FIG. 51, FIGS. 52A and 52B and Table 4-1. As FIG. 51 shows, in the imaging lens SL1 according to Example 4-1, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 (first positive lens component) having a convex surface facing the image, and a biconvex positive lens L5 (second positive lens component), which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 4-1, an axial air distance d6, between the first lens group G1 and the second lens group G2, and an axial air distance d12 between the second lens group G2 and the filter group FL change upon focusing.

Table 4-1 shows a table on each parameter of Example 4-1. The surface numbers 1 to 18 in Table 4-1 correspond to the surfaces 1 to 18 in FIG. 51. In Example 4-1, the second surface and the twelfth surface are aspherical.

TABLE 4-1

[Surface data]

| Surface number | r | d | nd | vd |
|---|---|---|---|---|
| 1 | 12.5540 | 0.90 | 1.67790 | 54.89 |
| *2 | 5.1200 | 0.80 | | |
| 3 | 7.2279 | 1.90 | 1.88300 | 40.76 |
| 4 | 25.2952 | 0.80 | | |
| 5 | 0.0000 | 1.40 | (Flare stop S1) | |
| 6 | 0.0000 | (d6) | (Aperture stop S) | |
| 7 | 0.0000 | 1.00 | (Flare stop S2) | |
| 8 | −5.1593 | 0.90 | 1.80810 | 22.76 |
| 9 | −15.0968 | 2.65 | 1.75500 | 52.32 |
| 10 | −6.5278 | 0.20 | | |
| 11 | 25.0474 | 2.70 | 1.58913 | 61.16 |
| *12 | −19.8008 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 5.1200
κ = +0.9952
C4 = −3.5496E−04
C6 = −1.3835E−05
C8 = −6.4411E−08
C10 = −2.8213E−08

Twelfth surface r = −19.8008
κ = +5.2781
C4 = +2.1953E−04
C6 = −1.0580E−07
C8 = +2.9574E−08
C10 = −2.6872E−10

[Various data]

f = 14.26
FNO = 2.83
2ω = 62.12
Y = 8.50
TL = 31.51

[Variable distance data]

| | Infinity | Close Object |
|---|---|---|
| d6 | 1.8514 | 0.6000 |
| d12 | 10.4286 | 11.6800 |
| Bf | 0.5058 | 0.5058 |

[Lens group data]

| | First surface | Focal length |
|---|---|---|
| First lens group | 1 | 58.2236 |
| Second lens group | 7 | 14.9735 |

[Conditional expression]

nd5 = 1.58913
vd5 = 61.16
r5F = 25.0474
r5R = −19.8008
f = 14.2560
f5 = 19.1996
Conditional expression (9) nd5 = 1.58913
Conditional expression (10) vd5 = 61.16
Conditional expression (11) (r5R + r5F)/(r5R − r5F) = −0.1170
Conditional expression (12) f/f5 = 0.7425

As the parameter table in Table 4-1 shows, the imaging lens SL1 according to Example 4-1 satisfies the conditional expressions (9) and (12).

Figure 52A:
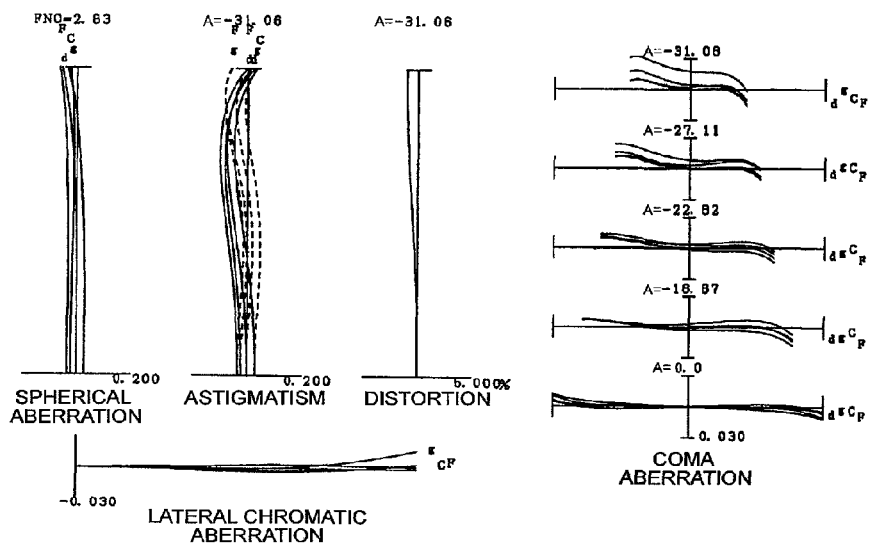
FIGS. 52A and 52B are graphs showing various aberrations of Example 4-1, where 52A are graphs showing various aberrations upon focusing on infinity, and 52B are graphs showing various aberrations upon focusing on a close object.
Figure 52B:
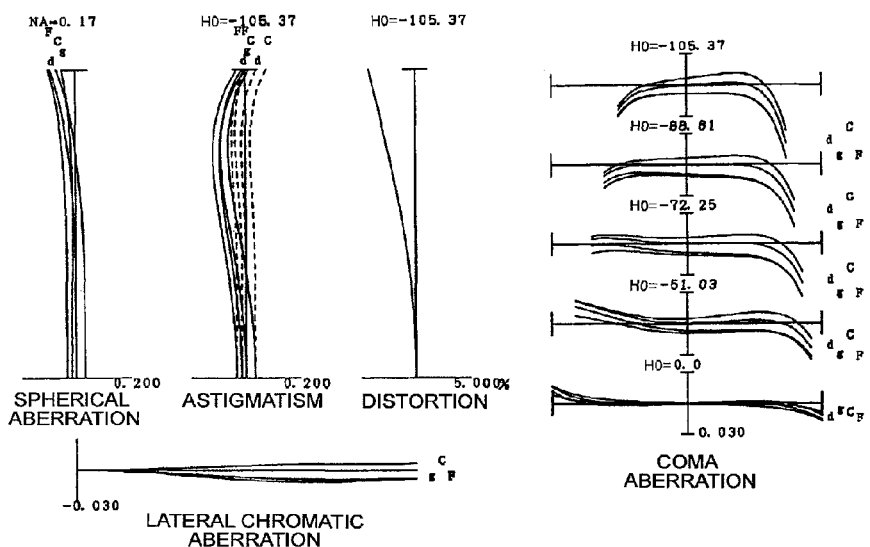

FIGS. 52A and 52B are graphs showing aberrations of the imaging lens SL1 according to Example 4-1, where FIG. 52A are graphs showing various aberrations upon focusing on infinity, and FIG. 52B are graphs showing various aberrations upon focusing on a close object. In each graph showing aberrations, NA is a numerical aperture, FNO is an F number, A is a half angle of view with respect to each image height, and HO is a height of an object. d indicates aberrations with respect to the d-line (wavelength: 587.6 nm), g indicates aberrations with respect to the g-line (wavelength: 435.8 nm), C indicates aberrations with respect to the C-line (wavelength: 656.3 nm), F indicates aberrations with respect to the F-line (wavelength: 486.1 nm), and data with no indication is an aberration with respect to the d-line. In the graph showing astigmatism, a solid line indicates a sagittal image surface, and a broken line indicates a meridional image surface.

The above description on the graphs showing aberration is the same for other examples, therefore description thereof is omitted.

As each graph showing aberrations shows, in the imaging lens SL1 according to Example 4-1, various aberrations are corrected satisfactorily from the state of focusing on infinity to the state of focusing on a close object, and an excellent image performance is implemented.

Example 4-2

The imaging lens SL2 according to Example 4-2 will now be described with reference to FIG. 53, FIGS. 54A and 54B and Table 4-2. As FIG. 53 shows, in the imaging lens SL2 according to Example 4-2, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 (first positive lens component) having a convex surface facing the image, and a biconvex positive lens L5 (second positive lens component), which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 4-2, an axial air distance d6, between the first lens group G1 and the second lens group G2, and an axial air distance d12 between the second lens group G2 and the filter group FL change upon focusing.

Table 4-2 shows a table on each parameter of Example 4-2. The surface numbers 1 to 18 in Table 4-2 correspond to the surfaces 1 to 18 in FIG. 53. In Example 4-2, the second surface and the twelfth surface are aspherical.

TABLE 4-2

[Surface data]

| Surface number | r | d | nd | vd |
|---|---|---|---|---|
| 1 | 11.8261 | 0.90 | 1.67790 | 54.89 |
| *2 | 5.0108 | 0.65 | | |
| 3 | 7.0263 | 1.85 | 1.88300 | 40.76 |
| 4 | 23.3567 | 0.70 | | |
| 5 | 0.0000 | 1.40 | (Flare stop S1) | |
| 6 | 0.0000 | (d6) | (Aperture stop S) | |
| 7 | 0.0000 | 1.00 | (Flare stop S2) | |
| 8 | −5.0661 | 0.90 | 1.80810 | 22.76 |
| 9 | −14.6310 | 2.70 | 1.75500 | 52.32 |
| 10 | −6.3977 | 0.20 | | |
| 11 | 23.5294 | 2.70 | 1.58913 | 61.16 |
| *12 | −21.4493 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 5.0108
κ = +0.1277
C4 = +4.8479E−04
C6 = +5.6078E−06
C8 = +1.1439E−07
C10 = +2.6889E−09

Twelfth surface r = −21.4493
κ = −5.6807
C4 = +6.6823E−05
C6 = −6.8560E−08
C8 = +2.3185E−08
C10 = −3.6236E−10

[Various data]

f = 14.26
FNO = 2.88
2ω = 62.12
Y = 8.50
TL = 31.01

[Variable distance data]

| | Infinity | Close Object |
|---|---|---|
| d6 | 1.8508 | 0.6000 |
| d12 | 10.1792 | 11.4301 |
| Bf | 0.5070 | 0.5070 |

[Lens group data]

| | First surface | Focal length |
|---|---|---|
| First lens group | 1 | 56.8827 |
| Second lens group | 7 | 14.7636 |

[Conditional expression]

nd5 = 1.58913
vd5 = 61.16
r5F = 23.5294
r5R = −21.4493
f = 14.2560
f5 = 19.4796
Conditional expression (9) nd5 = 1.58913
Conditional expression (10) vd5 = 61.16
Conditional expression (11) (r5R + r5F)/(r5R − r5F) = −0.0462
Conditional expression (12) f/f5 = 0.7318

Table 1-2 shows a table on each parameter of Example 1-2. The surface numbers 1 to 18 in Table 1-2 correspond to the surfaces 1 to 18 in FIG. 5. In Example 1-2, the second surface and the twelfth surface are aspherical.

As the parameter table in Table 4-2 shows, the imaging lens SL2 according to Example 4-2 satisfies the conditional expressions (9) and (12).

Figure 54A:
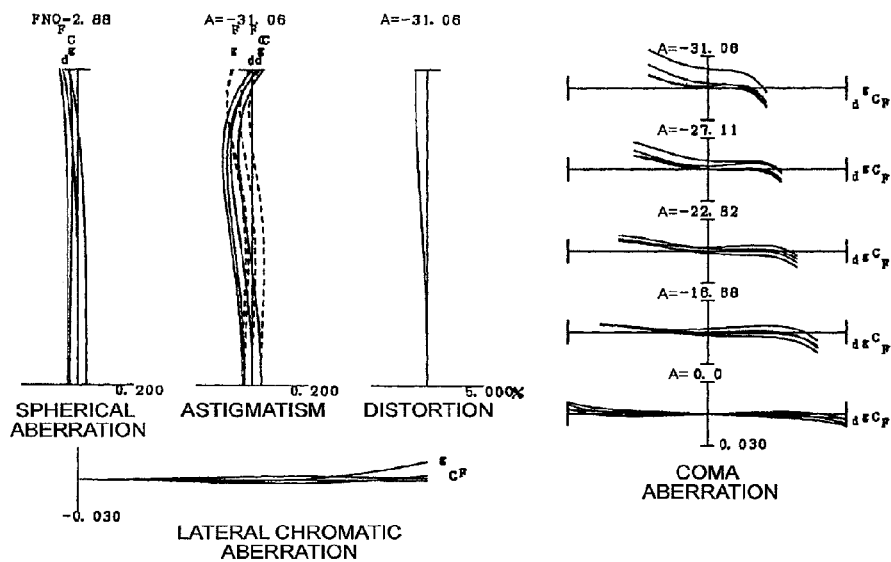
FIGS. 54A and 54B are graphs showing various aberrations of Example 4-2, where 54A) are graphs showing various aberrations upon focusing on infinity, and 54B are graphs showing various aberrations upon focusing on a close object.
Figure 54B:
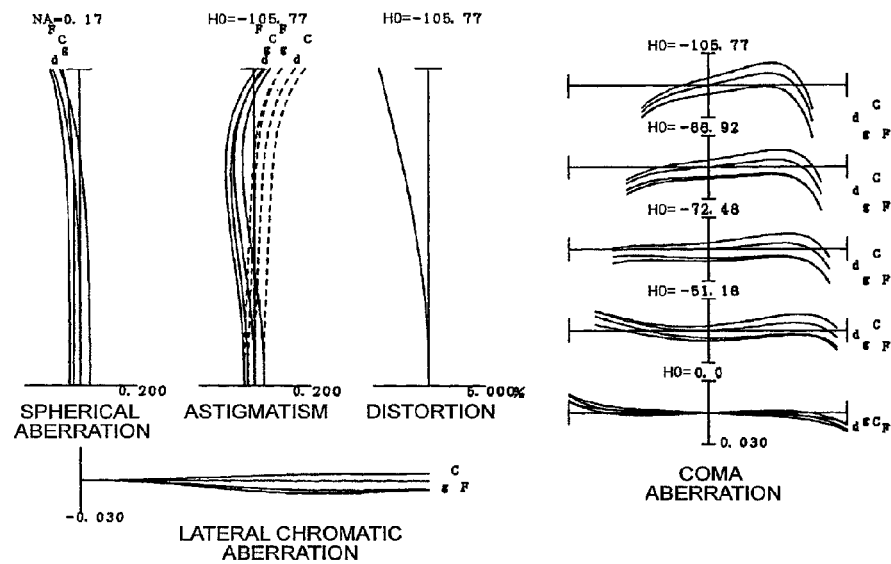

FIG. 54A are graphs showing aberrations of the imaging lens SL2 according to Example 4-2, where FIG. 54A are graphs showing various aberrations upon focusing on infinity, and FIG. 54B are graphs showing various aberrations upon focusing on a close object. As each graph showing aberrations shows, in the imaging lens SL2 according to Example 4-2, various aberrations are corrected satisfactorily from the state of focusing on infinity to the state of focusing on a close object, and an excellent image performance is implemented.

Example 4-3

The imaging lens SL3 according to Example 4-3 will now be described with reference to FIG. 55, FIGS. 56A and 56B and Table 4-3. As FIG. 55 shows, in the imaging lens SL3 according to Example 4-3, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 (first positive lens component) having a convex surface facing the image, and a biconvex positive lens L5 (second positive lens component), which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 4-3, an axial air distance d6, between the first lens group G1 and the second lens group G2, and an axial air distance d12 between the second lens group G2 and the filter group FL change upon focusing.

Table 4-3 shows a table on each parameter of Example 4-3. The surface numbers 1 to 18 in Table 4-3 correspond to the surfaces 1 to 18 in FIG. 55. In Example 4-3, the second surface and the twelfth surface are aspherical.

TABLE 4-3

| Surface number | r | d | nd | vd |
|---|---|---|---|---|
| 1 | 12.6464 | 0.90 | 1.66910 | 55.42 |
| *2 | 5.7001 | 0.75 | | |
| 3 | 7.7231 | 1.67 | 1.88300 | 40.76 |
| 4 | 24.6238 | 0.20 | | |
| 5 | 0.0000 | 1.40 | (Flare stop S1) | |
| 6 | 0.0000 | (d6) | (Aperture stop S) | |
| 7 | 0.0000 | 1.50 | (Flare stop S2) | |
| 8 | −5.0699 | 0.90 | 1.80810 | 22.76 |
| 9 | −18.5950 | 3.00 | 1.80400 | 46.57 |
| 10 | −7.0355 | 0.20 | | |
| 11 | 26.7580 | 3.12 | 1.61881 | 63.85 |
| *12 | −18.8179 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 5.7001
κ = +1.7002
C4 = −7.4793E−04
C6 = −3.1424E−05
C8 = +2.0843E−07
C10 = −1.3010E−07

Twelfth surface r = −18.8179
κ = −7.0961
C4 = −3.0038E−05
C6 = +1.0404E−06
C8 = −1.2568E−09
C10 = −4.7030E−11

[Various data]

f = 14.26
FNO = 2.91
2ω = 62.12
Y = 8.50
TL = 32.01

[Variable distance data]

| | Infinity | Close Object |
|---|---|---|
| d6 | 2.4197 | 1.1500 |
| d12 | 9.9683 | 11.2380 |
| Bf | 0.5123 | 0.5123 |

[Lens group data]

| | First surface | Focal length |
|---|---|---|
| First lens group | 1 | 48.8782 |
| Second lens group | 7 | 14.6742 |

[Conditional expression]

nd5 = 1.61881
vd5 = 63.85
r5F = 26.7580
r5R = −18.8179
f = 14.2560
f5 = 18.3342
Conditional expression (9) nd5 = 1.61881
Conditional expression (10) vd5 = 63.85
Conditional expression (11) (r5R + r5F)/(r5R − r5F) = −0.1742
Conditional expression (12) f/f5 = 0.7776

As the parameter table in Table 4-3 shows, the imaging lens SL3 according to Example 4-3 satisfies the conditional expressions (9) and (12).

Figure 56A:
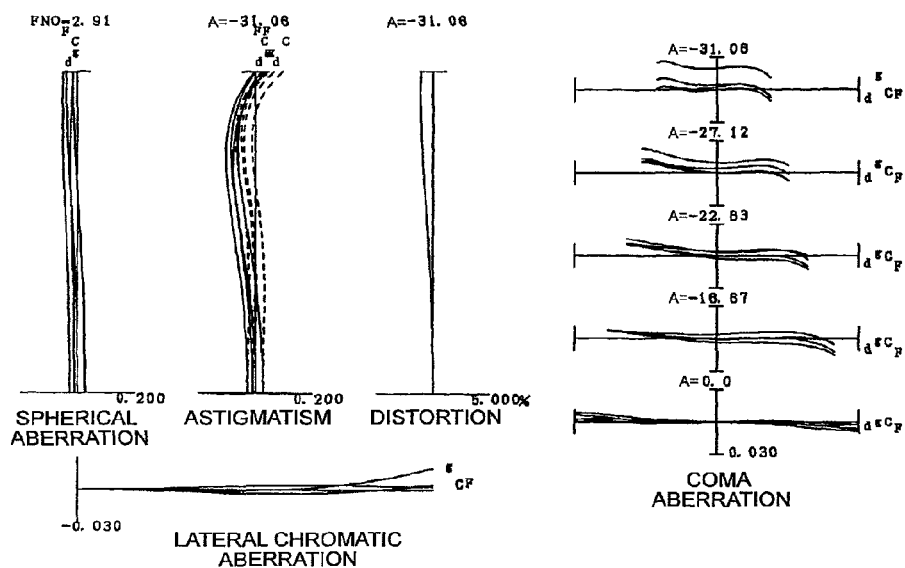
FIGS. 56A and 56B are graphs showing various aberrations of Example 4-3, where 56A are graphs showing various aberrations upon focusing on infinity, and 56B are graphs showing various aberrations upon focusing on a close object.
Figure 56B:
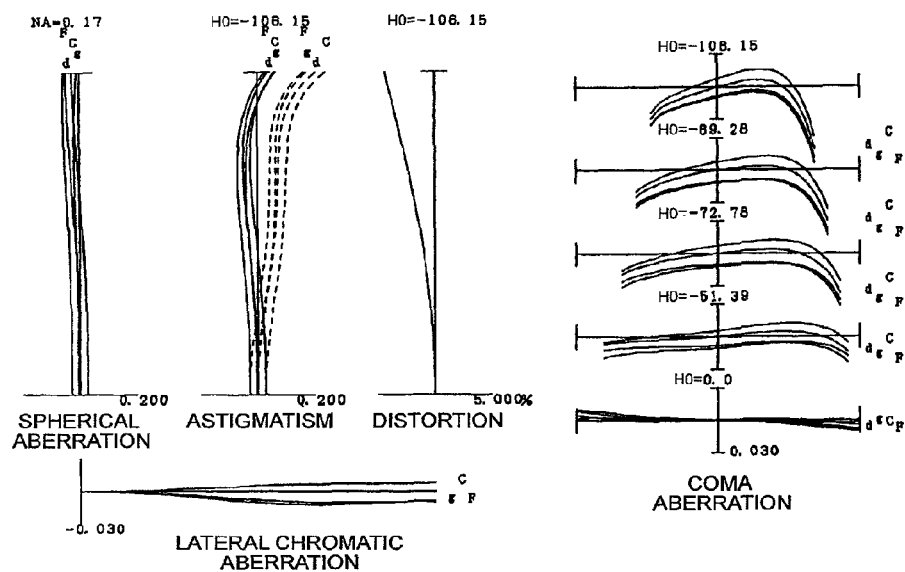

FIGS. 56A and 56B are graphs showing aberrations of the imaging lens SL3 according to Example 4-3, where FIG. 56A are graphs showing various aberrations upon focusing on infinity, and FIG. 56B are graphs showing various aberrations upon focusing on a close object. As each graph showing aberrations shows, in the imaging lens SL3 according to Example 4-3, various aberrations are corrected satisfactorily from the state of focusing on infinity to the state of focusing on a close object, and an excellent image performance is implemented.

Example 4-4

The imaging lens SL4 according to Example 4-4 will now be described with reference to FIG. 57, FIGS. 58A and 58B and Table 4-4. As FIG. 57 shows, in the imaging lens SL4 according to Example 4-4, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 (first positive lens component) having a convex surface facing the image, and a biconvex positive lens L5 (second positive lens component), which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 4-4, an axial air distance d6, between the first lens group G1 and the second lens group G2, and an axial air distance d12 between the second lens group G2 and the filter group FL change upon focusing.

Table 4-4 shows a table on each parameter of Example 4-4. The surface numbers 1 to 18 in Table 4-4 correspond to the surfaces 1 to 18 in FIG. 57. In Example 4-1, the second surface and the twelfth surface are aspherical.

TABLE 4-4

[Surface data]

| Surface number | r | d | nd | vd |
|---|---|---|---|---|
| 1 | 9.9874 | 0.90 | 1.68893 | 31.08 |
| *2 | 5.0739 | 0.45 | | |
| 3 | 6.3837 | 1.76 | 1.85026 | 32.35 |
| 4 | 17.4312 | 0.30 | | |
| 5 | 0.0000 | 1.95 | (Flare stop S1) | |
| 6 | 0.0000 | 0.45 | (Aperture stop S) | |
| 7 | 0.0000 | 1.50 | (Flare stop S2) | |
| 8 | −4.8003 | 0.90 | 1.80810 | 22.76 |
| 9 | −18.5588 | 2.98 | 1.81600 | 46.62 |
| 10 | −6.7015 | 0.20 | | |
| 11 | 20.2148 | 2.86 | 1.66910 | 55.42 |
| *12 | −30.3443 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 5.0739
κ = −2.9635
C4 = +3.4708E−03
C6 = −1.4779E−04
C8 = +8.3851E−06
C10 = −2.3110E−07

Twelfth surface r = −30.3443
κ = −0.7304
C4 = +1.2477E−04
C6 = +4.7254E−07
C8 = +9.6784E−09
C10 = −1.1595E−10

[Various data]

f = 14.26
FNO = 2.91
2ω = 62.12
Y = 8.50
TL = 30.00

[Variable distance data]

| | Infinity | Close Object |
|---|---|---|
| d6 | 1.7473 | 0.4500 |
| d12 | 8.4731 | 9.7704 |
| Bf | 0.4998 | 0.4998 |

[Lens group data]

| | First surface | Focal length |
|---|---|---|
| First lens group | 1 | 38.8259 |
| Second lens group | 7 | 14.1972 |

TABLE 4-4-continued

[Conditional expression]

nd5 = 1.66910
vd5 = 55.42
r5F = 20.2148
r5R = −30.3443
f = 14.2560
f5 = 18.5540
Conditional expression (9) nd5 = 1.66910
Conditional expression (10) vd5 = 55.42
Conditional expression (11) (r5R + r5F)/(r5R − r5F) = 0.2004
Conditional expression (12) f/f5 = 0.7684

As the parameter table in Table 4-4 shows, the imaging lens SL4 according to Example 4-4 satisfies the conditional expressions (9) and (12).

Figure 58A:
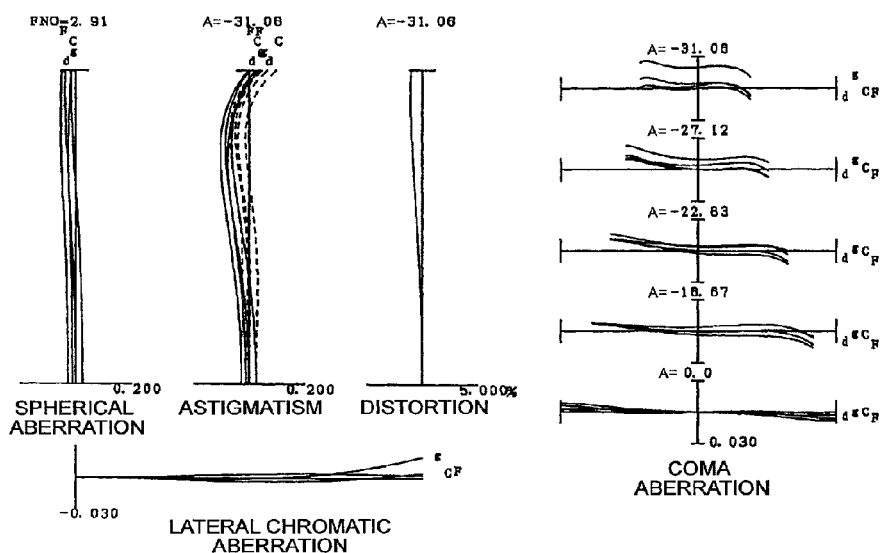
FIGS. 58A and 58B are graphs showing various aberrations of Example 4-4, where 58A are graphs showing various aberrations upon focusing on infinity, and 58 are graphs showing various aberrations upon focusing on a close object.
Figure 58B:
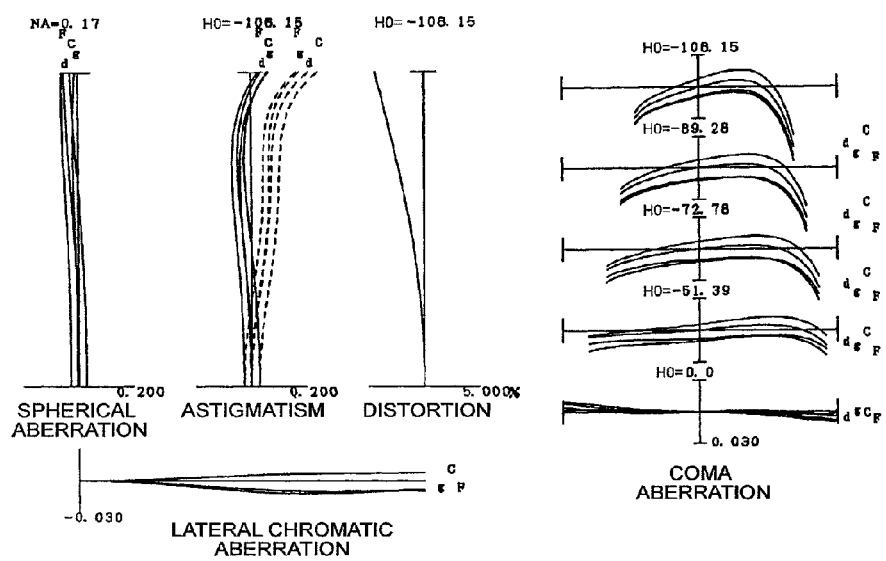

FIGS. 58A and 58B are graphs showing aberrations of the imaging lens SL4 according to Example 4-4, where FIG. 58A are graphs showing various aberrations upon focusing on infinity, and FIG. 58B are graphs showing various aberrations upon focusing on a close object. As each graph showing aberrations shows, in the imaging lens SL4 according to Example 4-4, various aberrations are corrected satisfactorily from the state of focusing on infinity to the state of focusing on a close object, and an excellent image performance is implemented.

Example 4-5

The imaging lens SL5 according to Example 4-5 will now be described with reference to FIG. 59, FIGS. 60A and 60B and Table 4-5. As FIG. 59 shows, in the imaging lens SL5 according to Example 4-5, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 (first positive lens component) having a convex surface facing the image, and a biconvex positive lens L5 (second positive lens component), which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 4-5, an axial air distance d6, between the first lens group G1 and the second lens group G2, and an axial air distance d12 between the second lens group G2 and the filter group FL change upon focusing.

Table 4-5 shows a table on each parameter of Example 4-5. The surface numbers 1 to 18 in Table 4-5 correspond to the surfaces 1 to 18 in FIG. 59. In Example 4-5, the second surface and the twelfth surface are aspherical.

TABLE 4-5

[Surface data]

| Surface number | r | d | nd | vd |
|---|---|---|---|---|
| 1 | 9.3520 | 0.90 | 1.67790 | 54.89 |
| *2 | 4.8208 | 0.45 | | |
| 3 | 5.9177 | 1.85 | 1.81600 | 46.62 |
| 4 | 15.9734 | 0.35 | | |

TABLE 4-5-continued

| | | | | |
|---|---|---|---|---|
| 5 | 0.0000 | 1.95 | (Flare stop S1) | |
| 6 | 0.0000 | (d6) | (Aperture stop S) | |
| 7 | 0.0000 | 1.60 | (Flare stop S2) | |
| 8 | −4.6847 | 0.90 | 1.80810 | 22.76 |
| 9 | −18.5193 | 3.04 | 1.81600 | 46.62 |
| 10 | −6.7523 | 0.20 | | |
| 11 | 19.5054 | 3.10 | 1.66910 | 55.42 |
| *12 | −28.1863 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 4.8208
κ = −2.2502
C4 = +3.2855E−03
C6 = −1.1017E−04
C8 = +6.2421E−06
C10 = −1.6029E−07

Twelfth surface r = −28.1863
κ = +3.4908
C4 = +1.4959E−04
C6 = −3.4328E−07
C8 = +5.0300E−09
C10 = −5.9841E−11

[Various data]

f = 14.26
FNO = 2.92
2ω = 62.12
Y = 8.50
TL = 30.00

[Variable distance data]

| | Infinity | Close Object |
|---|---|---|
| d6 | 1.6152 | 0.3000 |
| d12 | 8.0762 | 9.3915 |
| Bf | 0.4989 | 0.4989 |

[Lens group data]

| | First surface | Focal length |
|---|---|---|
| First lens group | 1 | 36.9620 |
| Second lens group | 7 | 14.0056 |

[Conditional expression]

nd5 = 1.66910
vd5 = 55.42
r5F = 19.5054
r5R = −28.1863
f = 14.2560
f5 = 17.6895
Conditional expression (9) nd5 = 1.66910
Conditional expression (10) vd5 = 55.42
Conditional expression (11) (r5R + r5F)/(r5R − r5F) = 0.1820
Conditional expression (12) f/f5 = 0.8059

As the parameter table in Table 4-5 shows, the imaging lens SL5 according to Example 4-5 satisfies the conditional expressions (9) and (12).

Figure 60A:
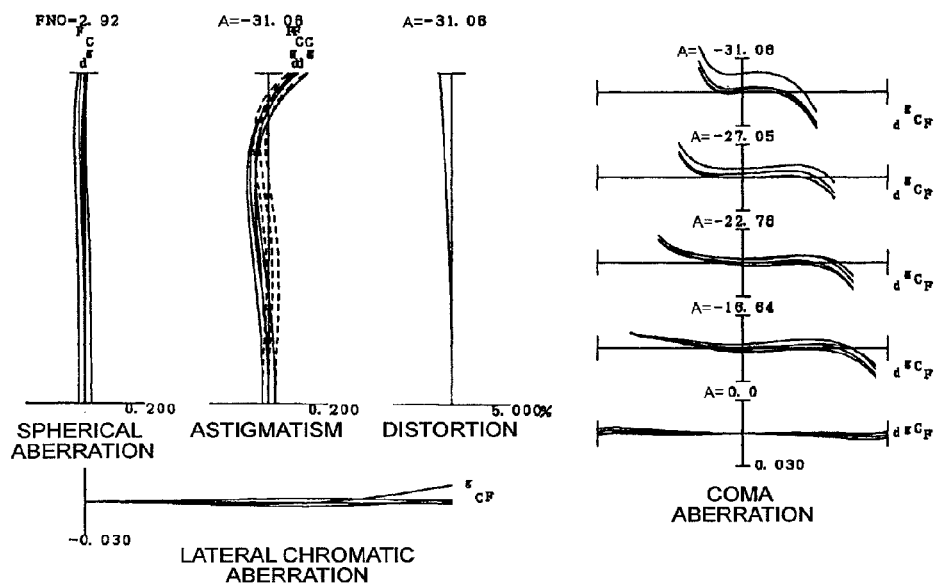
FIGS. 60A and 60B are graphs showing various aberrations of Example 4-5, where 60A are graphs showing various aberrations upon focusing on infinity, and 60B are graphs showing various aberrations upon focusing on a close object.
Figure 60B:
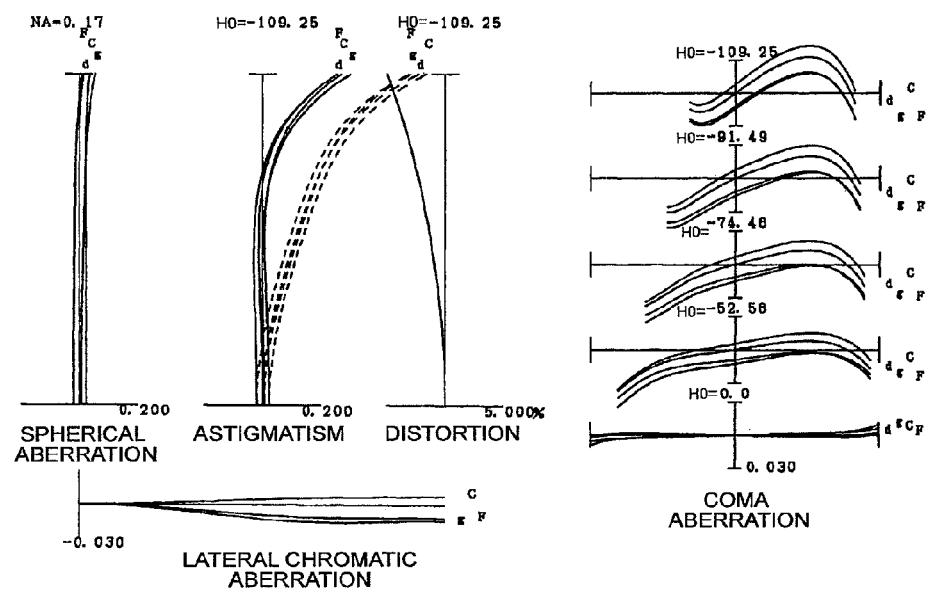

FIGS. 60A and 60B are graphs showing aberrations of the imaging lens SL5 according to Example 4-5, where FIG. 60A are graphs showing various aberrations upon focusing on infinity, and FIG. 60B are graphs showing various aberrations upon focusing on a close object. As each graph showing aberrations shows, in the imaging lens SL5 according to Example 4-5 various aberrations are corrected satisfactorily from the state of focusing on infinity to the state of focusing on a close object, and an excellent image performance is implemented.

Example 4-6

The imaging lens SL6 according to Example 4-6 will now be described with reference to FIG. 61, FIGS. 62A and 62B and Table 4-6. As FIG. 61 shows, in the imaging lens SL6 according to Example 4-6, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 (first positive lens component) having a convex surface facing the image, and a biconvex positive lens L5 (second positive lens component), which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 4-6, an axial air distance d6, between the first lens group G1 and the second lens group G2, and an axial air distance d12 between the second lens group G2 and the filter group FL change upon focusing.

Table 4-6 shows a table on each parameter of Example 4-6. The surface numbers 1 to 18 in Table 4-6 correspond to the surfaces 1 to 18 in FIG. 61. In Example 4-6, the second surface and the twelfth surface are aspherical.

TABLE 4-6

[Surface data]

| Surface number | r | d | nd | vd |
|---|---|---|---|---|
| 1 | 8.7469 | 0.90 | 1.67790 | 54.89 |
| *2 | 4.6799 | 0.45 | | |
| 3 | 5.8268 | 1.85 | 1.81600 | 46.62 |
| 4 | 14.7269 | 0.35 | | |
| 5 | 0.0000 | 1.95 | (Flare stop S1) | |
| 6 | 0.0000 | (d6) | (Aperture stop S) | |
| 7 | 0.0000 | 1.45 | (Flare stop S2) | |
| 8 | −4.7008 | 0.90 | 1.80810 | 22.76 |
| 9 | −19.5674 | 3.05 | 1.81600 | 46.62 |
| 10 | −6.8100 | 0.20 | | |
| 11 | 20.7908 | 3.10 | 1.66910 | 55.42 |
| *12 | −24.7647 | (d12) | | |
| 13 | 0.0000 | 1.00 | 1.51633 | 64.14 |
| 14 | 0.0000 | 1.50 | | |
| 15 | 0.0000 | 1.87 | 1.51633 | 64.14 |
| 16 | 0.0000 | 0.40 | | |
| 17 | 0.0000 | 0.70 | 1.51633 | 64.14 |
| 18 | 0.0000 | (Bf) | | |

[Aspherical data]

Second surface r = 4.6799
κ = −1.0342
C4 = +2.1291E−03
C6 = −2.5886E−05
C8 = +2.2070E−06
C10 = −5.3593E−08

TABLE 4-6-continued

Twelfth surface r = −24.7647
κ = −7.3551
C4 = +6.0709E−05
C6 = +1.2096E−08
C8 = +2.7737E−09
C10 = −5.6169E−11

[Various data]

f = 14.26
FNO = 2.91
2ω = 62.12
Y = 8.50
TL = 30.00

[Variable distance data]

|  | Infinity | Close Object |
|---|---|---|
| d6 | 1.6575 | 0.3500 |
| d12 | 8.1725 | 9.4800 |
| Bf | 0.4953 | 0.4953 |

[Lens group data]

|  | First surface | Focal length |
|---|---|---|
| First lens group | 1 | 37.8004 |
| Second lens group | 7 | 13.8767 |

[Conditional expression]

nd5 = 1.66910
vd5 = 55.42
r5F = 20.7908
r5R = −24.7647
f = 14.2560
f5 = 17.3655
Conditional expression (9) nd5 = 1.66910
Conditional expression (10) vd5 = 55.42
Conditional expression (11) (r5R + r5F)/(r5R − r5F) = 0.0872
Conditional expression (12) f/f5 = 0.8209

As the parameter table in Table 4-6 shows, the imaging lens SL6 according to Example 4-6 satisfies the conditional expressions (9) and (12).

Figure 62A:
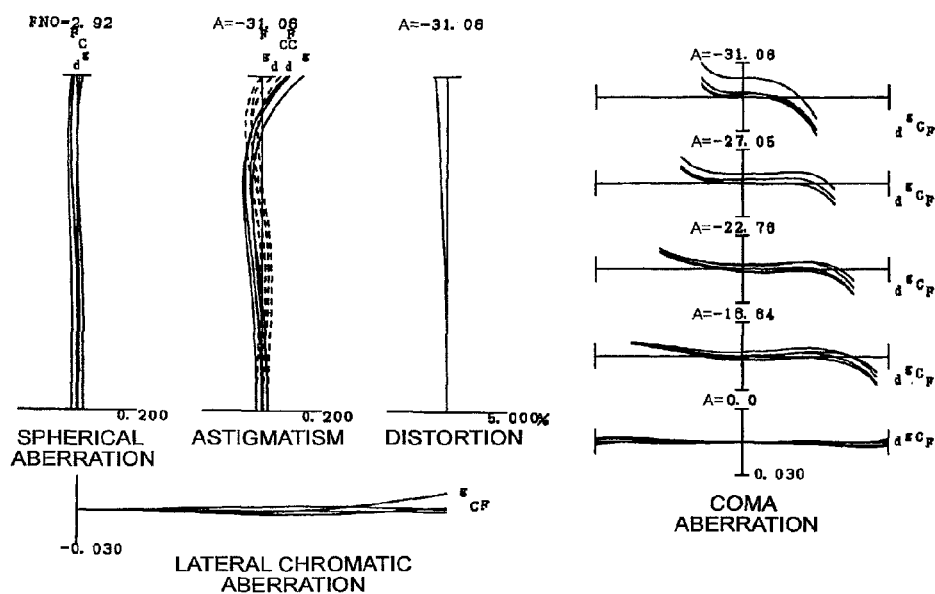
FIGS. 62A and 62B are graphs showing various aberrations of Example 4-6, where 62A are graphs showing various aberrations upon focusing on infinity, and 62B are graphs showing various aberrations upon focusing on a close object.
Figure 62B:
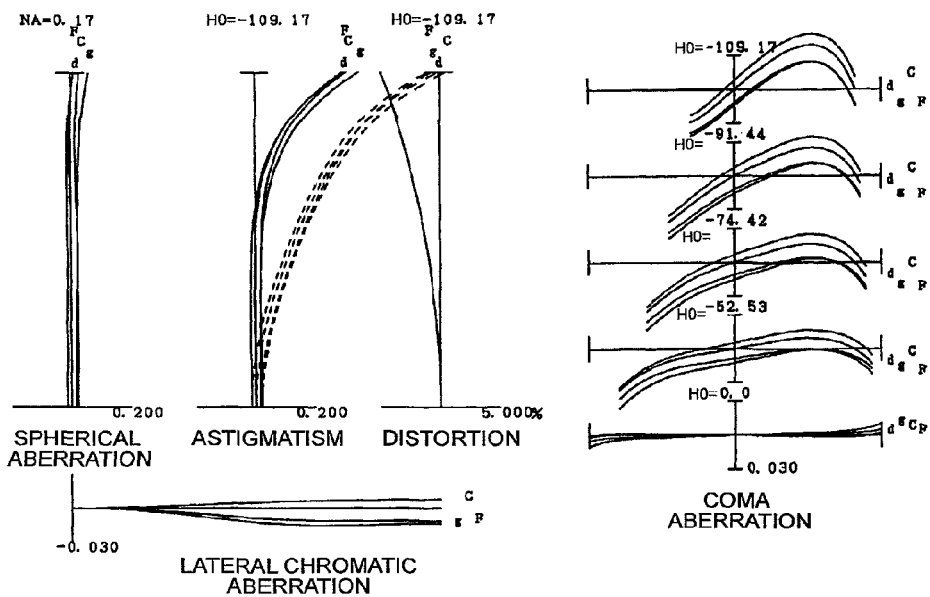

FIGS. 62A and 62B are graphs showing aberrations of the Imaging lens SL6 according to Example 4-6, where FIG. 62A are graphs showing various aberrations upon focusing on infinity, and FIG. 62B are graphs showing various aberrations upon focusing on a close object. As each graph showing aberrations shows, in the imaging lens SL6 according to Example 4-6, various aberrations are corrected satisfactorily from the state of focusing on infinity to the state of focusing on a close object, and an excellent image performance is implemented.

Example 4-7

The imaging lens SL7 according to Example 4-7 will now be described with reference to FIG. 63, FIGS. 64A and 64B and Table 4-7. As FIG. 63 shows, in the imaging lens SL7 according to Example 4-7, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 (first positive lens component) having a convex surface facing the image, and a biconvex positive lens L5 (second positive lens component), which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 4-7, an axial air distance d6, between the first lens group G1 and the second lens group G2, and an axial air distance d12 between the second lens group G2 and the filter group FL change upon focusing.

Table 4-7 shows a table on each parameter of Example 4-7. The surface numbers 1 to 18 in Table 4-7 correspond to the surfaces 1 to 18 in FIG. 63. In Example 4-7, the second surface and the twelfth surface are aspherical.

TABLE 4-7

| Surface number | r | d | nd | vd |
|---|---|---|---|---|
| 1 | 14.0147 | 0.90 | 1.67790 | 54.89 |
| *2 | 5.4694 | 0.90 |  |  |
| 3 | 7.6437 | 1.75 | 1.88300 | 40.76 |
| 4 | 30.8895 | 0.25 |  |  |
| 5 | 0.0000 | 1.60 | (Flare stop S1) |  |
| 6 | 0.0000 | (d6) | (Aperture stop S) |  |
| 7 | 0.0000 | 1.25 | (Flare stop S2) |  |
| 8 | −5.1623 | 0.95 | 1.80810 | 22.76 |
| 9 | −14.4718 | 2.75 | 1.75500 | 52.32 |
| 10 | −6.7218 | 0.20 |  |  |
| 11 | 26.5149 | 2.85 | 1.59201 | 67.02 |
| *12 | −18.8905 | (d12) |  |  |
| 13 | 0.0000 | 1.00 | 1.51633 | 64.14 |
| 14 | 0.0000 | 1.50 |  |  |
| 15 | 0.0000 | 1.87 | 1.51633 | 64.14 |
| 16 | 0.0000 | 0.40 |  |  |
| 17 | 0.0000 | 0.70 | 1.51633 | 64.14 |
| 18 | 0.0000 | (Bf) |  |  |

[Aspherical data]

Second surface r = 5.4694
κ = +1.4173
C4 = −6.4702E−04
C6 = −2.1283E−05
C8 = −4.5161E−07
C10 = −6.2922E−08

Twelfth surface r = −18.8905
κ = +5.5850
C4 = +2.2637E−04
C6 = +8.5167E−07
C8 = +1.1963E−08
C10 = +1.5290E−10

[Various data]

f = 14.26
FNO = 2.83
2ω = 62.07
Y = 8.50
TL = 32.01

[Variable distance data]

|  | Infinity | Close Object |
|---|---|---|
| d6 | 2.0676 | 0.8000 |
| d12 | 10.5324 | 11.8300 |
| Bf | 0.5145 | 0.5145 |

TABLE 4-7-continued

[Lens group data]

| | First surface | Focal length |
|---|---|---|
| First lens group | 1 | 51.9495 |
| Second lens group | 7 | 15.2959 |

[Conditional expression]

nd5 = 1.59201
vd5 = 67.02
r5F = 26.5149
r5R = −18.8905
f = 14.2560
f5 = 19.0788
Conditional expression (9) nd5 = 1.59201
Conditional expression (10) vd5 = 67.02
Conditional expression (11) (r5R + r5F)/(r5R − r5F) = −0.1679
Conditional expression (12) f/f5 = 0.7472

As the parameter table in Table 4-7 shows, the imaging lens SL7 according to Example 4-7 satisfies the conditional expressions (9) and (12).

Figure 64A:
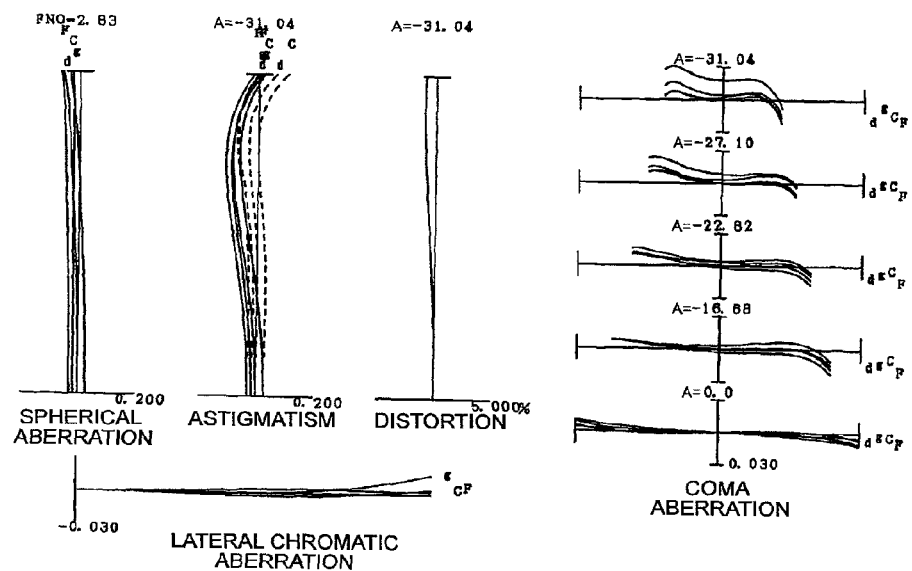
FIGS. 64A and 64B are graphs showing various aberrations of Example 4-7, where 64A are graphs showing various aberrations upon focusing on infinity, and 64B are graphs showing various aberrations upon focusing on a close object.
Figure 64B:
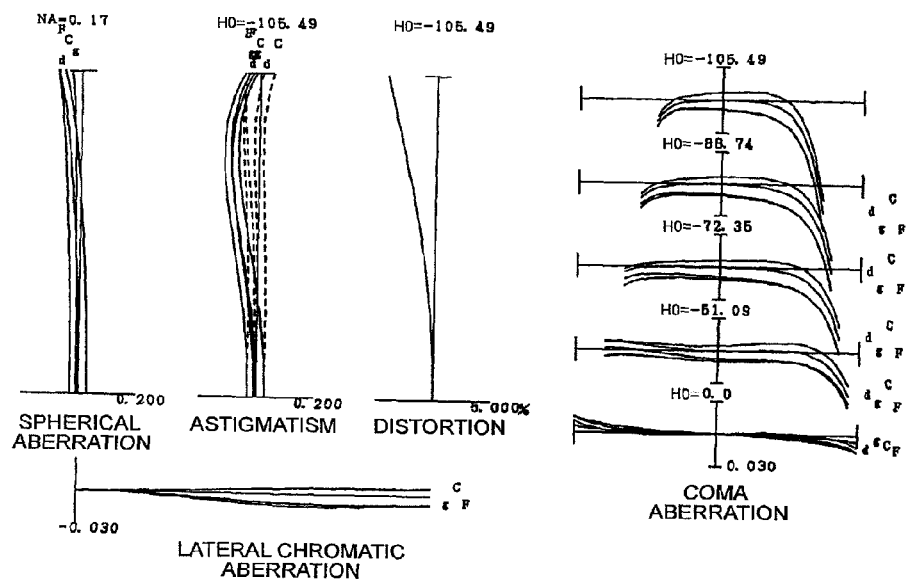

FIGS. 64A and 64B are graphs showing aberrations of the imaging lens SL7 according to Example 4-7, where FIG. 64A are graphs showing various aberrations upon focusing on infinity, and FIG. 64B are graphs showing various aberrations upon focusing on a close object. As each graph showing aberrations shows, in the imaging lens SL7 according to Example 4-7, various aberrations are corrected satisfactorily from the state of focusing on infinity to the state of focusing on a close object, and an excellent image performance is implemented.

Example 4-8

The imaging lens SL8 according to Example 4-8 will now be described with reference to FIG. 65, FIGS. 66A and 66B and Table 4-8. As FIG. 65 shows, in the imaging lens SL8 according to Example 4-8, a first lens group G1 comprises a negative meniscus lens L1 having a convex surface facing the object, and a positive meniscus lens L2 having a convex surface facing the object, which are dispersed in order from the object. A second lens group G2 comprises a cemented lens L34 of a negative meniscus lens L3 having a concave surface facing the object and a positive meniscus lens L4 (first positive lens component) having a convex surface facing the image, and a biconvex positive lens L5 (second positive lens component), which are disposed in order from the object.

An aperture stop S is disposed between the first lens group G1 and the second lens group G2, and is fixed with respect to the first lens group G1 or the image plane I upon focusing from infinity to a close object. Also a flare stop S1 and flare stop S2 are disposed at pre-positions and post positions of the aperture stop S.

In Example 4-8, an axial air distance d6, between the first lens group G1 and the second lens group G2, and an axial air distance d12 between the second lens group G2 and the filter group FL change upon focusing.

Table 4-8 shows a table on each parameter of Example 4-8. The surface numbers 1 to 18 in Table 4-8 correspond to the surfaces 1 to 18 in FIG. 65. In Example 4-8, the second surface and the twelfth surface are aspherical.

TABLE 4-8

[Surface data]

| Surface number | r | d | nd | vd |
|---|---|---|---|---|
| 1 | 14.0077 | 1.30 | 1.67790 | 54.89 |
| *2 | 5.3933 | 0.60 | | |
| 3 | 7.5715 | 1.95 | 1.88300 | 40.76 |
| 4 | 28.3663 | 0.25 | | |
| 5 | 0.0000 | 1.75 | (Flare stop S1) | |
| 6 | 0.0000 | (d6) | (Aperture stop S) | |
| 7 | 0.0000 | 1.25 | (Flare stop S2) | |
| 8 | −5.2273 | 0.98 | 1.80810 | 22.76 |
| 9 | −15.1471 | 2.88 | 1.75500 | 52.32 |
| 10 | −6.7013 | 0.20 | | |
| 11 | 23.0044 | 2.94 | 1.59201 | 67.02 |
| *12 | −20.7345 | 8.96 | | |
| 13 | 0.0000 | 0.50 | 1.51633 | 64.14 |
| 14 | 0.0000 | 4.60 | | |
| 15 | 0.0000 | 1.87 | 1.51633 | 64.14 |
| 16 | 0.0000 | 0.30 | | |
| 17 | 0.0000 | 0.70 | 1.51633 | 64.14 |
| 18 | 0.0000 | (Bf) | | |

[Aspherical data]

Second surface r = 5.3933
κ = +1.7327
C4 = −9.1467E−04
C6 = −4.4123E−05
C8 = +8.7126E−07
C10 = −2.7436E−07

Twelfth surface r = −20.7345
κ = −19.0000
C4 = −1.4487E−04
C6 = +4.4684E−06
C8 = −5.5750E−08
C10 = +3.1253E−10

[Various data]

f = 14.26
FNO = 2.92
2ω = 62.50
Y = 8.50
TL = 32.36

[Variable distance data]

| | Infinity | Close Object |
|---|---|---|
| d6 | 2.0376 | 0.8000 |
| d12 | 7.7203 | 8.9579 |
| Bf | 0.5348 | 0.5348 |

[Lens group data]

| | First surface | Focal length |
|---|---|---|
| First lens group | 1 | 51.9495 |
| Second lens group | 7 | 14.3554 |

[Conditional expression]

nd5 = 1.59201
vd5 = 67.02
r5F = 23.0044
r5R = −20.7345
f = 14.2560
f5 = 18.8933
Conditional expression (9) nd5 = 1.59201
Conditional expression (10) vd5 = 67.02
Conditional expression (11) (r5R + r5F)/(r5R − r5F) = −0.0519
Conditional expression (12) f/f5 = 0.7546

As the parameter table in Table 4-8 shows, the imaging lens SL8 according to Example 4-8 satisfies the conditional expressions (9) and (12).

Figure 66A:
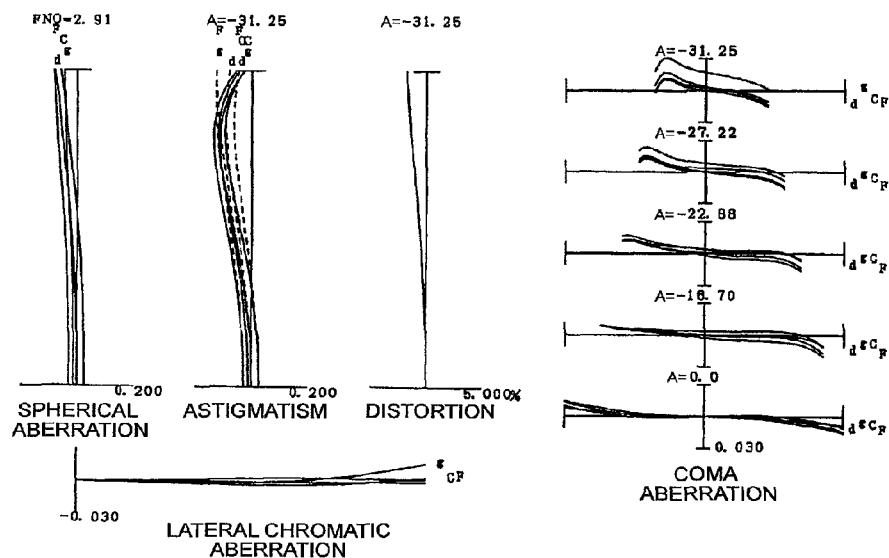
Figure 66B:
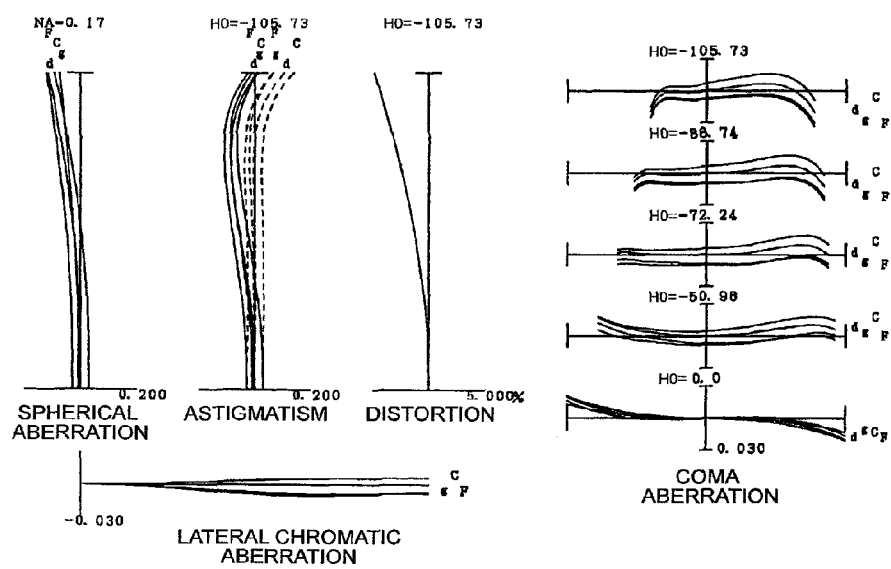

FIGS. 66A and 66B are graphs showing aberrations of the imaging lens SL8 according to Example 4-8, where FIG. 66A are graphs showing various aberrations upon focusing on infinity, and FIG. 66B are graphs showing various aberrations upon focusing on a close object. As each graph showing aberrations shows, in the imaging lens SL8 according to Example 4-8, various aberrations are corrected satisfactorily from the state of focusing on infinity to the state of focusing on a close object, and an excellent image performance is implemented.

Figure 67:
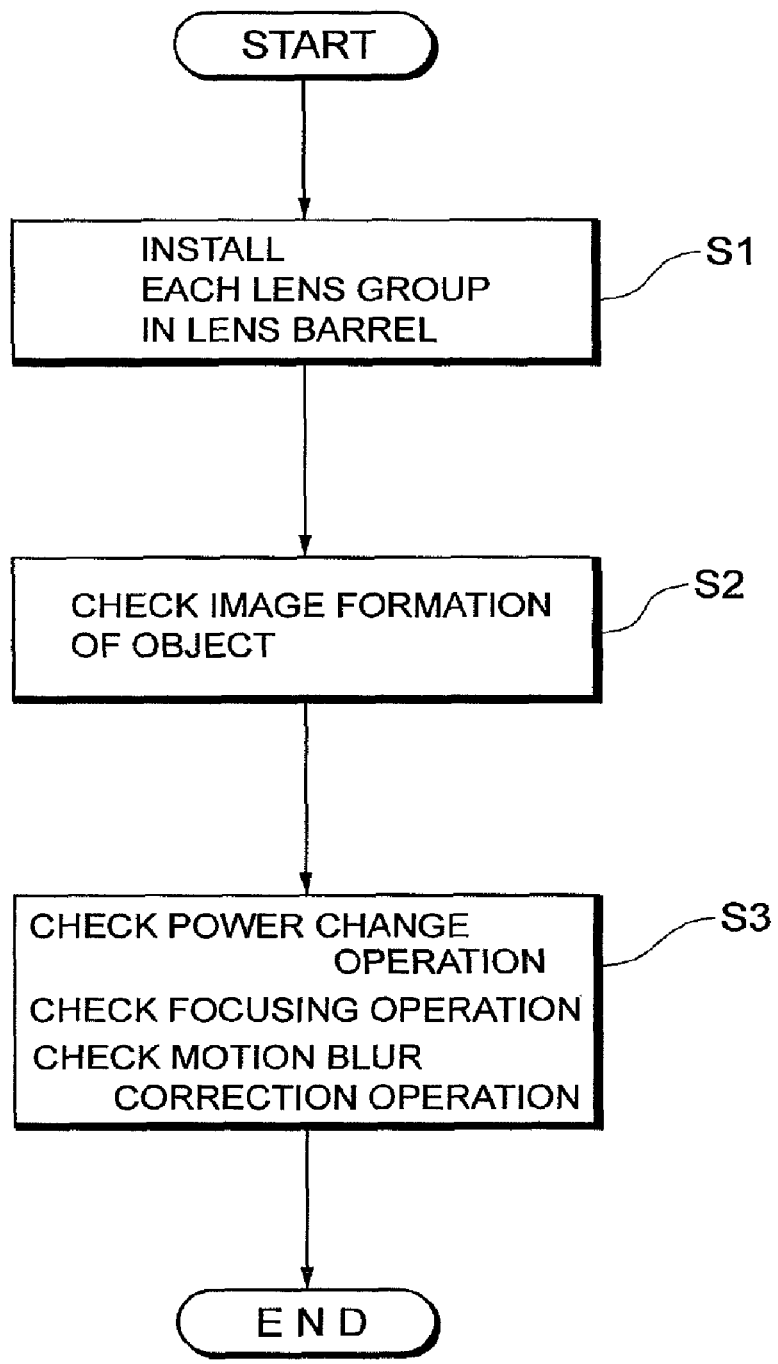
FIG. 67 is a flow chart depicting a method for manufacturing the imaging lens.

Now a method for manufacturing the imaging lens will be described in brief with reference to FIG. 67. In this method, the first lens group G1 and the second lens group G2 of the present embodiment are assembled in a cylindrical lens barrel (step S1). When each lens group is assembled in the lens barrel, each lens group may be assembled in the lens barrel one at a time according to the sequence along the optical axis, or a part or all of the lens group may be held together using a holding element, and assembled. It is preferable that after each lens group is assembled in the lens barrel, it is checked whether an image of the object is formed in a state of each lens group being assembled in the lens barrel, in other words, it is checked whether each lens group is centered (step S2).

After the imaging lens is assembled as above, various operations of the imaging lens are checked (step S3). Examples of the various operations checked here are a focusing operation where a lens group that focuses on a distant object to a close object moves along the optical axis direction, and a motion blur correction operation where at least a part of the lenses (preferably all or a part of the second lens group G2) move in a direction perpendicular to the optical axis. In the present embodiment, the second lens group G2 moves toward the object upon focusing from a distant object to a close object. The sequence of checking various operations can be arbitrary.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An imaging lens, comprising an object side lens group having a positive refractive power and an image side lens group having a positive refractive power with an air distance from the object side lens group, which are disposed in order from the object,
the image side lens group further including a cemented lens of a negative lens component having a concave surface facing the object and a positive lens component having a convex surface facing the image, and a biconvex positive lens component, which are disposed in order from the object, and
all or a part of the image side lens group being able to be shifted in a direction substantially perpendicular to the optical axis as a shift lens group.

2. The imaging lens according to claim 1, wherein a condition expressed by the following expression is satisfied:

$$0.80 < f/fS < 1.10$$

where f is a focal length of the imaging lens, and fS is a focal length of the shift lens group.

3. The imaging lens according to claim 1, wherein a condition expressed by the following expression is satisfied:

$$0.13 < f2/f1 < 0.47$$

where f1 is a focal length of the object side lens group, and f2 is a focal length of the image side lens group.

4. The imaging lens according to claim 1, wherein an aperture stop is disposed between the object side lens group and the image side lens group.

5. The imaging lens according to claim 1, wherein the focus on a close object is adjusted by moving the image side lens group toward the object.

6. The imaging lens according to claim 1, wherein the object side lens group comprises the first lens component made of a negative meniscus lens having a convex surface facing the object, and the second lens component made of a positive meniscus lens having a convex surface facing the object, which are disposed in order from the object.

7. The imaging lens according to claim 1, wherein the image side lens group comprises a biconvex positive lens, and the biconvex positive lens includes at least one aspherical surface.

8. The imaging lens according to claim 1, wherein a condition expressed by the following expression being satisfied:

$$3.0 < TL/Y\max < 4.0$$

where TL is a total length of the imaging lens, and Ymax is a maximum image height.

9. The imaging lens according to claim 1, wherein a condition expressed by of the following expression is satisfied:

$$1.7 < TL/\Sigma d < 2.2$$

where TL is a total length of the imaging lens, and Σd is a length on the optical axis, from a lens surface closest to the object in the object side lens group to a lens surface closest to the image in the image side lens group.

10. The imaging lens according to claim 1, wherein the image side lens group comprises a cemented lens of a negative meniscus lens having a concave surface facing the object and a positive meniscus lens having a convex surface facing the image, and a biconvex positive lens, which are disposed in order from the object.

11. The imaging lens according to claim 1, wherein the image side lens group includes at least one aspherical surface.

12. An optical apparatus, comprising an imaging lens that forms an image of an object on a predetermined image surface, wherein the imaging lens is the imaging lens according to claim 1.

13. The imaging lens according to claim 1, wherein the image side lens group including a cemented lens of a negative lens component and a first positive lens component, and a second positive lens component, which are disposed in order from the object, and
conditions expressed by the following expressions being satisfied:

$$nd5 < 1.67$$

$$vd5 > 50.0$$

where nd5 is a refractive index of the second positive lens component of the image side lens group on the d-line, and vd5 is an Abbe number of the second positive lens component of the image side lens group on the d-line.

14. The imaging lens according to claim 13, wherein a condition expressed by the following expression is satisfied:

$$-0.30 < (r5R + r5F)/(r5R - r5F) < 0.40$$

where r5F is a radius of curvature of an object side lens surface of the second positive lens component of the image side lens group, and r5R is a radius of curvature of an image side lens surface of the second positive lens component of the image side lens group.

15. The Imaging lens according to claim 13, wherein a condition represented by the following expression is satisfied:

$$0.60<f/f5<0.90$$

where f is a focal length of the imaging lens, and f5 is a focal length of the second positive lens component of the image side lens group.

16. The imaging lens according to claim 1, wherein the object side lens group including a first lens component having a negative refractive power and a second lens component having a positive refractive power, which are disposed in order from the object, and conditions expressed by the following expressions being satisfied:

$$0.12<f/f1<0.47$$

$$0.016<D12/f<0.079$$

where f1 is a focal length of the object side lens group, f is a focal length of an imaging lens, and D12 is an air distance between the first lens component and the second lens component of the object side lens group.

17. The imaging lens according to claim 16, wherein a condition expressed by the following expression is satisfied:

$$nd1>1.65$$

where nd1 is a refractive index of the first lens component of the object side lens group on the d-line.

18. The imaging lens according to claim 16, wherein a condition expressed by the following expression is satisfied:

$$3.8<(r2F+r1R)/(r2F-r1R)<11.8$$

where r1R is a radius of curvature of an image side lens surface of the first lens component, and r2F is a radius of curvature of an object side lens surface of the second lens component.

19. The imaging lens according to claim 16, wherein the negative lens component of the object side lens group includes at least one aspherical surface.

20. A method for manufacturing an imaging lens, comprising the steps of:

assembling an object side lens group having a positive refractive power and an image side lens group having a positive refractive power with an air distance from the object side lens group in a lens barrel in order from the object side;

configuring the image side lens group by disposing a cemented lens of a negative lens component having a concave surface facing the object and a positive lens component having a convex surface facing the image, and a biconvex positive lens component in order from the object when the step of assembling is performed; and assembling all or a part of the image side lens group as a shift lens group to be shifted in a direction substantially perpendicular to the optical.

21. The method for manufacturing the imaging lens according to claim 20, wherein a condition expressed by the following expression is satisfied:

$$0.80<f/fS<1.10$$

where f is a focal length of the imaging lens, and fS is a focal length of the shift lens group.

22. The method for manufacturing the imaging lens according to claim 20, wherein a condition expressed by the following expression is satisfied:

$$0.13<f2/f1<0.47$$

where f1 is a focal length of the object side lens group, and f2 is a focal length of the image side lens group.

23. The method for manufacturing the imaging lens according to claim 20, wherein an aperture stop is disposed between the object side lens group and the image side lens group.

24. The method for manufacturing the imaging lens according to claim 20, wherein the focus on a close object is adjusted by moving the image side lens group toward the object.

25. The method for manufacturing the imaging lens according to claim 20, wherein the object side lens group comprises the first lens component made of a negative meniscus lens having a convex surface facing the object, and the second lens component made of a positive meniscus lens having a convex surface facing the object, which are disposed in order from the object.

26. The method for manufacturing the imaging lens according to claim 20, wherein the image side lens group comprises a biconvex positive lens, wherein the biconvex positive lens includes at least one aspherical surface.

27. The method for manufacturing the imaging lens according to claim 20, wherein a condition expressed by the following expression being satisfied:

$$3.0<TL/Ymax<4.0$$

where TL is a total length of the imaging lens, and Ymax is a maximum image height.

28. The method for manufacturing the imaging lens according to claim 20, wherein a condition expressed by the following expression is satisfied:

$$1.7<TL/\Sigma d<2.2$$

where TL is a total length of the imaging lens, and Σd is a length on the optical axis, from a lens surface closest to the object in the object side lens group to a lens surface closest to the image in the image side lens group.

29. The method for manufacturing the imaging lens according to claim 20, wherein the image side lens group comprises a cemented lens of a negative meniscus lens having a concave surface facing the object and a positive meniscus lens having a convex surface facing the image, and a biconvex positive lens, which are disposed in order from the object.

30. The method for manufacturing the imaging lens according to claim 20, wherein the image side lens group includes at least one aspherical surface.

31. The method for manufacturing an imaging lens according to claim 20, wherein configuring the image side lens group by disposing a cemented lens of a negative lens component and a first positive lens component, and a second positive lens component in order from the object when the step of assembling is performed, conditions expressed by the following expressions being satisfied:

$$nd5<1.67$$

$$vd5>50.0$$

where nd5 is a refractive index of the second positive lens component of the image side lens group on the d-line, and vd5 is an Abbe number of the second positive lens of the image side lens group on to the d-line.

32. The method for manufacturing the imaging lens according to claim 31, wherein a condition expressed by the following expression is satisfied:

$$-0.30<(r5R+r5F)/(r5R-r5F)<0.40$$

where r5F is a radius of curvature of an object side lens surface of the second positive lens component of the image side lens group, and r5R is a radius of curvature of an image side lens surface of the second positive lens component of the image side lens group.

33. The method for manufacturing the imaging lens according to claim 31, wherein a condition expressed by the following expression is satisfied:

$$0.60 < f/f5 < 0.90$$

where f is a focal length of the imaging lens, and f5 is a focal length of the second positive lens component of the image side lens group.

34. The method for manufacturing the imaging lens according to claim 20, wherein configuring the object side lens group by disposing a first lens component having a negative refractive power and a second lens component having a positive refractive power in order from the object when the step of assembling is performed, conditions expressed by the following expressions being satisfied:

$$0.12 < f/f1 < 0.47$$

$$0.016 < D12/f < 0.079$$

where f1 is a focal length of the object side lens group, f is a focal length of an imaging lens, and D12 is an air distance between the first lens component and the second lens component of the object side lens group.

35. The method for manufacturing the imaging lens according to claim 34, wherein a condition expressed by the following expression is satisfied:

$$nd1 > 1.65$$

where nd1 is a refractive index of the first lens component of the object side lens group on the d-line.

36. The method for manufacturing the imaging lens according to claim 34, wherein a condition expressed by the following expression is satisfied:

$$3.8 < (r2F + r1R)/(r2F - r1R) < 11.8$$

where r1R is a radius of curvature of an image side lens surface of the first lens component, and r2F is a radius of curvature of an object side lens surface of the second lens component.

37. The method for manufacturing the imaging lens according to claim 34, wherein the negative lens component of the object side lens group includes at least one aspherical surface.

* * * * *